US006953906B2

(12) United States Patent

Burns et al.

(10) Patent No.: US 6,953,906 B2

(45) Date of Patent: Oct. 11, 2005

(54) DELIVERY POINT SEQUENCING MAIL SORTING SYSTEM WITH FLAT MAIL CAPABILITY

(75) Inventors: Gary P. Burns, Rockford, MI (US); Douglas E. Olson, Grand Rapids, MI (US); Robert L. Stone, Rockford, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 253 days.

(21) Appl. No.: 10/135,491

(22) Filed: Apr. 30, 2002

(65) Prior Publication Data

US 2002/0125177 A1 Sep. 12, 2002

Related U.S. Application Data

(63) Continuation-in-part of application No. 09/629,007, filed on Jul. 31, 2000, now Pat. No. 6,501,041.

(60) Provisional application No. 60/146,689, filed on Aug. 2, 1999, provisional application No. 60/328,160, filed on Oct. 10, 2001, provisional application No. 60/302,527, filed on Jun. 29, 2001, and provisional application No. 60/289,329, filed on May 7, 2001.

(51) Int. Cl.[7] .......... B65G 37/00

(52) U.S. Cl. .......... 209/584; 209/900; 198/347.1

(58) Field of Search .......... 209/583, 584, 209/900, 922, 933; 198/465.1, 347.1, 347.4

(56) References Cited

U.S. PATENT DOCUMENTS

| | | | |
|---|---|---|---|
| 3,184,061 | A | 5/1965 | Levy |
| 3,613,911 | A | 10/1971 | Walchhuter |
| 3,757,939 | A | 9/1973 | Henig |

(Continued)

FOREIGN PATENT DOCUMENTS

| | | | | | |
|---|---|---|---|---|---|
| DE | 19647973 | | | 11/1996 | B07C/3/10 |
| EP | 495661 | A2 | | 7/1992 | B07C/3/18 |
| EP | 0761322 | A1 | | 3/1997 | |
| EP | 774303 | A2 | | 5/1997 | |
| JP | 07267353 | A | * | 10/1995 | B65G/47/68 |
| JP | 10059624 | A | * | 3/1998 | B65H/67/06 |
| JP | 2002211705 | A | * | 7/2002 | B65G/1/00 |
| WO | WO 0053344 | | | 9/2000 | |
| WO | WO 0105523 | | | 1/2001 | |

OTHER PUBLICATIONS

Commonly assigned, co–pending U.S. Appl. No. 09/629,007 filed Jul. 31, 2000 by Gary P. Burns et al. (RAP04 P–613).

Commonly assigned, co–pending U.S. Appl. No. 09/629,009 filed Jul. 31, 2000 by Gary P. Burns et al. (RAP04 P–601).

*Primary Examiner*—Donald P. Walsh
*Assistant Examiner*—Joseph Rodriguez
(74) *Attorney, Agent, or Firm*—Van Dyke, Gardner, Linn & Burkhart, LLP

(57) ABSTRACT

A method and apparatus for sorting articles to a delivery point sequence includes at least one sortation assembly adapted to sort articles and a buffer. The buffer is operable to arrange and convey containers of articles sorted in a first sort pass to an induct of the at least one sortation assembly for a second sort pass or process of the articles. The buffer automatically arranges the containers in an arranged manner prior to conveying the containers and articles to the induct of the at least one sortation assembly for the second sort process. The second sort process is then performed to sort the articles to a delivery point sequence or carrier walk sequence depth of sort. A conveyor assembly may be operable to convey containers to an appropriate one of multiple sortation assemblies and/or buffers to increase the sequencing matrix capability of the apparatus.

34 Claims, 27 Drawing Sheets

U.S. PATENT DOCUMENTS

| | | | | | |
|---|---|---|---|---|---|
| 3,905,491 | A | | 9/1975 | Harrison | |
| 3,945,505 | A | | 3/1976 | Frisbie et al. | |
| 3,988,017 | A | | 10/1976 | Kyhl | |
| 4,058,217 | A | * | 11/1977 | Vaughan et al. | 209/559 |
| 4,244,672 | A | | 1/1981 | Lund | |
| 4,310,276 | A | | 1/1982 | Castagnoli | |
| 4,468,165 | A | | 8/1984 | Kawasaki | |
| 4,507,739 | A | | 3/1985 | Haruki et al. | |
| 4,554,873 | A | * | 11/1985 | Rex | 104/88.04 |
| 4,567,988 | A | | 2/1986 | Weibel | |
| 4,641,753 | A | | 2/1987 | Tamada | |
| 4,907,699 | A | | 3/1990 | Butcher et al. | |
| 5,009,321 | A | | 4/1991 | Keough | |
| 5,038,911 | A | | 8/1991 | Doane et al. | |
| 5,042,667 | A | | 8/1991 | Keough | |
| 5,119,954 | A | | 6/1992 | Svyatsky et al. | |
| 5,263,300 | A | | 11/1993 | Plent et al. | |
| 5,337,880 | A | | 8/1994 | Claycomb et al. | |
| 5,353,938 | A | | 10/1994 | LaGrange et al. | |
| 5,385,243 | A | | 1/1995 | Jackson et al. | |
| 5,395,206 | A | | 3/1995 | Cerny, Jr. | |
| 5,411,151 | A | * | 5/1995 | Sasada | 209/583 |
| 5,667,078 | A | | 9/1997 | Walach | |
| 5,718,321 | A | | 2/1998 | Brugger et al. | |
| 5,803,704 | A | | 9/1998 | Lazzarotti | |
| 5,833,076 | A | | 11/1998 | Harres et al. | |
| 5,857,830 | A | | 1/1999 | Harres et al. | |
| 5,860,504 | A | | 1/1999 | Lazzarotti | |
| 5,893,464 | A | | 4/1999 | Kiani et al. | |
| 5,924,576 | A | | 7/1999 | Steenge | |
| 5,959,868 | A | | 9/1999 | Oppliger et al. | |
| 6,024,425 | A | | 2/2000 | Imai et al. | |
| 6,026,967 | A | | 2/2000 | Isaacs et al. | |
| 6,169,936 | B1 | | 1/2001 | Lohmann | |
| 6,241,099 | B1 | | 6/2001 | Hendrickson et al. | |
| 6,276,509 | B1 | | 8/2001 | Schuster et al. | |
| 6,328,302 | B2 | | 12/2001 | Hendrickson et al. | |
| 2003/0209474 | A1 | * | 11/2003 | Nakanishi et al. | 209/584 |

* cited by examiner

110

15A

15B

600

First Pass Bin Assignments

600A

| Carrier | Row | Bin #1 | Bin #2 | Bin #3 | Bin #4 | Bin #5 | Bin #6 | Bin #7 | Bin #8 | Bin #9 | Bin #10 | Bin #11 | Bin #12 | | Bin #110 |
|---|---|---|---|---|---|---|---|---|---|---|---|---|---|---|---|
| 1 | 1 | 1 | 2 | 3 | 4 | 5 | 6 | 7 | 8 | 9 | 10 | 11 | 12 | ....... | 110 |
| 1 | 2 | 111 | 112 | 113 | 114 | 115 | 116 | 117 | 118 | 119 | 110 | 111 | 112 | ....... | 220 |
| 1 | 3 | 221 | 222 | 223 | 224 | 225 | 226 | 227 | 228 | 229 | 230 | 231 | 232 | ....... | 330 |
| 1 | 4 | 331 | 332 | 333 | 334 | 335 | 336 | 337 | 338 | 339 | 340 | 341 | 342 | ....... | 440 |
| 1 | 5 | 441 | 442 | 443 | 444 | 445 | 446 | 447 | 448 | 449 | 450 | 451 | 452 | ....... | 550 |
| 1 | 6 | 551 | 552 | 553 | 554 | 555 | 556 | 557 | 558 | 559 | 560 | 561 | 562 | ....... | 660 |
| 2 | 1 | 1 | 2 | 3 | 4 | 5 | 6 | 7 | 8 | 9 | 10 | 11 | 12 | | 110 |

Fig. 25B

600

600B

Second Pass Bin Assignments

| Bin #1 | Bin #2 | Bin #3 | Bin #4 | Bin #5 | Bin #6 | Bin #7 | Bin #8 | Bin #9 | Bin #10 | Bin #11 | Bin #12 | ....... | Bin #120 |
|---|---|---|---|---|---|---|---|---|---|---|---|---|---|
| CR | CR 1 | CR 1 | CR 1 | CR 1 | CR 1 | CR 2 | CR 2 | CR 2 | CR 2 | CR 2 | CR 2 | ....... | CR 20 |
| 1 | 111 | 221 | 331 | 441 | 551 | 1 | 111 | 221 | 331 | 441 | 551 | ....... | 551 |
| 2 | 112 | 222 | 332 | 442 | 552 | 2 | 112 | 222 | 332 | 442 | 552 | ....... | 552 |
| 3 | 113 | 223 | 333 | 443 | 553 | 3 | 113 | 223 | 333 | 443 | 553 | ....... | 553 |
| 4 | 114 | 224 | 334 | 444 | 554 | 4 | 114 | 224 | 334 | 444 | 554 | ....... | 554 |
| 5 | 115 | 225 | 335 | 445 | 555 | 5 | 115 | 225 | 335 | 445 | 555 | ....... | 555 |
| 6 | 116 | 226 | 336 | 446 | 556 | 6 | 116 | 226 | 336 | 446 | 556 | ....... | 556 |
| 7 | 117 | 227 | 337 | 447 | 557 | 7 | 117 | 227 | 337 | 447 | 557 | ....... | 557 |
| 8 | 118 | 228 | 338 | 448 | 558 | 8 | 118 | 228 | 338 | 448 | 558 | ....... | 558 |
| 9 | 119 | 229 | 339 | 449 | 559 | 9 | 119 | 229 | 339 | 449 | 559 | ....... | 559 |
| 10 | 120 | 230 | 340 | 450 | 560 | 10 | 120 | 230 | 340 | 450 | 560 | ....... | 560 |
| 11 | 121 | 231 | 341 | 451 | 561 | 11 | 121 | 231 | 341 | 451 | 561 | ....... | 561 |
| 12 | 122 | 232 | 342 | 452 | 562 | 12 | 122 | 232 | 342 | 452 | 562 | ....... | 562 |
| 13 | 123 | 233 | 343 | 453 | 563 | 13 | 123 | 233 | 343 | 453 | 563 | ....... | 563 |
| 14 | 124 | 234 | 344 | 454 | 564 | 14 | 124 | 234 | 344 | 454 | 564 | ....... | 564 |
| 15 | 125 | 235 | 345 | 455 | 565 | 15 | 125 | 235 | 345 | 455 | 565 | ....... | 565 |
| 16 | 126 | 236 | 346 | 456 | 566 | 16 | 126 | 236 | 346 | 456 | 566 | ....... | 566 |
| 17 | 127 | 237 | 347 | 457 | 567 | 17 | 127 | 237 | 347 | 457 | 567 | ....... | 567 |
| 18 | 128 | 238 | 348 | 458 | 568 | 18 | 128 | 238 | 348 | 458 | 568 | ....... | 568 |
| 19 | 129 | 239 | 349 | 459 | 569 | 19 | 129 | 239 | 349 | 459 | 569 | ....... | 569 |
| 20 | 130 | 240 | 350 | 460 | 570 | 20 | 130 | 240 | 350 | 460 | 570 | ....... | 570 |
| ....... | ....... | ....... | ....... | ....... | ....... | ....... | ....... | ....... | ....... | ....... | ....... | ....... | ....... |
| 110 | 220 | 330 | 440 | 550 | 660 | 110 | 220 | 330 | 440 | 550 | 660 | ....... | 860 |

Fig. 26B

DELIVERY POINT SEQUENCING MAIL SORTING SYSTEM WITH FLAT MAIL CAPABILITY

CROSS-REFERENCE TO RELATED APPLICATIONS

This application is a configuration-in-part of commonly assigned U.S. patent application, Ser. No. 09/629,007, filed Jul. 31, 2000 by Burns et al., now U.S. Pat. No. 6,501,041, which claims priority on U.S. provisional application, Ser. No. 60/146,689, filed Aug. 2, 1999 by Burns at al., and this application claims priority on commonly assigned U.S. provisional application, Ser. No. 60/328,160, filed Oct. 10, 2001 by Burns et al.; U.S. provisional application, Ser. No. 60/302,527, filed Jun. 29, 2001 by Burns et at; and U.S. provisional application, Ser. No. 60/289,329, filed May 7, 2001 by Burns et al., which are all hereby incorporated herein by reference.

FIELD OF THE INVENTION

The present invention relates generally to an article sorting method and apparatus and, more particularly, to an article sorting method and apparatus for the sortation of articles of mail. The present invention is especially adapted to sort flat mail to a delivery point sequence or carrier walk sequence, but may also apply to sort a mix of flat mail and letter mail.

BACKGROUND OF THE INVENTION

Typically, mail is received in a distribution center or warehouse from two sources. One source or type is local mail which is to be delivered within the local area. This is commonly known as turnaround mail. Local mail may also be sorted for delivery to other distribution centers. Another source or type of mail is out-of-area mail received from other distribution centers. Mail which is to be delivered locally must, ultimately, be sorted to delivery point sequence, also known as "carrier walk sequence," i.e., the mail is sorted and arranged such that the first address stop is followed by the second address stop, which is followed by the third address stop, and so on. A Dual Bar Code Sequenced (DBCS) machine is capable of achieving delivery point sequence for letter mail. However, it requires two or more passes of the mail through the same sequence.

A process exists today to delivery point sequence letter sized mail, which sorts the mail into a specific mail carrier's route sequence. The approach commonly used to sequence the letter mail requires that the mail be processed through a Letter Sorting Machine (LSM) twice. Each of these two sort processes is referred to as a pass. The first pass inducts mail, which arrives in somewhat random order, into an LSM, which arranges it into groupings of addresses. The number of discreet addresses (sequences) in each grouping depends on how many output bins of the LSM are utilized in the sorting process.

The device used to provide places to hold the mail in order is a sorting matrix, such as a grouping of slots, with each slot representing an address in the carrier's route. This sorting matrix can be as large or as small as necessary or desired. For example, a larger matrix (or number of slots) allows for a larger carrier route or more individual smaller carrier routes to be processed at one time. If an LSM contains output bins equal to the number of stops on the carrier's route, then mail for each address would be sorted to one bin. However, to be able to process more carrier routes at one time, a theoretical grouping of sorting slots is created using a specific number of LSM output bins. The number of slots is typically equal to the number of bins squared. For example, if an LSM is equipped with 10 output bins, a matrix of 100 slots can be created.

Therefore, mail for the first carrier route address or sequence may be sorted to the first assigned bin, the second address to the second bin, the third sequence to the third bin and so on to the tenth bin. The eleventh sequence may then be sorted to the first bin, the twelfth to the second bin, and so on, up to the twentieth sequence being sorted to the tenth bin. This same sorting process is repeated so that the first, eleventh, twenty first, thirty first and so on, up to and including the ninety-first sequence, are sorted into the first bin, while the second, twelfth, twenty-second, thirty-second, etc. sequences are sorted into the second bin and so on for all ten output bins.

Having completed the first sorting pass, mail is usually manually removed from the LSM and loaded onto manual carts and/or temporarily stored on shelves in racks in preparation for the second pass. The trays are then unloaded from the manual carts and the sorted articles in the trays are reprocessed during a second pass. An alternative to manual handling of the trays of mail between sort passes is disclosed in U.S. Pat. No. 5,385,243, which utilizes a storage and retrieval machine to stage the letter trays for the second pass.

For the second pass, it is absolutely essential that proper order of trays be maintained. First pass mail trays from bin number one of the first pass must be inducted into the LSM first, followed by the trays of bin number two, three and so on up to bin number ten. The current process requires machine operators to properly maintain this sequence. When inducted for the second pass, the sequences are sorted with address or sequence 1 being sorted to bin 1, sequence 11 to bin 2, sequence 21 to bin 3, and so on up to sequence 91 to bin 10. Trays of mail for the second bin (containing sequences 2, 12, 22, 32, 42, 52, and so on up to 92) are inducted and sorted such that address or sequence 2 is sorted to bin 1, sequence 12 to bin 2, sequence 22 to bin 3, etc. When the trays of mail sorted at all ten bins during the first sort pass are inducted and sorted during a second sort pass, bin 1 will contain sequences 1 through 10, bin 2 will contain sequences 11 through 20, and so on.

Accordingly, when the second sort pass is completed and the mail is removed from the LSM, it is sorted in carrier route sequence, i.e., first address stop followed by second address stop followed by third address stop, etc. The delivery point sequence sorting matrix described above is recognized as the process currently utilized for letter mail, and can be adapted to flat mail sequencing. However, as discussed above, this process requires manual handling of the trays between sort passes to ensure that the trays are in the proper order or sequence for the second sort pass.

Flat mail is mail which ranges in length from approximately 5 inches to approximately 15 inches, height from approximately 6 inches to approximately 12 inches, thickness from approximately 0.009 inches to approximately 0.75 inches, and weight from approximately 0.01 pound to approximately 1.0 pound. It may include paper envelopes, plastic wrappers, bound catalogs, banded newspapers, open mail pieces without wrappers, and the like. Such flat mail has traditionally been sorted to the distribution center level automatically, such as via a model AFSM 100 flat sorting system manufactured by Mannesmann Dematic Postal Automation and marketed in the United States by Mannesmann Dematic Rapistan Corp. The sortation from distribution center to carrier walk sequence has traditionally been performed manually utilizing pigeon-hole bins. Such manual sorting of flat mail to the delivery point sequence may take several hours, up to half of the time available for a carrier to deliver his/her route.

It would be desirable to provide a carrier walk sequence for mail, especially for flat mail. It would be most desirable if the carrier walk sequence depth of sort is accomplished automatically. It would also be desirable if the carrier walk sequence of flat mail is accomplished irrespective of the source or type of the mail. In particular, it would be desirable to be able to sort turnaround mail to carrier walk sequence.

SUMMARY OF THE INVENTION

The present invention provides a method and apparatus for sorting flat articles which is capable of automatically sorting the articles to delivery point sequence. The method and apparatus may utilize one or more flat sorting machines, whereby multiple flat sorting machines may be arranged together with a tray sorting, queuing and handling system.

According to an aspect of the present invention, an article sortation system for sorting articles to a delivery point sequence depth of sort includes at least one article sorter and a buffering assembly. The at least one article sorter has an induct and a discharge, and is operable to sort articles into a plurality of trays and discharge the trays of sorted articles at the discharge. The buffering assembly is operable to automatically sort and convey the trays containing sorted articles sorted during a first sort of the at least one article sorter from the discharge of the at least one article sorter to the induct of the at least one article sorter. The buffering assembly is operable to automatically arrange the trays in an arranged manner and convey the arranged trays to the induct of the at least one article sorter for a second sort of the articles.

The buffering assembly may include a plurality of conveyors which are cooperatively operable to arrange and accumulate trays in the sequenced manner on the buffering assembly as the trays are received from the discharge of the at least one article sorter. In one form, the plurality of conveyors includes at least one transport conveyor and a plurality of zone conveyors connected to the transport conveyor. The zone conveyors and the transport conveyor are cooperatively operable to receive trays from the at least one transport conveyor and discharge trays to the at least one transport conveyor in an appropriate order for the second sort. The plurality of zone conveyors are positioned along at least one side of the at least one transport conveyor. The at least one transport conveyor may include a plurality of transfer units, with each of the plurality of transfer units being positioned at at least one of the plurality of zone conveyors and being operable to move trays between the at least one transport conveyor and a respective at least one of the plurality of zone conveyors.

In another form, the plurality of conveyors define at least one generally continuous loop between the discharge of the at least one article sorter and the induct of the at least one article sorter. The buffering assembly is operable to circulate trays in the at least one generally continuous loop and input new trays into appropriate spaces between the circulating trays in the at least one generally continuous loop as the new trays are received from the discharge of the at least one article sorter. The at least one generally continuous loop may include at least two generally continuous loops. The at least one article sorter may then include a plurality of individual article sorting stations, with each of the at least two continuous loops being operable to convey trays received from different groups of individual sorting stations of the at least one article sorter.

Optionally, the at least one article sorter may include a first article sorter and a second article sorter. The buffering assembly may then be positioned along a return conveyor which is connected between at least one of a discharge of the first article sorter and a discharge of the second article sorter and at least one of an induct of the first article sorter and an induct of the second article sorter. The article sortation system may include a second buffering assembly connected between a discharge of the second article sorter and an induct of the second article sorter. The article sortation system may then include a connecting conveyor positioned between the buffering assembly and the second buffering assembly and between the discharges of the first and second article sorters. The connecting conveyor is operable to convey trays from the discharge of the first article sorter and/or the second article sorter to an appropriate one of the buffering assembly and the second buffering assembly. The connecting conveyor may define a generally continuous conveying loop.

Optionally, the at least one article sorter comprises a single article sorter. The buffering assembly may be operable to sort and convey the trays containing sorted articles sorted during the first sort of the article sorter from the discharge of the article sorter to the induct of the article sorter for a second sort of the single article sorter.

Optionally, the buffering assembly is positioned at a level above the at least one article sorter. The article sortation system may then include elevating devices which are operable to convey trays upward from the discharge of the at least one article sorter to the buffering assembly and downward from the buffering assembly to the induct of the at least one article sorter.

The first sortation process may resolve the address of each article, apply a pseudo identification to the article, which is retained in a control, and sort the article to trays, bins or containers. The second sortation process calls for containers from the first sortation process in a particular order and carries out a delivery point sequence sortation on the articles in those containers using the information stored in the control by the first sortation process. Preferably, the delivery point sequence sortation is to 9 zip code digits and, most preferably, to 11 zip code digits.

According to another aspect of the present invention, a method for sorting articles to a delivery point sequence depth of sort includes providing at least one article sorter having an induct and a discharge. Articles are then sorted in a first sort of the at least one article sorter into a plurality of trays. A buffering assembly is provided for automatically sorting and conveying trays containing sorted articles sorted during a first sort of the at least one article sorter. The trays of sorted articles are conveyed and arranged in an arranged manner on the buffering assembly. The arranged trays of sorted articles are conveyed to the induct of the at least one article sorter for a second sort of the articles. The articles are then sorted in a second sort of the at least one article sorter.

In one form, the method may include conveying each of the trays to an appropriate one of a plurality of zone conveyors. The trays may be cooperatively discharged from the zone conveyors in an arranged manner.

In another form, the method may include conveying the trays in a continuous loop. The trays may be generally continuously conveyed in the continuous loop. The trays may be inducted into the generally continuous loop in an arranged manner.

Optionally, the method may include providing at least two article sorters and at least two buffering assemblies. The trays may be conveyed from the discharge of one of the at least two article sorters to one of the at least two buffering assemblies. Alternately, the method may include providing a single article sorter.

According to another aspect of the present invention, a method of sorting articles to a delivery point sequence depth of sort via a first sort pass and a second sort pass of at least one article sortation assembly provides a delivery point sequencing sortation matrix. The method includes supplying articles for multiple carrier routes to an induct of the sortation assembly, and then sorting articles in a first sort pass to a first set of output bins of the sortation assembly, whereby each output bin of the first set of output bins receives articles for each of the multiple carrier routes. The sorted articles are then arranged at the induct of the sortation assembly for a second sort pass, and then sorted to a second set of output bins of the sortation assembly. The sortation matrix provides that articles from each output bin of the first set of output bins are sorted to each output bin of the second set of output bins.

The first and second sets of output bins may have a different quantity of bins associated therewith. For example, the first set may include 110 of 120 bins of the sortation assembly, while the second set may include all 120 bins, in order to maximize the number of carrier routes that the sortation matrix may sort. For carrier routes having approximately 650 stops, the sortation matrix of the present invention is capable of sorting the articles for 20 different routes to a delivery point sequence depth of sort via two sort passes through a sortation machine having 120 output bins.

According to another aspect of the present invention, a delivery point sequencing system includes a conveying assembly for automatically sorting and conveying trays containing sorted articles from a discharge of at least one sorting assembly to an induct of the at least one sorting assembly. The conveying assembly has a generally continuous conveying track and is operable to automatically provide the trays containing sorted articles to the induct of the sorting assembly in a sequenced manner.

In one form, the at least one sorting assembly includes a single sorting assembly. The conveying assembly is operable to sort and convey trays between the discharge end of the single sorting assembly to the input end of the single sorting assembly.

In another form, the at least one sorting assembly includes a first sorting assembly and a second sorting assembly. The conveying assembly is operable to sort and convey trays between a discharge end of the first sorting assembly and an induct end of the second sorting assembly.

The conveying assembly preferably includes a plurality of conveyors which are cooperatively operable to arrange trays in a sequenced manner on the conveying assembly as the trays are received from the discharge of the sorting assembly. In one form, the plurality of conveyors define at least one continuous loop between the discharge of the sorting assembly and the induct of the sorting assembly. The conveying assembly is then operable to cycle trays around the at least one continuous loop and input new trays into appropriate spaces between the cycling trays in the at least one continuous loop as the new trays are received from the discharge of the sorting assembly.

In another form, the conveyors include a plurality of zone conveyors which are operable to receive trays from and discharge trays to at least one transfer conveyor which conveys the trays to the induct of the sorting assembly. The zone conveyors and the transfer conveyor are cooperatively operable to arrange the trays in a sequenced manner on the transfer conveyor for the second sort pass.

According to another aspect of the present invention, a method of sorting mail to a delivery point sequence depth of sort includes providing at least one article sorter adapted to perform at least two sort processes to articles supplied thereto and providing at least one conveyor between a discharge of the at least one article sorter and an input of the at least one article sorter. Articles are supplied to the at least one article sortation assembly and a first sort pass is performed to sort the articles. Containers of the sorted articles are substantially continuously conveyed to arrange the containers in an arranged manner. The arranged containers are conveyed to an input of the at least one article sorter and a second sort pass is then performed to sort the articles to the delivery point sequence depth of sort. Preferably, the method includes buffering the containers on the at least one conveyor.

The at least one conveyor may be operable to automatically convey and arrange containers from a discharge of the at least one article sorter to the input of the at least one article sorter.

In one form, the method may include providing at least one continuous conveying loop between the discharge and the input of the at least one article sorter. The at least one conveyor may include at least one incoming conveyor leading from the discharge of the at least one article sorter to the at least one continuous conveying loop and at least one outgoing conveyor leading from the at least one continuous conveying loop to the input of the at least one article sorter. The method may include substantially continuously circulating containers around the at least one continuous conveying loop and inducting containers from the at least one incoming conveyor at appropriate places between the circulating containers to arrange the containers in the arranged manner. The method may provide at least two independently operable continuous loops between the at least one outgoing conveyor and the at least one incoming conveyor.

In another form, the method may provide a plurality of zone conveyors which are operable to receive containers from and discharge containers to at least one transport conveyor which conveys the containers to the input of the at least one article sorter. The containers may be cooperatively discharged from the zone conveyors in an appropriate order onto the transport conveyor to arrange the containers on the transport conveyor in the arranged manner for the second sort pass.

Optionally, the method may provide a single article sorter and convey arranged containers from the discharge of the single article sorter to the input of the single article sorter. Alternately, the method may provide first and second article sorters. Articles may be supplied to an induct of the first article sorter, and the arranged containers may be conveyed to an induct of the second article sorter. The method may provide at least two of the first article sorters, where each of the first article sorters has a throughput that is approximately one-half the throughput of the second article sorter.

According to yet another aspect of the present invention, an article sortation system for sorting articles to a delivery point sequence depth of sort includes at least two article sorters and a conveying system. Each of the article sorters includes an induct and a discharge. The article sorters are operable to sort articles into a plurality of trays and discharge the trays of sorted articles at the discharges. The conveying system is interconnected between the inducts and the discharges of the article sorters. The conveying system is operable to sort and convey trays containing articles sorted during a first sort pass of the article sorters. The conveying system is operable to automatically arrange the trays in an arranged manner and provide the arranged trays to the inducts of the article sorters for a second sort of the articles.

Preferably, the conveying system includes at least two buffering assemblies connected to the induct of a respective one of the article sorters and a conveyor assembly connected between the discharges of the article sorters and the buffering assemblies. The conveyor is selectively operable to convey trays from the discharges to an appropriate one of the buffering assemblies, where the trays are arranged and then conveyed to a respective one of the article sorters for a second sort pass through the respective one of the article sorters. The at least two buffering assemblies include a first buffering assembly connected to the induct of a first one of the at least two article sorters and a second buffering assembly connected to the induct of a second one of the at least two article sorters. Each of the first and second buffering assemblies preferably includes a plurality of conveyors which are cooperatively operable to arrange and accumulate trays in a sequenced manner on the buffering assemblies as the trays are received from the conveyor assembly.

In one form, the plurality of conveyors define at least one continuous loop between the conveyor assembly and the inducts of the first and second article sorters. The plurality of conveyors are operable to circulate trays on the at least one continuous loop and induct trays into appropriate spaces between the circulating trays in the at least one continuous loop as the new trays are received from the conveyor assembly.

In another form, the plurality of conveyors include at least one transport conveyor and a plurality of zone conveyors connected to the at least one transport conveyor. The plurality of zone conveyors and the at least one transport conveyor are cooperatively operable to convey trays from the at least one transport conveyor to the plurality of zone conveyors, and to convey trays from the plurality of zone conveyors to the at least one transport conveyor in an appropriate order for the second sort.

The conveying system may be positioned at a level above the article sorters. The article sortation system may then further include elevating devices which are operable to convey trays upward from the discharges of the article sorters to the conveyor assembly and downward from the conveyor assembly or buffering assemblies to the respective one of the inducts of the article sorters.

Preferably, the article sortation system further includes a control which is operable to determine an appropriate one of the article sorters for a second sort pass for articles in a particular tray, whereby the conveying system is operable to convey and arrange the tray for induction to the appropriate one of the article sorters in response to the control.

According to yet another aspect of the present invention, a method of sorting mail to a delivery point sequence depth of sort includes providing at least two article sortation assemblies adapted to perform at least two sort processes to articles supplied thereto. Articles are supplied to the at least two article sortation assemblies and a first sort pass is performed on the articles. The method includes determining an appropriate one of the at least two article sortation assemblies for the sorted articles to be inducted into for a second sort pass. Trays containing sorted articles sorted by the first sort pass are conveyed to arrange the trays in an arranged manner. The arranged trays are then conveyed to an input of the appropriate one of the at least two sortation assemblies. A second sort pass of the articles is performed to sort the articles to a delivery point sequence depth of sort.

Preferably, the step of conveying trays includes buffering trays of sorted mail and arranging the trays in the arranged manner. The step of buffering trays may include circulating trays around at least one continuous loop positioned between a discharge of the first sortation assembly and an induct of the second sortation assembly, and inducting containers at appropriate places between the circulating containers to arrange the containers in the arranged manner.

Optionally, the step of conveying trays of sorted articles may include conveying trays of sorted articles along at least one transport conveyor, conveying the trays to a plurality of zone conveyor connected to the at least one transport conveyor, and cooperatively discharging trays from the plurality of zone conveyors in an appropriate order onto the at least one transport conveyor to arrange the trays on the at least one transport conveyor in an appropriate order for the second sort pass.

Optionally, the step of conveying the arranged trays may include conveying the arranged trays from a discharge of the at least two article sortation assemblies to an induct of an appropriate one of at least two buffering assemblies. The step of conveying the arranged trays may then include conveying the arranged trays along a generally continuous conveyor assembly positioned between the discharge of the at least two article sortation assemblies and the at least two buffering assemblies.

According to yet another aspect of the present invention, an article sortation system for sorting articles to a delivery point sequence depth of sort includes at least one article sorter, a plurality of zone conveyors and at least one transport conveyor. The at least one article sorter has an induct and a discharge, and is operable to sort articles into a plurality of trays and discharge the trays of sorted articles at the discharge. The at least one transport conveyor is operable to convey trays from the discharge of the at least one article sorter to the induct of the at least one article sorter. The plurality of zone conveyors are positioned along the at least one transport conveyor. The at least one transport conveyor and the plurality of zone conveyors are cooperatively operable to arrange and accumulate trays in a sequenced manner on the at least one transport conveyor. The at least one transport conveyor is operable to discharge the sequenced trays to the induct of the at least one article sorter.

Preferably, the plurality of zone conveyors are positioned along at least one side of the at least one transport conveyor. The at least one transport conveyor may include a plurality of transfer units, where each of the plurality of transfer units is positioned at at least one of the plurality of zone conveyors and is operable to move trays between the at least one transport conveyor and a respective at least one of the plurality of zone conveyors.

Optionally, the at least one transport conveyor and the plurality of zone conveyors are positioned at a height above the at least one article sorter. The article sortation system may then include a tray elevating device between the discharge of the at least one article sorter and the transport conveyor and a tray lowering device between the transport conveyor and the induct of the at least one article sorter.

Optionally, the article sortation system may includes a single article sorter. Alternately, the article sortation system may include at least two article sorters.

Therefore, the present invention provides an automatic delivery point sequence apparatus and process for sequencing flat mail. The present invention provides an automated means for sorting, queuing and presenting trays of sorted articles to inducts of one or more sortation assemblies for a second sort pass of the articles. The trays may be automatically removed from their respective output bins, and automatically identified and labeled so that the trays can be provided to the inducts in the proper order. The present invention thus saves time, improves accuracy of sorting and more fully utilizes the production capacity of the flat sorting machines, especially when two or more machines are coupled together.

These and other objects, advantages, purposes and features of this invention will become apparent upon review of the following specification in conjunction with the drawings.

BRIEF DESCRIPTION OF THE DRAWINGS

FIGS. 25A and 25B are schematics of a first sort pass of a sorting matrix of the present invention; and FIGS. 26A and 26B are schematics of a second sort pass of the sorting matrix of FIGS. 25A and 25B.

DESCRIPTION OF THE PREFERRED EMBODIMENTS

Figure 1:
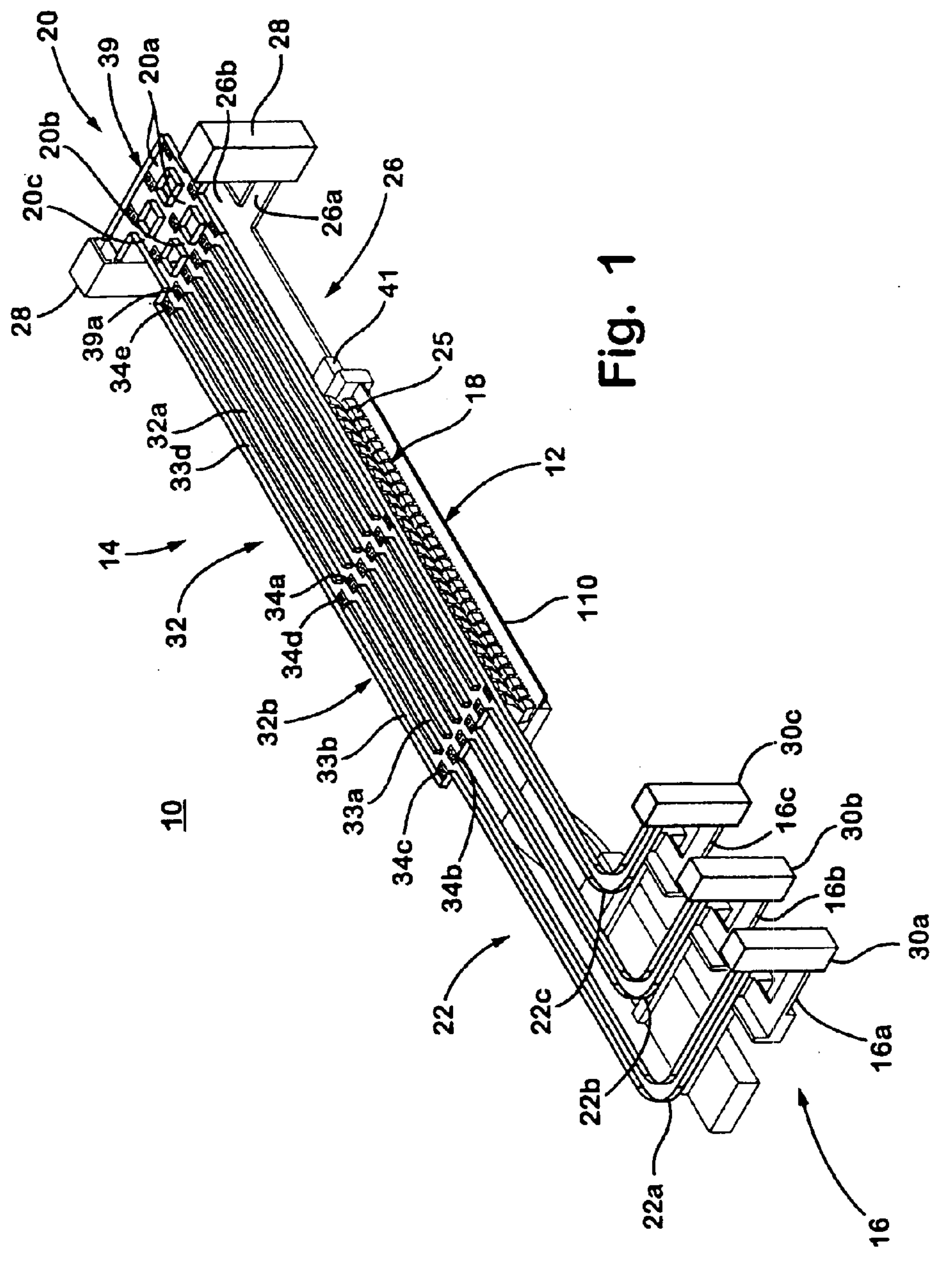
FIG. 1 is an upper perspective view of a sequencing conveyor and article sortation assembly in accordance with the present invention.

Referring now specifically to the drawings and the illustrative embodiments depicted therein, a flat article sortation apparatus or system 10 includes a sorter unit or assembly 12 and a sort conveyor or buffer assembly 14. Sorter unit 12 includes an induct end 16 and an output or discharge end 26 and a sortation mechanism, generally illustrated at 18. Buffer assembly 14 includes an induct end 20 and an output end 22, and is cooperatively interconnected between discharge end 26 and induct end 16 of sorter assembly 12. Buffer assembly 14 automatically arranges and conveys containers 25 of articles sorted by an initial sortation process of sorter assembly 12 from discharge end 26 back to induct end 16 of sorter assembly 12 in order to induct the sorted articles for further sortation by sorter assembly 12, as discussed in detail below. Accordingly, article sortation system 10 is operable to provide a delivery point or carrier route sequence depth of sort via first and second passes through sorter units 12 and via buffer 14, which provides trays containing sorted articles from the first pass to the induct end 16 of the sorter assembly 12 in a sequenced or arranged manner.

In the illustrated embodiment, sortation assembly 12 is a flat-sorting system, such as the type manufactured and marketed by Alcatel Postal Automation System and/or Mannesmann Dematic Postal Automation and/or Mannesmann Dematic Rapistan Corp. and/or Siemens Dematic Corp. under Model AFSM100. Sortation assembly 12 sorts mail received at induct end 16. An OCR-Optical Character Reader, VCS-Video Coding System (OCR/VCS) attempts to resolve the address to the full 11 digit zip code during the first pass on the sorting assembly 12. If the OCR/BCR (BCR-Bar Code Reader) cannot resolve the address to 11 digits, the VCS is used to complete the result. The address is resolved to 11 digits during the first pass. This information is retained by a high level sortation computer and used during the first and second pass operations. The OCR/VCS system connects the pseudo number with the 11 digit zip code. The sortation assembly 12 uses the 11 digit zip code to send the mail piece to the correct output during the first pass, so that it can be fed back through the second pass to be sorted to the delivery point sequence. The mail piece must be sorted correctly (using the 11 digit zip code) each pass to be properly sorted to the delivery point sequence.

Figure 3:
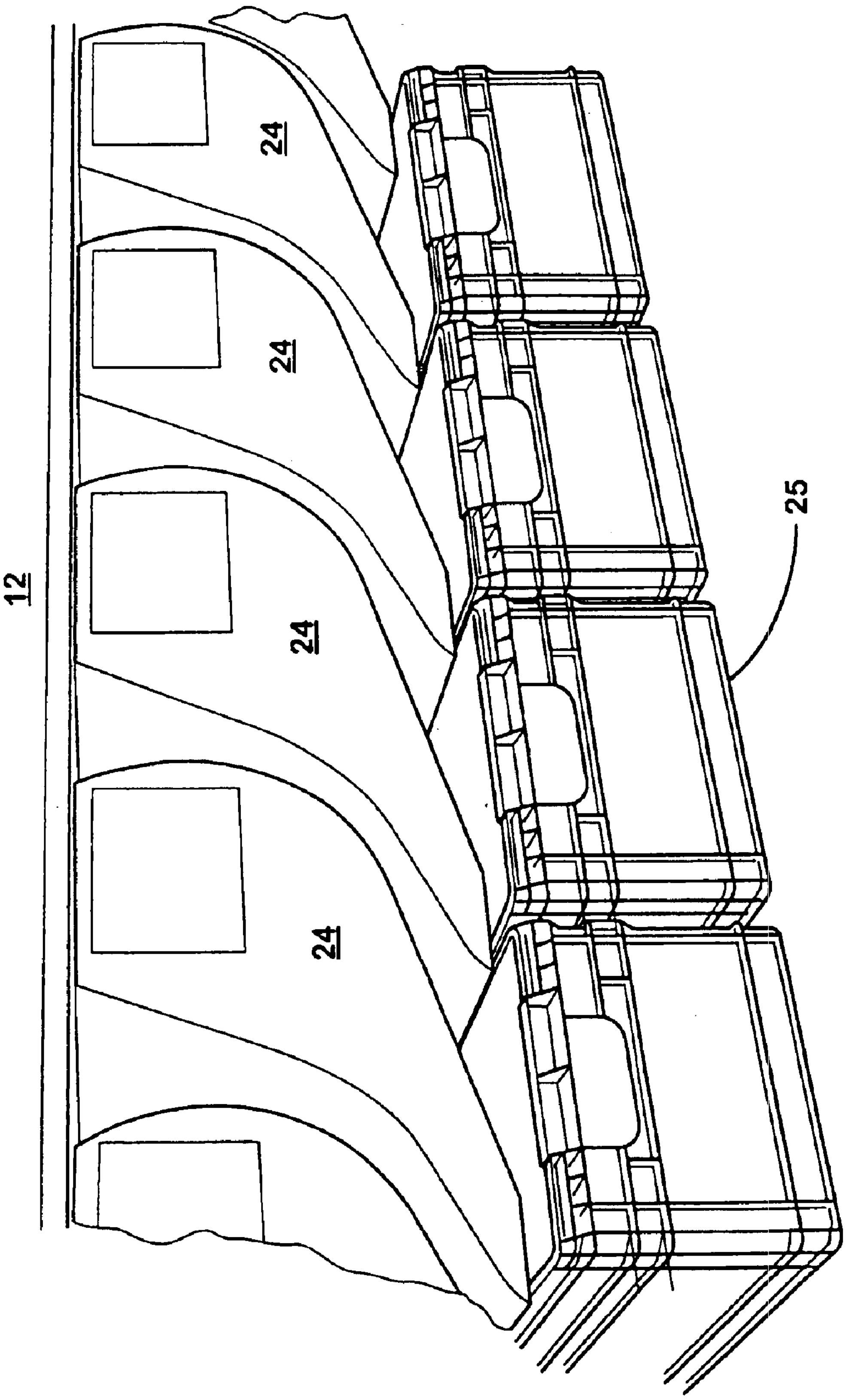
FIG. 3 is a perspective view of a plurality of sorting mechanisms useful with the present invention.
Figure 7:
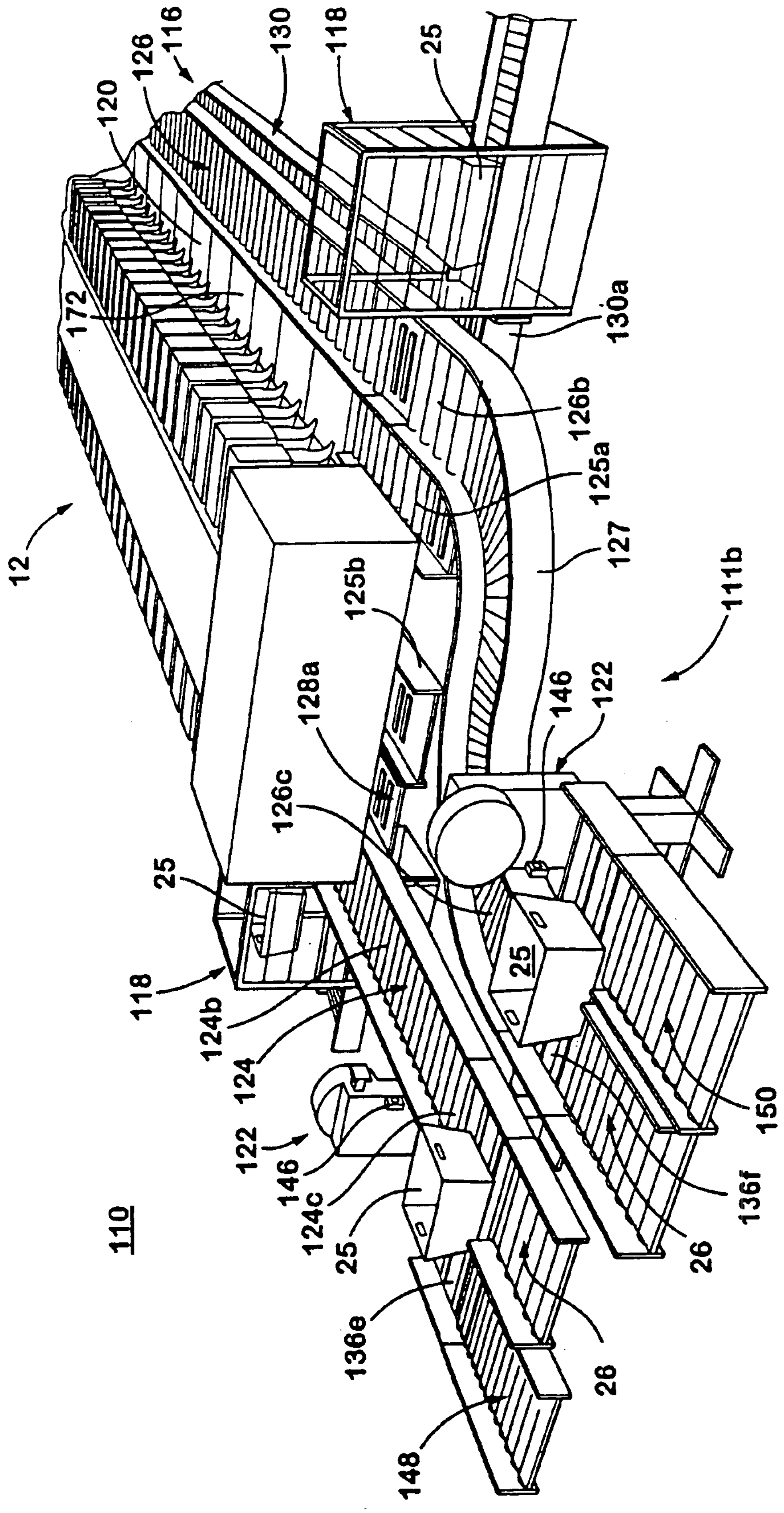
FIG. 7 is a perspective view of a tray handling system useful with the present invention.
Figure 8:
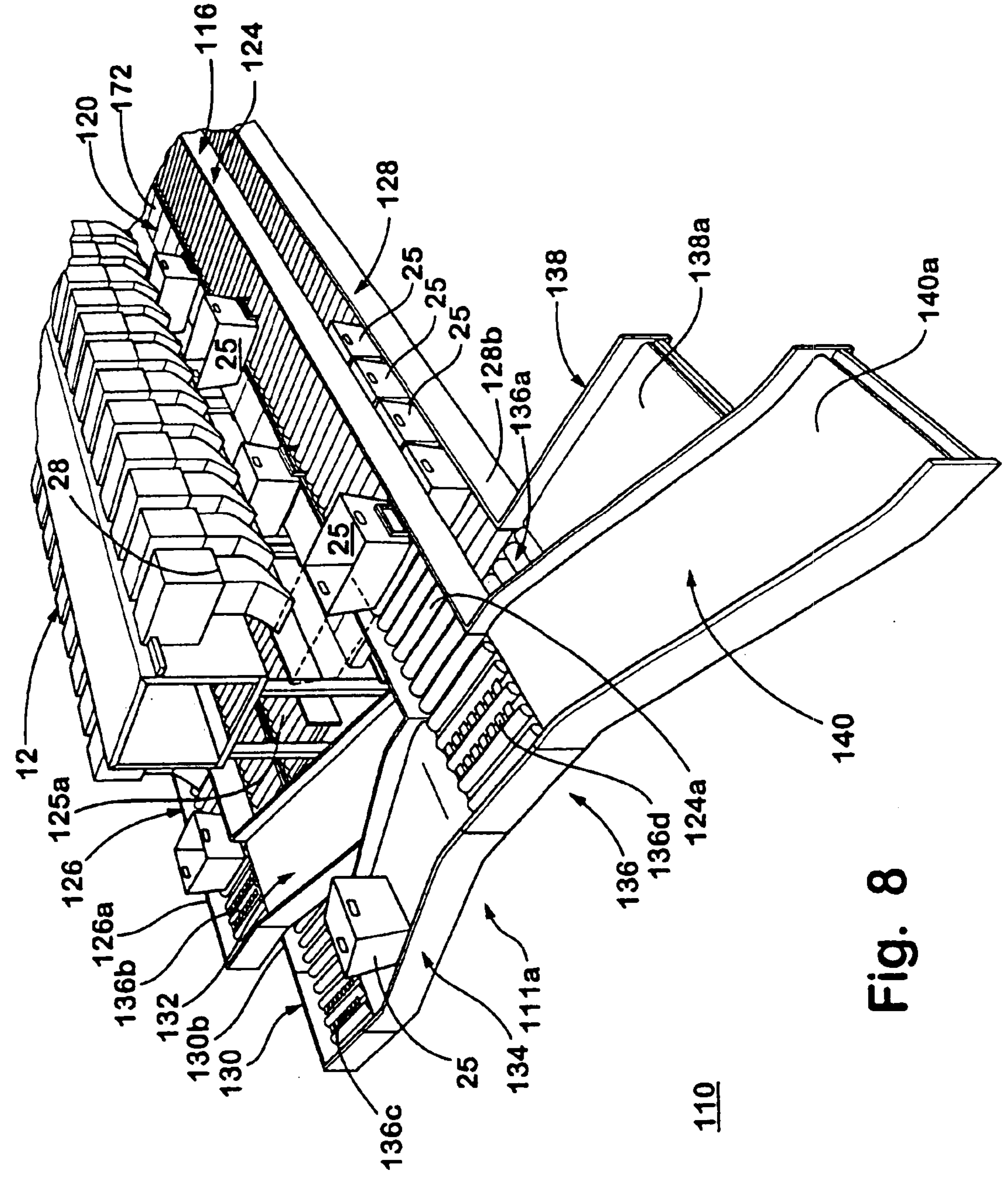
FIG. 8 is a perspective view of the tray handling system of FIG. 7 from an opposite end.

Sortation mechanism 18 includes a carousel (not shown) which deposits articles into particular chutes 24 for depositing in containers 25 positioned under the chutes (as shown in FIG. 3). After the containers or trays 25 are at least partially filled with articles, a tray handling system, such as tray handling system 110 of FIGS. 7 and 8, discharges the at least partially filled trays automatically to output end 26, which, in the illustrated embodiment, is a conveyor, such as a belt conveyor, powered roller conveyor, or the like. A preferred form of tray handling system 110 is disclosed In commonly assigned, U.S. patent application, Ser. No. 09/629,009, filed Jul. 31, 2000 by Olson et al. for AUTOMATIC TRAY HANDLING SYSTEM FOR SORTER, now U.S. Pat. No. 6,561,339, the disclosure of which is hereby incorporated herein by reference, and is illustrated in FIGS. 7 and 8 and discussed briefly below. In the illustrated embodiment, each induct end 16 includes three induct lines 16*a*, 16*b*, 16*c* and the sorter unit 12 and tray handling system have 120 bin positions, but may be extended up to 240 bins or more, depending on the application. For a 120 bin system, the three Induct lines 16*a*, 16*b*, 16*c* may randomly feed any of three groups of 40 bins during the first sort pass operation. The bins may be divided so there are three groups, such as group A, having bins 1–40 of the sortation assembly, group B, having bins 41–80 of the sortation assembly, and group C, having bins 81–120 of the sortation assembly. Sortation assembly 12 is preferably capable of sorting up to 10,000 pieces of fiat mail per hour and, most preferably, approximately 20,000 or more pieces of flat mall per hour.

The first pass through sortation assembly 12 is used by the system to determine the address information. The system must learn how many letters are to be sent to each delivery point. Note that this first pass preferably has the addresses resolved to the delivery point level (11 digits for the U.S.). During the first pass, all of the mail destined for the first delivery point of each route is sent to output or bin 1, the second delivery point to output 2, and the third to output 3, and so on. The mail is inducted into the sortation assembly by all three inducts or feeders 16 randomly. A schematic of the first pass sortation process is shown generally at 15A in FIG. 23.

After the first pass is concluded, the trays are then swept automatically from the sortation assembly 12 and sent to sorter conveyor or buffer assembly 14, and then to the induct end 16 of sortation assembly 12, but only when sortation assembly 12 calls for each particular container. The trays may be swept as disclosed in U.S. patent application, Ser. No. 09/629,009, referenced above, or via other means or processes, without affecting the scope of the present invention. For correct delivery point sequencing, output 1 is processed before output 2, which is processed before output 3, and so on. Therefore, the trays are arranged in order by sorter conveyor 14 for induction into the second pass of sorter assembly 12. During the second pass, mail for a first carrier route will be sent to bin or output 1, mail for another carrier route will be sent to output 2, and mail for yet another carrier route will be sent to output 3. This pass splits mail from the original output 1 (first delivery point regardless of route) between final outputs 1, 2, and 3. The same process is followed for original outputs 2 and 3. The mail is inducted to the sortation assembly by a particular one of the inducts or feeders which is dedicated to a particular group of 40 bins. A schematic of the second sort pass is shown generally at 15B in FIG. 24. The idea is to ensure that the delivery points in the stackers at the end of the first pass are in separate outputs at the end of the second pass.

Alternately, sortation assembly 12 may comprise a dual carousel system, such as the sortation assembly marketed by Mannesmann Dematic Postal Automation under Model TOP2000, the sortation assembly marketed by Lockheed Martin Postal Automation under Model FSM 1000 or any other flat mail sortation system. Details of one type of such sortation assemblies are disclosed in French Pat. Application Nos. 9908610, filed Jul. 5, 1999 by Fabrice Darrou, Vincent Grasswill, Alain Danjaume, entitled DISPOSITIF DE CONVOYAGE D'OBJETS PLATS AVEC UN SYSTEME D'AIGUILLAGE; 9909163, filed Jul. 15, 1999 by Jean-Luc Astier, Pierre Advani, Dino Selva, PLUSIEURS CONVOYEURS A GODETS SUPERPOSES POUR LE TRI D'OBJETS PLATS; and 9907316, filed Jun. 10, 1999 by Fabrice Darrou, Vincent Grasswill, Robert Vivant, entitled DISPOSITIF DE CONVOYAGE DE COURRIER AVEC DES ROUES EN MATIERE ELASTOMERE ELASTIQUEMENT DEFORMABLES; International Pat. Application published Jul. 6, 2000 by Francois Agier et al. as International Publication No. WO 00/39010, entitled DEVICE FOR CONVEYING FLAT OBJECTS BETWEEN PROCESSING EQUIPMENT ITEMS; and International Patent Application published Jul. 6, 2000 by Francois Agier et al. as International Publication No. WO 00/39012, entitled ROUTING DEVICE FOR GROUPING TWO STREAMS OF FLAT OBJECTS, SUCH AS MAIL ENVELOPES, INTO ONE STREAM, the disclosures of which are hereby incorporated herein by reference. Alternately, sortation assembly 12 may use the principles disclosed in U.S. Pat. No. 5,718,321, the disclosure of which is hereby incorporated herein by reference, adapted to flat mail sortation capability.

Figure 2:
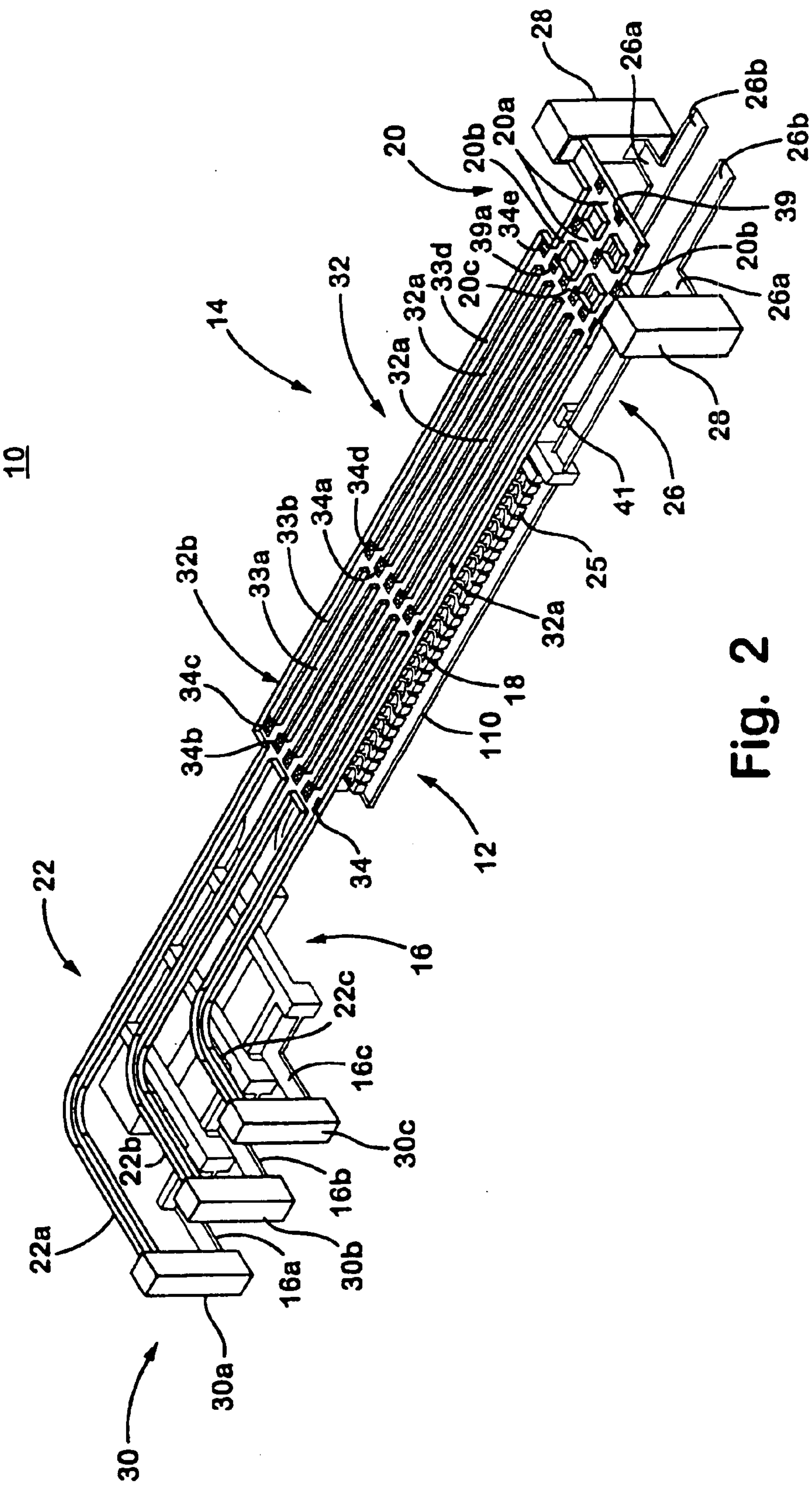
FIG. 2 is an upper perspective view from an opposite end of the sequencing conveyor and article sortation assembly of FIG. 1.

In the illustrated embodiment, buffer 14 is positioned at a height above sortation assembly 12, and thus conveys the containers or trays 30 over top of sort assembly 12 from the discharge end 26 back to the induct end 16 of sorter assembly or unit 12. As seen in FIG. 2, discharge end 26 of sort assembly 12 includes a first sort discharge 26*a* and a second sort discharge 26*b* at each side of sort assembly 12 for discharging the trays after respective first and second sort passes, as discussed below. A pair of elevating or lifting devices 28 are positioned at the first sort discharge 26*a* at each side of sort assembly 12. Each tray lifting device 28 is operable to raise trays 25 from first sort discharge 26*a* upward and onto induct end 20 of buffer 14. Tray lifting devices 28 may be any known elevating or lifting device, such as a Vertiveyor manufactured and marketed by Vertical Systems, Inc. of Walton, Ky., or a Mechanical Vertical Lift manufactured and marketed by P-flow Vertical Material Handling Systems of Milwaukee, Wis., or any other known vertical conveying or lifting device, without affecting the scope of the present invention. Optionally, as discussed below, the vertical lifting device 28 may comprise a ramped conveyor or any other means of elevating trays from first sort discharge 26*a* onto induct end 20, as discussed below.

Likewise, one or more tray lowering devices 30 may be positioned at the discharge end 22 of buffer 14, to lower the sorted or sequenced trays from discharge end 22 of buffer 14 to the induct end 16 of article sort assembly 12. In the illustrated embodiment, three lowering devices 30*a*, 30*b*, 30*c* are operable to lower trays from a respective one of three output conveyors 22*a*, 22*b*, 22*c* of buffer 14 to a respective one of three induct stations 16*a*, 16*b*, 16*c* of sort assembly 12, as discussed below. Similar to elevating devices 28, lowering devices 30 may be any known vertical lowering device or may be a ramped conveying surface or the like, without affecting the scope of the present invention. Although shown and described as being positioned generally above sort assembly 12, it is further envisioned that the sort conveyor or buffer of the present invention may otherwise be positioned elsewhere, such as alongside sort assembly 12, without affecting the scope of the present invention. Although shown and described as having three output conveying paths to three inducts, clearly, the buffer of the present invention may be adapted to sorter units having less than or more than three inducts, without affecting the scope of the present invention.

Figure 4:
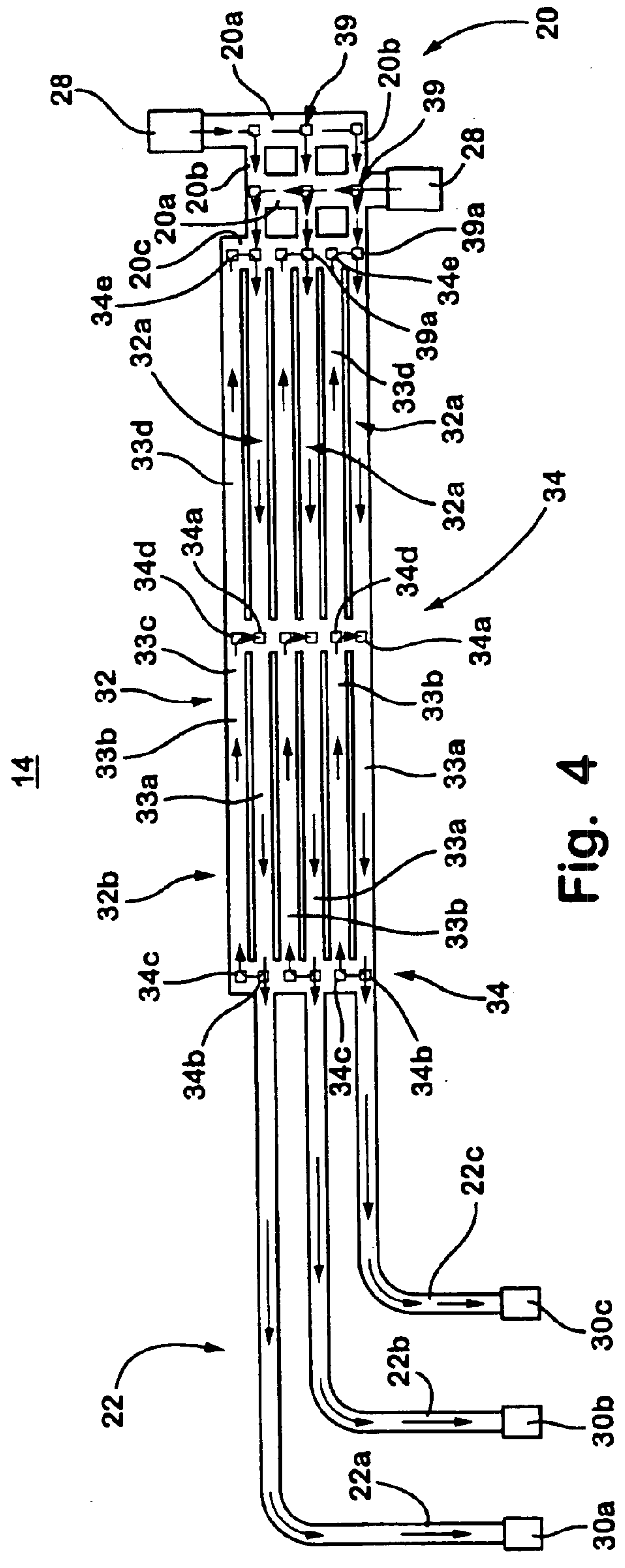
FIG. 4 is a top plan view of the sequencing conveyor of FIGS. 1 and 2.

As best shown in FIG. 4, buffer 14 includes a plurality of conveyors 32 positioned side by side one another along at least a portion of buffer 14 and between input end 20 and discharge end 22 of buffer 14. Conveyors 32 are preferably powered roller conveyors and are operable to convey the sorted trays along the conveying portions in a selected direction. However, other conveying surfaces may be utilized, such as a belt conveying surface or the like, without affecting the scope of the present invention. A plurality of 90 degree transfers or pop-up belt transfer units 34 are preferably positioned at each end of each of the plurality of conveyors 32 to change the direction of conveyance of the trays as they are conveyed along conveyors 32, as discussed in detail below. Such transfer units are commercially available and known in the art, such that a detailed discussion will not be included herein. Briefly, transfer units 34 are operable to convey a tray in a direction along the conveyor at which they are positioned, and may be operable to raise one or more belt conveyor strips or the like to convey a tray positioned at the transfer unit in a direction which is generally transverse or normal to the conveyor direction.

Conveyors 32 include a feed conveyor portion 32*a* and an accumulating or cycling conveyor portion 32*b*. In the illustrated embodiment, conveyor portions 32*a*, 32*b* provide three conveying paths from induct end 20 to a respective one of output conveyors 22*a*, 22*b*, 22*c* at output end 22, as discussed below. Induct end 20 of buffer 14 includes a pair of induction conveyors 20*a* at the tray lifting devices 28 at either side of buffer 14. Induction conveyors 20*a* extend across buffer 14 and are interconnected by a plurality of second induction conveyors 20*b* and 90 degree transfer units 39. Induction conveyors 20*a* are operable to convey the trays inducted via the vertical lifting devices 28 across buffer 14 to align each tray with an appropriate one of the three induct conveyors 20*b*, which are generally aligned with a respective or corresponding one of the feed conveying portions 32*a* of buffer 14. The 90 degree or pop-up transfer units 39 are positioned along the cross induction conveying portions 20*a* and function to convey the trays across the induction conveyors 20*a* or change the direction of conveyance of the trays onto an appropriate second induction conveyor 20*b* and toward the appropriate feed conveying portion 32*a*, as discussed below. A third cross conveyor 20*c* may extend across buffer 14 at an upstream end of feed conveying portions 32*a* to facilitate additional movement of trays across the buffer 14 and/or to facilitate operation of a larger sort loop, as discussed below. Providing separate cross conveying portions 20*a* facilitates generally continuous flow of trays from both sides of sorter unit 12 onto both sides of induct end 20 and onto and along the appropriate conveying path of buffer assembly 14, as also discussed in detail below.

Each conveying path of buffer 14 has one of the feed conveyor portions 32*a* connected to a corresponding one of the induct conveyors 20*b*, preferably via a transfer unit 39*a*. The feed conveyor 32*a* then conveys or feeds the trays from induct end 20 onto a respective one of the accumulating conveyor portions 32*b* via a transfer unit 34*a*. Each conveying path of accumulating conveyor portion 32*b* further includes a first, input conveyor 33*a* and a second, return or accumulating conveyor 33*b*, which conveys the trays in an opposite direction from the input conveyor 33*a*. A pair of transfer units 34*b*, 34*c* and 34*d*, 34*a* are positioned at opposite ends of accumulating conveyor portions 32*b*, such that the trays may be conveyed in a generally continuous loop around input conveyor 33*a* and accumulating conveyor 33*b* via 90 degree transfer units 34*a*, 34*b*, 34*c*, 34*d*. More particularly, transfer unit 34*a* is positioned at an upstream end of input conveyor 33*a* and is operable to convey trays from feed conveyor 32*a* onto input conveyor 33*a* or to transfer trays from transfer unit 34*d* onto input conveyor 33*a*. Additionally, transfer unit 34*b* is positioned at a downstream end of input conveyor 33*a* and is operable either to change the direction of or transfer the tray being conveyed along input conveyor 33*a* to the transfer unit 34*c* at an upstream end of the accumulating conveyor 33*b*, or to discharge the tray from input conveyor 33*a* onto a respective one of the output or take-away conveyors 22*a*, 22*b*, 22*c* at discharge end 22 of buffer 14. The transfer units 34*c*, 34*d* at opposite ends of the second accumulating conveyor 33*b* function to change the direction of travel of the trays at each end.

Buffer 14 is operable to convey the trays in a generally continuous loop via transfer unit 34*a*, first accumulating conveyor 33*a*, transfer units 34*b*, 34*c*, second accumulating conveyor 33*b* and transfer unit 34*d*. The trays are cycled or circulated in the loop while new trays are input into the loop at appropriate spaces between the trays being cycled. After the trays are sorted and positioned in a sequenced manner along accumulating conveyor portion 32*b*, the trays are continuously transferred from transfer unit 34*b* onto the appropriate discharge conveyor 22*a*, 22*b* or 22*c*. The discharge or take-away conveyors 22*a*, 22*b*, 22*c* convey the sorted trays from the accumulating portion 32*b* to the vertical lowering devices 30 at the discharge end 22 of buffer 14.

Accordingly, buffer 14 receives trays from the vertical lifting devices 28 and arranges the trays onto appropriate feed and accumulation conveyor portions 32*a*, 32*b*, depending on the particular sortation station at which the articles were input into the particular trays. Preferably, each of the three feed and accumulating conveyor portions 32*a*, 32*b* along buffer 14 are associated with a particular set or group of sortation stations of the sortation mechanism 18. For example, because each of the induct lines 16*a*, 16*b*, 16*c* is associated with and sorts articles for 40 of the 120 tray positions or sortation stations of sorter unit 12, the trays associated with a particular group or set of 40 of the sortation stations are conveyed to an appropriate path defined by one of the feed and accumulating conveying portions 32*a*, 32*b* and further conveyed onto the appropriate output 22*a*, 22*b*, 22*c* and lowering device 30*a*, 30*b*, 30*c* to provide the appropriate trays in an arranged or sequenced manner at the corresponding induct station 16*a*, 16*b* or 16*c* for a second pass or sort of the articles. This allows the articles within the containers after the first sortation pass to be re-input or re-inducted into an appropriate induct station and in an appropriate sequence for a second sortation process to achieve a delivery point sequence depth of sort of the articles.

During operation, articles are originally input at induct stations 16*a*, 16*b* and 16*c* of sort assembly 12 in a random manner. The articles are sorted during the first pass and discharged into containers positioned at the appropriate sortation station or bin position via the carousel and chutes of sort assembly 12. When the trays become filled or at least partially filled, they are discharged from their sortation station and conveyed toward discharge end 26 of sort assembly 12. The trays are preferably discharged from the sortation stations and conveyed along sort assembly 12 via the tray handling system such as discussed in detailed below with respect to tray handling system 110. In the illustrated embodiment of FIGS. 1 and 2, the filled or at least partially filled trays are conveyed along the conveying paths of the tray handling system to a labeler station 41, whereby the trays are identified and labeled prior to being discharged either at first sort discharge 26*a* to vertical conveying devices 28 after the first sort pass, or at second sort discharge 26*b* to the takeaway conveyor or device after the second sort pass of sort assembly 12.

After a first sort pass of sort assembly 12, the identified containers or trays are discharged at first sort discharge 26*a* and lifted upward by lifting device 28 onto induct end 20 of buffer 14. Each of the trays provided at induct end 20 are then conveyed across their respective cross induction conveying portion 20*a* until they are aligned with an appropriate one of the second induction conveyors 20*b* and feed conveyors 32*a* corresponding to their respective set of initial sortation stations of the sort assembly 12. The trays are then conveyed onto and along the appropriate feed conveyor 32*a* toward the corresponding accumulating conveying portion 32*b*. As trays are initially received by the accumulating conveyor portion 32*b*, the trays are cycled or circulated around a generally continuous loop via conveyance along the input conveying portion 33*a* and the return conveying portion 33*b* and pop-up transfer units 34*b* and 34*c*, as indicated by the arrows in FIG. 4. The trays may initially come to rest at a downstream end 33*c* of return conveying portion 33*b* to temporarily accumulate and/or buffer the trays being sorted and conveyed along buffer 14. The trays may remain at the downstream end 33*c* or elsewhere along accumulating conveying portion 32*b* until a new tray arrives at the respective feed conveyor 32*a*, whereby the trays are again cycled or circulated around the loop.

In order to properly sequence or arrange the trays for the second sortation pass through sort assembly 12, as additional trays are provided along feed conveyor portion 32*a*, the trays accumulated along second accumulating conveyor 33*b* are cycled or conveyed around the generally continuous loop via the transfer units 34*a–d* and the conveyors 33*a*, 33*b* of accumulating conveyor portion 32*b*. As the trays are conveyed from accumulating end 33*c* across transfer units 34*d*, 34*a* and onto first accumulating conveyor 33*a*, one or more of the trays being conveyed along feed conveyor 32*a* may be inducted into the loop of trays via transfer unit 34*a* at an appropriate space between adjacent or consecutive trays being cycled, such that the trays are sorted into the proper order or sequence as additional trays are provided from induct end 20 of buffer 14.

As additional trays are received and conveyed along feed conveyor 32*a*, the trays and the accumulating conveyor portions 32*b* may be generally continuously recirculated around the continuous loop, whereby the trays along feed conveying portions 32*a* are individually inducted onto accumulating conveyor portion 32*b* in the appropriate places between the circulating trays. This process continues until a sweep process is performed at the sortation unit 12 and tray handling system 110, whereby all of the filled or at least partially filled trays are removed from the sorter unit 12 and provided to the induct end 20 of buffer 14. The trays at accumulating conveying portion 32*b* are then circulated while the swept trays are individually input into the loop at their appropriate location relative to the other trays. Once the trays are fully sorted and accumulated at accumulating portion 32*b* of conveyors 32, the trays are conveyed and discharged along a respective one of the discharge conveyors 22*a*, 22*b*, 22*c* via transfer units 34*b* and then lowered to the appropriate induct station 16*a*, 16*b* or 16*c* via the respective lowering device 30*a*, 30*b*, 30*c*. The articles are then input into sorter unit 12 for a second sortation process or pass of sorter unit 12 to sort the articles to the delivery point sequence depth of sort. As the articles are sorted for the second time, they are again discharged into the trays or containers 25 via chutes 24, whereby the containers are again discharged from the sortation stations and conveyed along their conveying paths via the tray handling system. The trays are then identified at the scanning station 41 and discharged to the take-away conveyor or device at second sort discharge 26*b*.

Flat articles that have been sorted to delivery point sequence by sortation system 10 may be dispatched to a transportation system utilizing the DISPATCH SYSTEM FOR CONTAINERS OF SORTED MAIL AND METHOD THEREFOR disclosed in U.S. patent application, Ser. No. 09/600,204, filed Jul. 12, 2000 as the U.S. national phase application for International Application, Ser. No. PCT/EP99/00317, filed Jan. 21, 1999, claiming priority from U.S. provisional patent application, Ser. No. 60/072,032, filed Jan. 21, 1998, the disclosures of which are hereby incorporated herein by reference. Sortation system 10 may also utilize the principles of DOCK-TO-DOCK RECEIVING AND DISPENSING FOR A POSTAL PROCESSING CENTER disclosed in commonly assigned International Application, Ser. No. PCT/EP00/04283, filed May 10, 2000 and published Nov. 16, 2000 as International Publication No. WO 00/67922, claiming priority on U.S. provisional patent application, Ser. No. 60/133,413, filed May 11, 1999, the disclosures of which are hereby incorporated herein by reference.

Although shown and described as having the cycling and accumulating conveyor portion 32*b* separate and downstream from the feed conveyor portion 32*a*, clearly, the feed conveyor portion 32*a* may be combined with the sorting and accumulating conveying portion 32*b*, such that a larger continuous loop may be defined by the conveying portions, in order to accommodate additional trays on the sorting conveyor of the present invention. Transfer unit 34*d* then functions to convey trays in the same direction from accumulating conveyor 33*b* onto a third accumulating conveyor 33*d* alongside feed conveyor 32*a*, while a transfer unit 34*e* is positioned at a downstream end of third accumulating conveyor 33*d* and function in the same manner as transfer unit 34*d*, as discussed above with respect to the smaller continuous loop of sortation station 10. The trays inducted at induct end 16 are then input into the appropriate space between trays conveyed around the larger continuous loop at transfer unit 39*a* at the upstream end of the feed conveyor 32*a*.

Figures 5, 6:
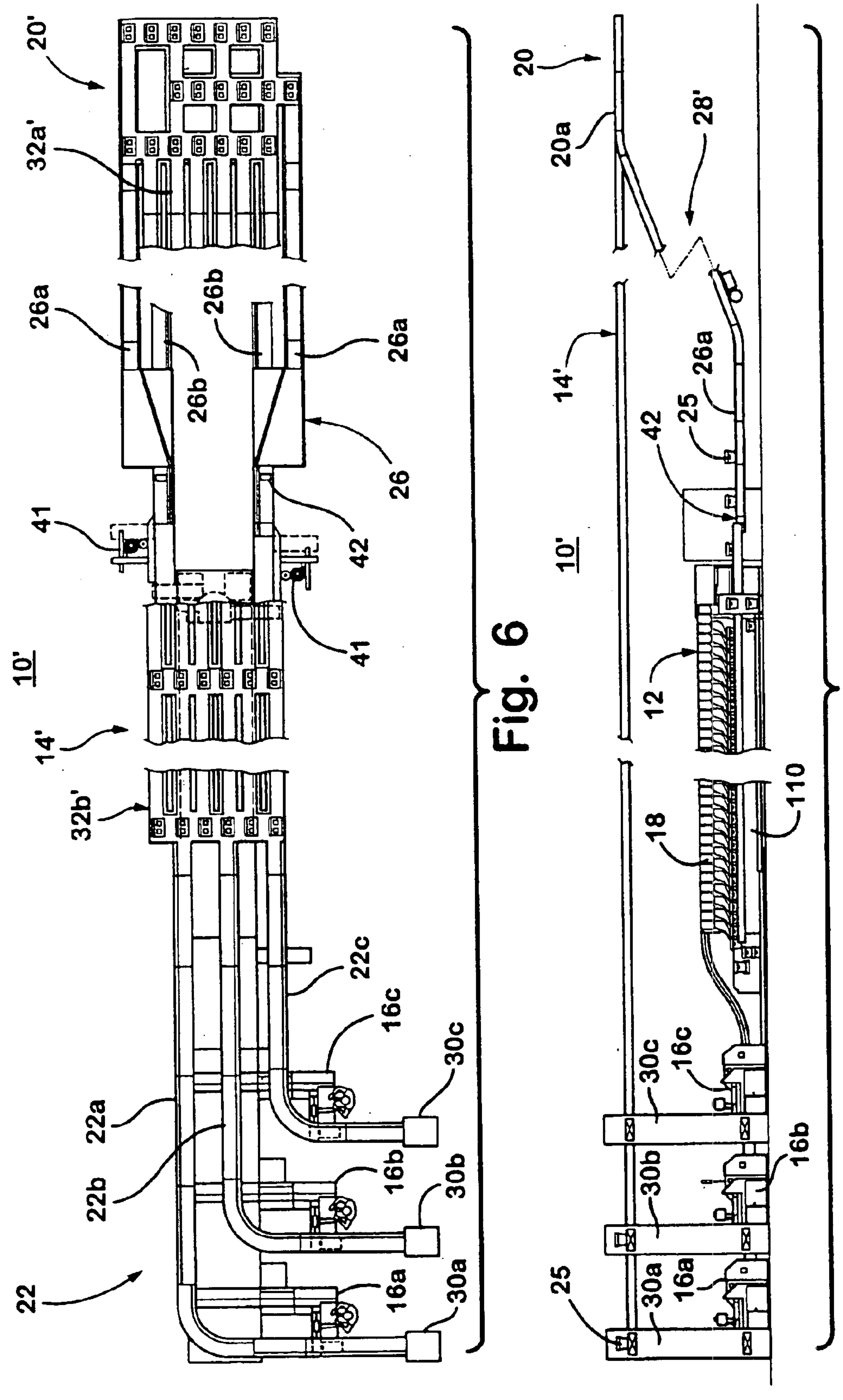
FIG. 5 is a side elevation of an alternate embodiment of a sequencing conveyor and article sortation assembly in accordance with the present invention, with conveyor ramps being configured to convey trays from a discharge end of the sortation assembly to an input end of the sequencing conveyor.
FIG. 6 is a top plan view of the sequencing conveyor of FIG. 5, with portions cut away to show the discharge end of the sortation assembly.

Referring now to FIGS. 5 and 6, an alternate embodiment of an article sortation system 10' in accordance with the present invention includes sorter unit or sort assembly 12 and a sort conveyor or buffer 14' positioned generally above sorter unit 12. As discussed above, sort assembly 12 includes induct stations 16*a*, 16*b*, 16*c*, and discharges 26*a*, 26*b*. Buffer 14' is generally similar to buffer 14, discussed above, and includes an input or induct end 20', three sort paths defined by a feed conveyor portion 32*a*' and an accumulating conveyor portion 32*b*', and a discharge end 22, which further includes three tray lowering devices 30*a*, 30*b*, 30*c* for lowering the trays from multiple discharge conveyors 22*a*, 22*b*, 22*c* to one of induct stations 16*a*, 16*b*, 16*c*, in the same manner as discussed above with respect to article sortation system 10.

As best seen in FIG. 5, discharge 26*a* of sort assembly 12 is connected to a vertical lifting or conveying device 28', which comprises a ramped or inclined conveying surface which is operable to convey articles upward and along the conveying surface from discharge 26*a* onto cross induction conveyors 20*a* at induct end 20 of buffer 14', similar to the vertical lifting devices 28 of sortation system 10, discussed above. Because the inclined ramps 28' extend further from the discharge 26*a* of sortation assembly 12, buffer 14' extends further along above sort assembly 12 than buffer 14, discussed above. However, buffer 14' is otherwise generally identical to buffer 14, discussed above, such that a detailed discussion of the sorter conveyor will not be repeated herein.

Prior to discharging the containers after the first sortation pass onto the inclined conveying surface of inclined conveyor 28', discharge 26*a* of sort assembly 12 may further include a rotator or rotating device 42, which is operable to rotate the trays or containers for proper orientation with respect to the inclined conveying surface. Preferably, the trays are rotated at rotating device 42 so they are conveyed lengthwise upward and along inclined conveyor 28'. The trays are then conveyed up the inclined conveying surface and onto cross induction conveyors 20*a*, where they are conveyed across induct end 20 of buffer 14' and into alignment with the appropriate feed conveyor portion 32*a*' and accumulating conveying portion 32*b*' of buffer 14', in the same manner as discussed above with respect to buffer 14. The inclined conveyors 28' may comprise any conveying means, such as powered roller conveyors, belt conveyors or the like, and may include means for limiting slippage of the trays as they are conveyed upward, such as ridges, platforms or the like, which move along or with the conveying surface to support the trays as they are conveyed therealong, without affecting the scope of the present invention.

Optionally, other buffering assemblies may be implemented to buffer or temporarily store trays or containers between sort passes of one or more sorter units, in order to provide the trays for the second sort pass in a sequenced or arranged manner. For example, a vertical carousel buffer or a horizontal carousel buffer may be implemented between the discharge of at least one sorter unit and an induct of the sorter unit or another sorter unit, without affecting the scope of the present invention.

Therefore, the present invention provides an article sortation apparatus or system which is operable to automatically arrange or sequence trays of sorted material to an appropriate order or sequence for re-induction into the sorter unit for a second sortation process or sort pass, in order to achieve a delivery point sequence depth of sort of the articles. The present invention provides a buffer assembly which functions as a random access accumulator and temporarily stores or accumulates trays and facilitates providing the trays to an induct of a sorter in an arranged or sequenced manner. Preferably, the buffer functions to cycle or circulate trays containing the sorted articles in a generally continuous loop, while additional trays are input into appropriate spaces between the trays being cycled until the trays cycled and accumulated on the sorter conveyor or buffer are in the proper order or sequence. The trays are then automatically conveyed to the appropriate induct station of the sorter unit, whereby the articles are re-inducted into the sorter unit for the second sortation process. Accordingly, trays discharged from the sortation unit following the second sort process contain articles which have been twice sorted and are thus sorted to a delivery point sequence or carrier walk sequence.

An example of a tray handling system or nay management system 110 that is useful with the present invention is illustrated in FIGS. 7 and 8 and disclosed in commonly assigned U.S. patent application, Ser. No. 09/629,009, filed Jul. 31, 2000 by Olson et al. for AUTOMATIC TRAY HANDLING SYSTEM FOR SORTER, now U.S. Pat. No. 6,561,339, which is hereby incorporated herein by reference. However, other tray management systems, including ones that are manual or semi-automatic, can be used, without affecting the scope of the present invention. For example, an automatic tray handling system which automatically destacks and loads empty trays onto a conveyor to provide empty trays to the sorter unit or wilts may be implemented with the delivery point sequencing sortation system of the present invention. Such a tray handling system is disclosed in commonly assigned U.S. provisional application, Ser. No. 60/275,789, filed Mar. 14, 2001 by Schiesser et al. for TRAY DESTACKER, U.S. Provisional Application, Ser. No. 60/297,516, filed Jun. 12, 2001 by Schiesser et al. for TRAY DESTACKER, and U.S. patent application, Ser. No. 10/095,829, filed Mar. 12, 2002 by Schiesser et al. for TRAY DESTACKER, now U.S. Pat. No. 6,846,153 (Attorney Docket RAP04 P-624B), which are all hereby incorporated herein by reference.

Automatic tray handling system 110 includes a plurality of conveying surfaces 116, which are operable to move the trays 25 along one or both sides of the sorter unit or sort assembly 12. A plurality of tray moving devices 120 are operable at respective sorter stations of sort assembly 12 to pull empty trays onto a tray support 172, which supports the empty tray while the sort assembly discharges sorted mail into the tray. After the tray is at least partially filled by the sort assembly, the tray moving device 120 is then operable to move the at least partially filled tray back onto the conveying surface. A continuous supply of empty trays is provided to the sort assembly 12, and filled or at least partially filled trays are automatically discharged from the sorter units onto the conveying surface 116.

An input end 111*a* (FIG. 8) of tray handling system 110 preferably provides one or more tray induct stations 138 and 140 for loading or inducting empty trays onto the tray handling system, while a discharge end 111*b* (FIG. 7) of tray handling system 110 provides a downstream operation, such as a labeling station 122, which is operable to label the trays as they are discharged from tray handling system 110 to output 26. As can be seen in FIG. 2 and discussed above, the discharge end 111*b* may provide a first pass discharge 26*a* to the induct 20 of the sequencing conveyor of buffer or sequencing assembly 14, and a second pass discharge 26*b*, which discharges trays to a discharge or take-away conveyor or device (not shown) after the articles have been sorted to the delivery point sequencing depth of sort. The sorter unit 12 may each be arranged in a pair of rows, and the conveying surfaces 116 of automatic tray handling system 110 may extend around both sides of the rows of sorter unit 12. However, the tray handling system 110 could be used with a single side of a mail sortation system which has one or more rows of sorter units. Empty trays 25 are movable in a continuous loop via conveying surfaces 116 and a pair of vertical tray moving or tray return devices 118 at one end of the tray handling system.

Conveying surface 116 includes a plurality of conveying surfaces. More particularly, conveying surface 116 preferably includes a pair of opposite upper conveyors 124 and 126, a pair of opposite lower conveyors 128 and 130 and a pair of tray moving or return devices, such as inclined or connecting surfaces or ramps 132 and 134, which are operable to move empty trays from lower conveyor 128 to upper conveyor 126 and from lower conveyor 130 to upper conveyor 124, respectively, at input end 111*a*. A pop-up transfer unit or 90 degree transfer unit 136 is positioned at each end of the incline ramps 132 and 134 to change the direction of travel of the trays 30 as they move from one of the lower conveyors to the respective incline ramp, and from the incline ramp to the respective upper conveyor. Transfer units 136 are operable to convey a tray in a direction along the conveyor at which they are positioned, and may be operable to raise one or more belt conveyor strips to convey a tray positioned at the transfer unit in a direction which is generally transverse or normal to the conveyor direction, similar to transfer units 34 and 39, discussed above.

Incline ramp 132 is connected between a pair of 90 degree transfer units 136*a* and 136*b* at a downstream end 128*b* of lower conveyor 128 and an upstream end 126*a* of upper conveyor 126, respectively. Similarly, incline ramp 134 is connected between a pair of 90 degree transfer units 136*c* and 136*d* at a downstream end 130*b* of lower conveyor 130 and an upstream end 124*a* of upper conveyor 124, respectively.

Lower conveyors 128 and 130 are preferably operable in a reverse direction from upper conveyors 124 and 126, to return the empty trays back toward input end 111*a*. The 90 degree transfer units 136*a* and 136*c* are positioned at downstream ends 128*a* and 130*a* of conveyors 128 and 130, respectively, to move the empty trays onto the respective incline ramps 132 and 134 to transport the trays to the upper conveyors 124 and 126, respectively, at the other side of the sortation system 12. In order to provide a continuous loop for the empty trays about the conveyor surfaces 116, vertical tray moving devices 118 are positioned at downstream ends 124*b*, 126*b* of upper conveyors 124, 126 and upstream ends 128*a*, 130*a* of lower conveyors 128, 130. Each vertical tray moving device 118 is operable to move an empty tray from the respective upper conveyor 124, 126, lower the tray to the level of the lower conveyors 128, 130, and then move the tray onto the respective lower conveyor 128, 130.

Tray induct stations 138 and 140 are preferably positioned side by side one another. Preferably, tray induct stations 138 and 140 preferably include belt conveyors, which are operable to transport or convey an empty tray onto a corresponding 90 degree transfer unit 136*a* and 136*d*, respectively. Empty trays may be manually loaded onto the induct stations to induct the empty trays into the conveyor system 116 of the automatic tray handling system 110 or may be automatically fed from a tray return conveyor 125*a*, 125*b*. Preferably, tray induct station 140 includes an inclined belt conveyor, such that an input end 138*a* and 140*a* of each of the induct stations 138 and 140, respectively, is positioned at substantially the same level for easy access and loading of empty trays onto the induct stations 138 and 140.

Trays 25 are conveyed along upper conveying surfaces 124 and 126 toward downstream ends 124*b* and 126*b*, respectively. Vertical tray moving devices 118 are positioned near or at the downstream ends 124*b* and 126*b* to remove empty trays from the upper conveyors and move the empty trays onto an upstream end 128*a* and 130*a* of the lower conveyors 128 and 130, respectively, as discussed in detail below. Labeling stations 122 may be positioned at or near a discharge end 124*c* and 126*c* of upper conveyors 124 and 126, respectively, and are operable to label the filled trays as they are conveyed toward output 26 of automatic tray handling system 110. Optionally, one or both of the upper conveyor surfaces included a curved section 127, such that the discharge ends 124*c* and 126*c* of upper conveyors 124 and 126, respectively, may be in close proximity, in order to reduce the manual labor of the system. However, as shown in FIG. 2, the discharge ends of the upper conveyors may be positioned at opposite sides of sort assembly 12 for discharge of trays onto respective vertical tray lifting devices or the like. A scanner 146 may be positioned at output end 26 to verify the information contained on the label applied to the trays. A pair of reject conveyors 148 and 150 may be provided adjacent to discharge ends 124*c* and 126*c*, respectively, to allow incorrectly labeled trays to be discharged to a separate area via respective 90 degree transfer units 136*e* and 136*f* and reject conveyors 148 and 150.

Figure 9:
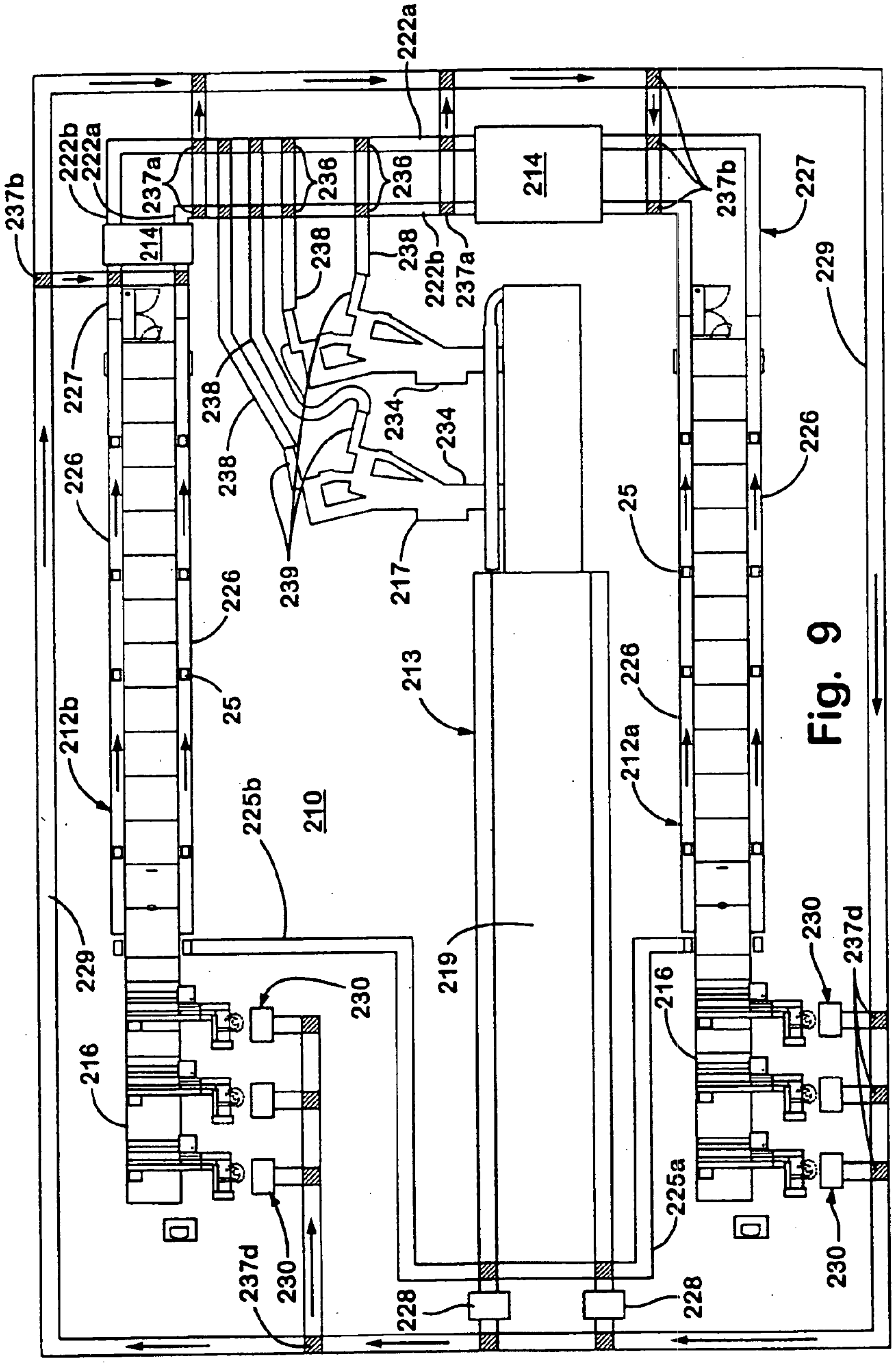
FIG. 9 is a top plan view of an alternate flat article sortation apparatus according to the present invention.
Figure 10:
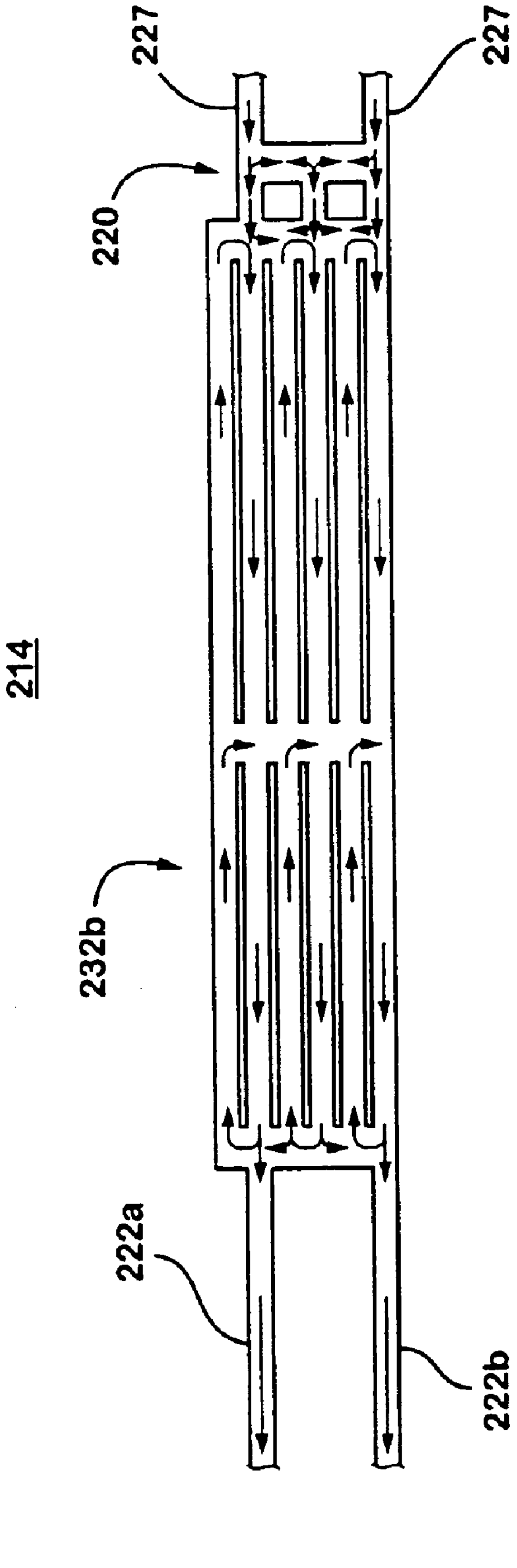
FIG. 10 is a top plan view of a sequencing conveyor useful with the sortation apparatus of FIG. 9.
Figure 11:
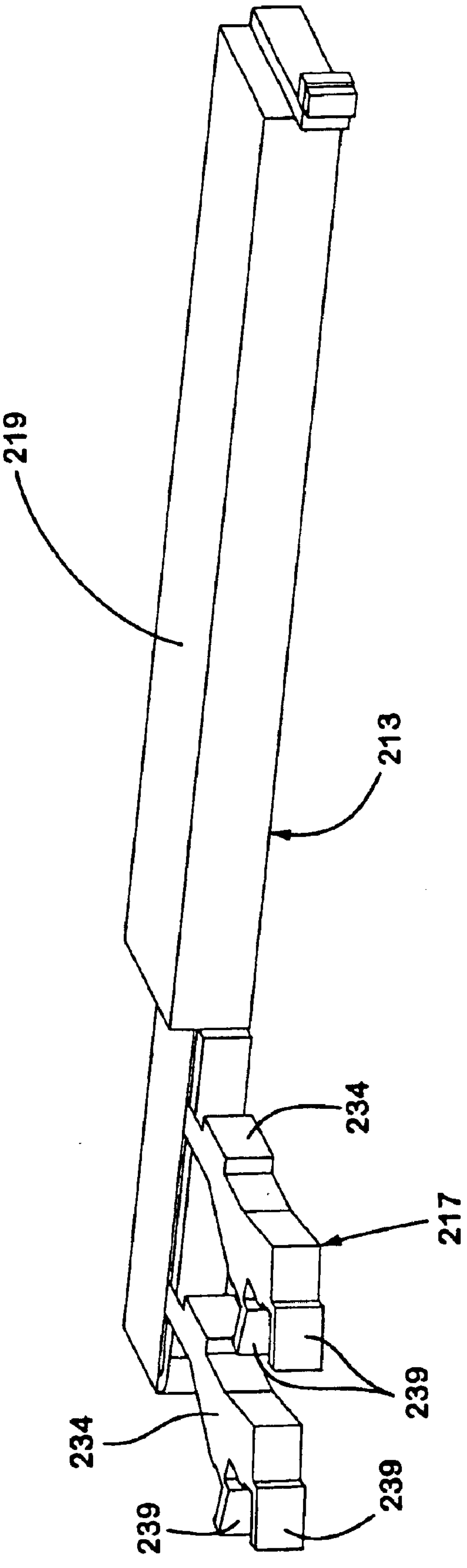
FIG. 11 is a perspective view taken generally from the direction XI—XI in FIG. 9.

Referring now to FIGS. 9–11, an article sortation apparatus or system 210 includes primary sort assemblies 212*a* and 212*b* and a delivery point sequence (dps) sort assembly 213, which is connected to sort assemblies 212*a*, 212*b* by respective sequencing or sorting conveyors or buffer assemblies, shown generally at 214 in FIG. 9. Such an arrangement of sortation assemblies is disclosed in commonly assigned U.S. patent application, Ser. No. 09/629,007, filed Jul. 31, 2000 for DELIVERY POINT SEQUENCING MAIL SORTING SYSTEM WITH FLAT MAIL CAPABILITY, now U.S. Pat. No. 6,501,041, which claims priority on U.S. provisional application, Ser. No. 60/146,689, filed Aug. 2, 1999, and in U.S. provisional applications, Ser. No. 60/289,329, filed May 7, 2001; Ser. No. 60/302,527, filed Jun. 29, 2001; and Ser. No. 60/328,160, filed Oct. 10, 2001, which are all hereby incorporated herein by reference. Each sort assembly 212*a*, 212*b* includes an induct 216 and a sortation mechanism generally illustrated at 218. Sort assembly 213 includes an induct 217 and a sortation mechanism 219 induct 217 preferably includes four feeder conveyors or spurs 238 with a tray unloader (not shown) at each induct station 239 at each spur 238. Buffer assemblies 214 interconnect outputs 226 of sortation assemblies 212*a*, 212*b* with induct 217 of sortation assembly 213 via one or more transfer switches 236 and spurs 238. The purpose of buffer assemblies 214 is to automatically arrange and convey containers of articles sorted by Initial sortation assemblies 212*a*, 212*b* from discharge 226 of sort assemblies 212*a*, 212*b* to induct 217 of sort assembly 213, in order to induct the sorted articles for future sortation by subsequent sortation assembly 213, similar to buffer 14, discussed above.

Similar to sort assembly 12 discussed above, sort assemblies 212*a* and 212*b* are operable to sort articles or mail received at induct 216. The sort assemblies 212*a*, 212*b* may be any known sortation unit or system, such as the flat sorting system marketed by Alcatel Postal Automation System, Mannesmann Dematic Postal Automation, Mannesmann Dematic Rapistan Corporation, Solystic and/or Siemens Dematic Corp. under Model AFSM100 or the like. Clearly, sort assemblies 212*a*, 212*b* may otherwise be any other sortation assembly, such as the sortation assembly marketed by Lockheed Martin Postal Automation under Model FSM 1000 or any other flat mail sortation system, without affecting the scope of the present invention. The sortation assemblies may even be a dual carousel system, such as the sortation assembly marketed by Mannesmann Dematic Postal Automation, Solystic and/or Siemens Dematic Corp. under Model TOP2000.

Sort assemblies 212*a*, 212*b* are operable to resolve the address of the mail to eleven digits during the sortation process. Also, similar to sort assembly 12, discussed above, trays are discharged in a generally random manner from sort assembly 212*a*, 212*b* at discharge end 226 of sort assembly 212*a*, 212*b*. The trays are then conveyed along conveying portions 227 and onto an induct end 220 of buffer 214 (FIG. 10), where the trays are arranged or sorted prior to induction into the second sorter unit 213 in a manner similar to that discussed above with respect to sortation apparatus 10.

Preferably, sort assembly 213 is capable of sorting up to 20,000 flat articles per hour and, most preferably, up to approximately 40,000 flat articles per hour, or more. Preferably, sort assembly 213 has a sort rate that is approximately double the sort rate of each sort assembly 212*a*, 212*b* for reasons that are set forth in more detail below. For example, in the illustrated embodiment, sort assembly 213 is a dual-carousel system having 300 or more bins marketed by Mannesmann Dematic Postal Automation under Model TOP2000. Mail can be sorted to each of the bins from either of the dual carousels as fed by each of the spurs 238 and the dual induct lines 234. Details of sort assembly 213 of the illustrated embodiment are disclosed in French Pat. Application Nos. 9908610, filed Jul. 5, 1999 by Fabrice Darrou, Vincent Grasswill, Alain Danjaume, entitled DISPOSITIF DE CONVOYAGE D'OBJETS PLATS AVEC UN SYSTEME D'AIGUILLAGE; 9909163, filed Jul. 15, 1999 by Jean-Luc Astier, Pierre Advani, Dino Selva, entitled DISPOSITIF A PLUSIEURS CONVOYEURS A GODETS SUPERPOSES POUR LE TRI D'OBJETS PLATS; and 9907316, filed Jun. 10, 1999 by Fabrice Darrou, Vincent Grasswill, Robert Vivant, entitled DISPOSITIF DE CONVOYAGE DE COURRIER AVEC DES ROUES EN MATIERE ELASTOMERE ELASTIQUEMENT DEFORMABLES; Published International Pat. Application WO 00/39010, published Jul. 6, 2000 by Francois Agier et al., entitled DEVICE FOR CONVEYING FLAT OBJECTS BETWEEN PROCESSING EQUIPMENT ITEMS; and Published International Patent Application WO 00/39012, published Jul. 6, 2000 by Francois Agier et al., entitled ROUTING DEVICE FOR GROUPING TWO STREAMS OF FLAT OBJECTS, SUCH AS MAIL ENVELOPES, INTO ONE STREAM, the disclosures of which are hereby incorporated herein by reference. Alternately, sort assembly 213 may use the principles disclosed in U.S. Pat. No. 5,718,321 adapted to flat mail sortation capability, the disclosure of which is incorporated herein by reference. A tray return conveyor 225*a*, 225*b* returns empty trays from the dps sortation assembly 213 to a respective primary sort assembly 212*a*, 212*b*, while full trays containing sorted mail are discharged to a takeaway conveyor or the like (not shown), or to a return or loop conveyor 229, as discussed in detail below.

As containers or trays are dispatched from sort assemblies 212*a* and 212*b* according to the sort plan, they are buffered, sorted and discharged by buffer 214 toward induct 217 of sortation assembly 213. As shown in FIG. 10, buffer 214 may be substantially similar to buffer 14, discussed above, and may include one or more circulating and accumulating conveying portions or loops 232*b* for circulating trays therearound. Alternately, the buffer assembly may include a vertical carousel buffer or a horizontal carousel buffer or other buffering assemblies or systems, without affecting the scope of the present invention.

Because buffer 214 is substantially similar to buffer 14, discussed above, a detailed description of the buffer will not be repeated herein. Suffice it to say that the trays are circulated and sorted about one or more continuous loops at accumulating conveying portions 232*b* of buffer 214 until all of the trays have been swept from the sorter units 212*a*, 212*b* and inducted into buffer 214. The trays are then discharged from accumulating conveying portion 232*b* onto a single discharge conveyor or onto two or more discharge conveyors, such as two discharge conveyors 222*a* and 222*b*, for conveying trays toward the induct of sortation assembly 213. Each loop of accumulating conveying portion 232*b* may sequentially discharge all of its trays in order onto discharge conveyors 222*a* and/or 222*b*, such that all of the ordered or sequenced trays from one loop are discharged first, all the trays from another loop are discharged second and so on. In the illustrated embodiment with three loops and two discharge conveyors, all of the trays from one loop may be discharged onto one discharge conveyor 222*a*, all of the trays from another loop may be discharged onto the other discharge conveyor 222*b*, and the trays from the third loop may be split, with a portion of the trays being discharged in an appropriate sequence or order on each of the discharge conveyors 222*a*, 222*b* before or after the other trays from the other loops. The trays may then be conveyed along discharge conveyors 222*a*, 222*b* toward a series of transfer switches 236.

Transfer switches 236 selectively transfer the trays or containers onto spurs 238 leading to induct 217 via induct stations 239. Transfer switches 236 are operated in coordination with the overall sortation plan in order to stage the containers at induct stations 239 in a sequence called for by sortation assembly 213. Optionally, other transfer switches 237*a* may discharge trays from buffer 214 onto a return or loop conveyor 229, which conveys the sorted or sequenced trays back to the induct 216 of sorter units 212*a*, 212*b* for a second sort pass through sorter units 212*a*, 212*b*. In the illustrated embodiment, return conveyor 229 conveys trays from transfer switches 237*a* to transfer switches 237*d* and further toward induct 216 of sorter units 212*a*, 212*b*. Such a return conveyor facilitates two or more sort passes through the first sorter units 212*a*, 212*b* and/or one or more sort passes through the first sorter units 212*a*, 212*b*, followed by a sort pass through the second sorter unit 213.

Optionally, return conveyor 229 may also or otherwise be connected between transfer switches 237*c* at the discharge of sorter unit 213 and transfer switches 237*b* at the induct end 227 of buffers 214, in order to facilitate multiple sort passes of the sorter unit 213 to further sort and consolidate the sorted mail. Although shown as having a buffer at the discharge end of each sorter unit 212*a*, 212*b*, optionally, or additionally, a single buffer assembly may be positioned between the discharge of each of the sorter units 212*a*, 212*b* and 213 and the induct to each of the sorter units 212*a*, 212*b* and 213, in order to facilitate multiple sort passes through one or more of the sorter units 212*a*, 212*b*, 213, without affecting the scope of the present invention.

The buffers 214 and/or the return conveyor 229 may be elevated above the level of sorter units 212*a*, 212*b*, such that one or more tray lowering devices 230 may be positioned at inducts 216 of sorter units 212*a*, 212*b* to lower the trays from return conveyors 229 to inducts 216, similar to tray lowering devices 30, discussed above. Additionally, one or more tray raising devices 228 may be positioned at the discharge of sorter unit 213 to raise the trays upward onto return conveyor 229 via transfer switches 237*c*. However, clearly, buffers 214 and/or return conveyors 229 may be positioned elsewhere or at the same level of sorter units 212*a*, 212*b*, 213, such that the tray raising and/or lowering devices are not required, without affecting the scope of the present invention. As discussed above with respect to tray raising and lowering devices 28, 30, the tray raising and lowering devices 228, 230 may alternately comprise inclined or ramped conveyors or the like, depending on the application.

Accordingly, return conveyor 229 may convey full or at least partially filled trays being discharged from sorter unit 213 to buffers 214 via tray raising devices 228, and transfer switches 237*c*, 237*b*. The partially filled and sorted trays may then be inducted to sorter unit 213 for a second sort pass therethrough. Additionally, return or loop conveyor 229 may convey at least partially filled trays from buffers 214 to the induction 216 of sorter units 212*a*, 212*b* via transfer switches 237*a* and tray lowering devices 230. The at least partially filled trays from either sorter units 212*a*, 212*b* and/or sorter unit 213 may thus be sorted and sequenced by buffers 214 and then inducted into one of the sorter units 212*a*, 212*b* or 213 for an additional sort pass, depending on the application. This allows for multiple sort passes through one of the sorter units or through a combination of two or more of the sorter units, in order to automatically further sort the mail after a first sort pass through one of sorter units 212*a*, 212*b* or even sorter unit 213.

In the illustrated embodiment of FIG. 9, the first pass primary sortation assembly 212*a*, 212*b* is used by the system to determine the address information. The system determines how many letters are to be sent to each delivery point. The first machine, in addition to discovering address and mail piece information, starts the sorting process. Note that the address is resolved to the delivery point level (11 digits for the U.S.) for the first pass. During the first pass, all of the mail destined for the first delivery point of each route is sent to output 1, the second delivery point to output 2, and the third to output 3, etc. After the first pass is concluded, the trays are then swept automatically from the sort assembly 212*a*, 212*b* and sent to sort assembly 213 via buffer 214, but only when sort assembly 213 calls for each particular container. For correct delivery point sequencing, output 1 is processed before output 2, which is processed before output 3, and so on. Therefore, the trays are arranged in order by buffer 214 for induction into second sorter assembly 213. During this second pass, mail for a first carrier route is sent to output 1, mail for another carrier route is sent to output 2, and mail for yet another carrier route is sent to output 3, and so on. This pass splits mail from the original output 1 (first delivery point regardless of route) between final outputs 1, 2, and 3. The same process is followed for original outputs 2 and 3. The idea is to ensure that the delivery points in the stackers at the end of the first pass are in separate outputs at the end of the second pass.

As would be apparent to the skilled artisan, article sortation system 210 is capable of sorting turnaround mail, which is mail collected in a local area in which sortation system 210 is located, and sorting the mail to the delivery point sequence at the output of sort assembly 213. Additionally, mail received in the mail preparation area may be placed in one or more compartments in trays 25 and conveyed in the rigid plastic containers or trays 25 to the inducts 216 of sort assemblies 212*a*, 212*b* for an initial sort pass of the mail through the sort units or assemblies.

Each piece of mail is identified efficiently (to 11 digits) on the first pass, such as by using OCR/VCS and a spray-on PSEUDO ID# (or other means of application as may be more technically prudent, such as a printed and applied label, an RF tag, or the like). Each of the sort assemblies 212*a*, 212*b* sorts the mail in an efficiently balanced throughput scenario of approximately 17,000 pieces/hr (in balance with spray-on system and OCR/VCS delay). Buffer 214 then automatically arranges or sorts or sequences the containers into an appropriate order or sequence for induction into the second sorter 213 for the second sort pass of the articles or back to the first sorter units 212*a*, 212*b* via return conveyors 229 for a second pass therethrough. The product can now be called for in sequence (and processed) at a higher speed in the second pass (40,000 pieces/hr). This allows for substantial reduction in labor and utilizes mail containers or cartridges that allow the efficient and timely input of dps sort assembly 213. The system maximizes, optimizes and balances the various levels of technology (for product ID, software and VCS delay) and captures the savings by allowing use of a high speed second pass. Various levels of technology may be integrated in an efficient (time-balanced) scenario, which addresses a complex series of process constraints to capture saving previously achievable. The present invention thus advantageously utilizes the extremely fast sortation capacity of sort assembly 213 by supplying articles initially sorted by sort assemblies 212*a* and 212*b*, each of which has a lower capacity than sort assembly 213, but, when combined, are capable of supplying containers of first-pass sorted flat articles at a rate that utilizes the capacity of sort assembly 213. Multiple sort passes may be performed on the mail through the sort assemblies 212*a*, 212*b* and/or 213 to further consolidate the sorted mail into delivery point sequence.

Figure 12:
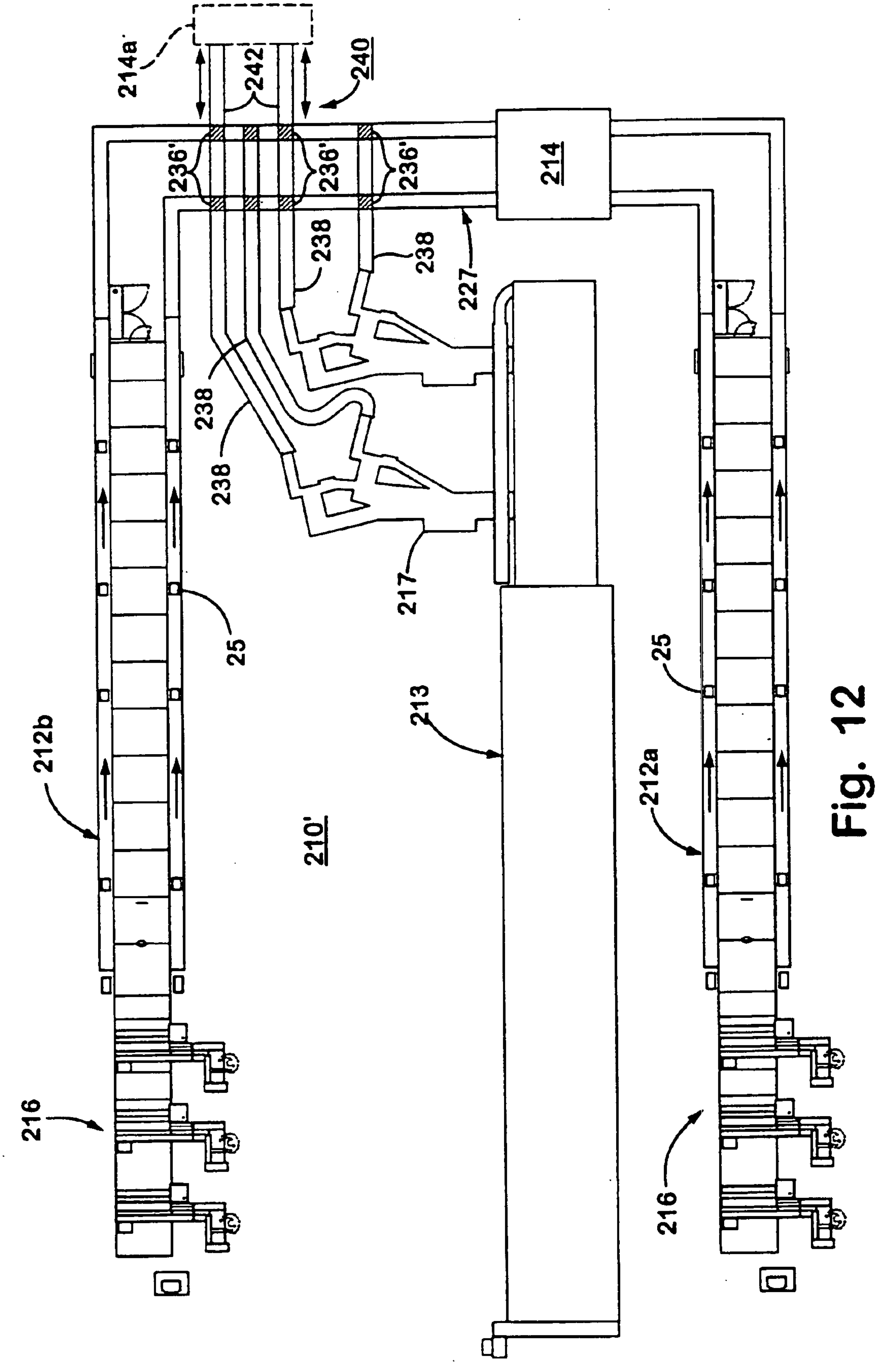
FIG. 12 is the same view as FIG. 9 of an alternate embodiment thereof.

An alternate article sortation apparatus or system 210' (FIG. 12) includes an input/output assembly 240 for conveyor 227, which conveys sorted trays from buffer 214 or directly from sort assemblies 212*a*, 212*b*. Input/output assembly 240 includes one or more lanes 242 which may transfer containers from an exterior source, such as a transportation system (not shown) or from a buffer assembly 214*a* (if additional buffering capacity is desired or required) to feed the containers to induct 217 of sortation system 213. Alternately, input/output section 240 may transfer containers of articles that have been sorted by sort assemblies 212*a* and 212*b* to a transportation system (not shown). This allows sortation system 210' to dispatch to the transportation system trays of articles sorted by sort assemblies 212*a* and 212*b* to the level of dispatch to other distribution/sortation centers. Accordingly, mail received at the distribution center in which sortation system 210' is located can be inducted at induct 216 on each sort assembly 212*a* and 212*b* and sorted to other distribution centers, as will be understood by the skilled artisan. This could be done either separate from or in combination with sorting turnaround mail to delivery point sequence with sort assembly 213.

Input/output 240 could additionally be utilized to input trays or containers of flat articles received from other distribution centers to be combined with trays of flat articles initially sorted by sort assemblies 212*a* and 212*b* and finally sorted by sort assembly 213 to delivery point sequence. This allows the output of sort assembly 213 to handle both turnaround mail and mail originating from other distribution centers. The mail from other distribution centers could be sorted separately or in combination with locally collected mail in the area surrounding the distribution center in which sortation system 210' is located. In sortation system 210', the conveying assembly 227 would utilize bi-directional transfer switches 236' in order to provide transferring of articles to either induct 217 or to input/output 240 and vice versa. Transfer switches 236, 236' are preferably of the type disclosed in commonly assigned U.S. patent application, Ser. No. 09/831,210, filed May 7, 2001 by Craig J. M. Stephen for CONVEYOR TRANSFER ASSEMBLY, which is the U.S. National application for International Application No. PCT/EP00/04995, filed May 31, 2000, claiming priority on U.S. provisional application, Ser. No. 60/137,785, filed Jun. 4, 1999, the disclosures of which are hereby incorporated herein by reference.

Preferably, dps sort assembly 213 is capable of handling both flat articles, such as flat mail, and the smaller letter mail. With such capacity, it may be possible to merge not only flat mail from distribution centers remote from the distribution center in which sortation system 210' is located, but also to insert letters such as from other such distribution centers or from other sorters such as a sorter dedicated to sorting letter mail. As such, the mail dispatched from the output of sort assembly 213 may be integrated into individual bundles of both flat mail and letter mail for each household in order to further maximize the efficiency of each mail carrier while walking the mail route.

Additionally, similar to sortation system 210, sortation system 210' may include one or more return conveyors (not shown in FIG. 12) between transfer switches positioned along the conveyors and inducts 216 or sorter units or sort assemblies 212*a*, 212*b* and/or between the transfer switches and the discharge of sorter unit or sort assembly 213, in order to facilitate multiple sort passes of sorter units 212*a*, 212*b* and/or 213. Optionally, buffers 214 may be replaced with a single buffer (not shown) positioned along the return or loop conveyor, without affecting the scope of the present invention.

Figure 13:
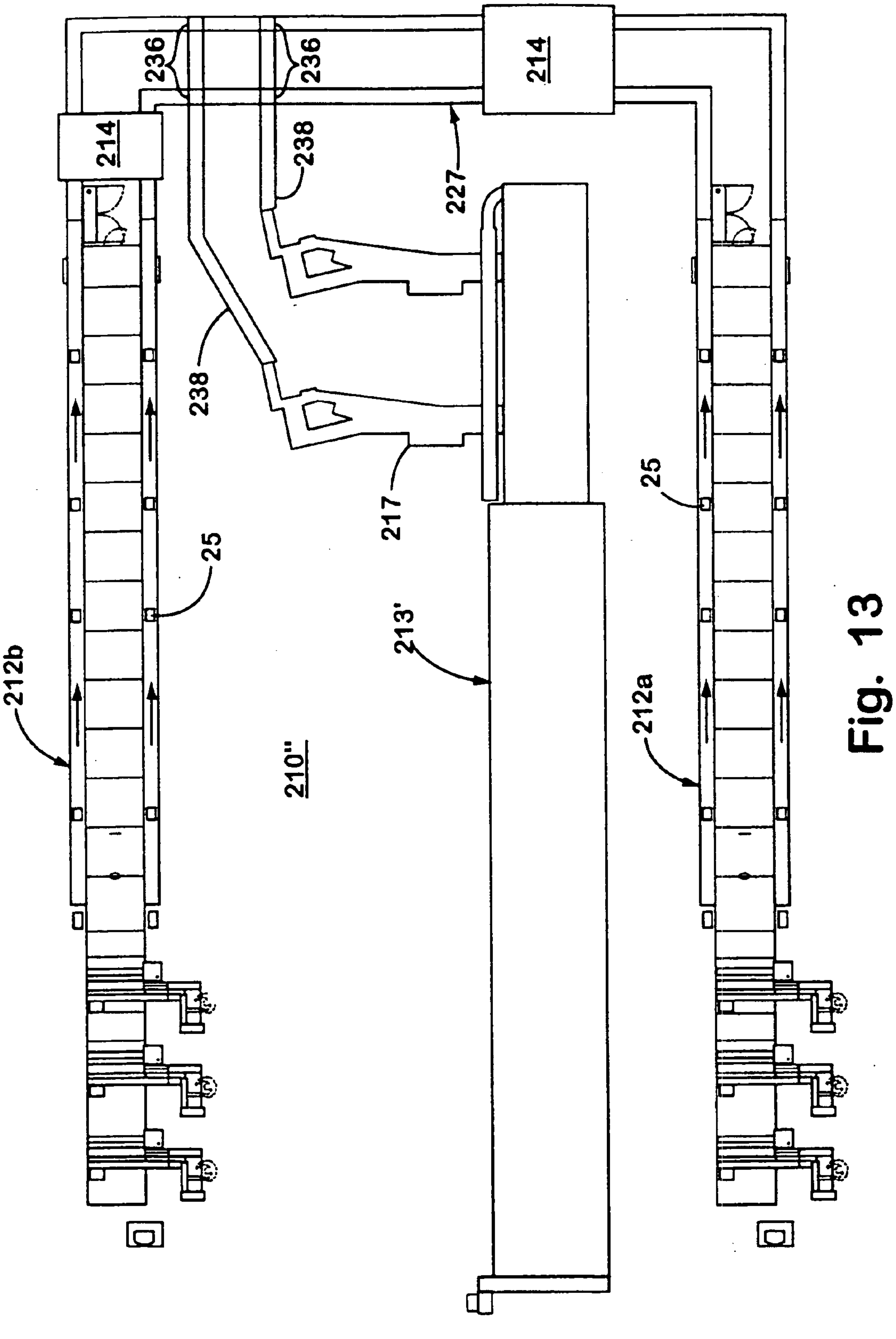
FIG. 13 is the same view as FIG. 9 of another alternate embodiment thereof.

Another alternate embodiment of an article sortation apparatus or system 210" (FIG. 13) in accordance with the present invention is similar to sortation system 210, except that it includes a dps sortation assembly 213' with an induct 217' having only two induct lines 238. By using rigid containers capable of automatic unloading, sortation assembly 213' can be supplied with a sufficient quantity of articles utilizing only two induct lines. Similar to sortation systems 210 and 210', sortation system 210" may also include one or more return conveyors (not shown in FIG. 13) which may convey trays between one or more transfer switches and the inducts 216 of the sort assemblies 212*a*, 212*b* and/or the discharge of the sortation assembly 213', in order to facilitate multiple sort passes through sort assemblies 212*a*, 212*b* and/or 213'.

Figure 14:
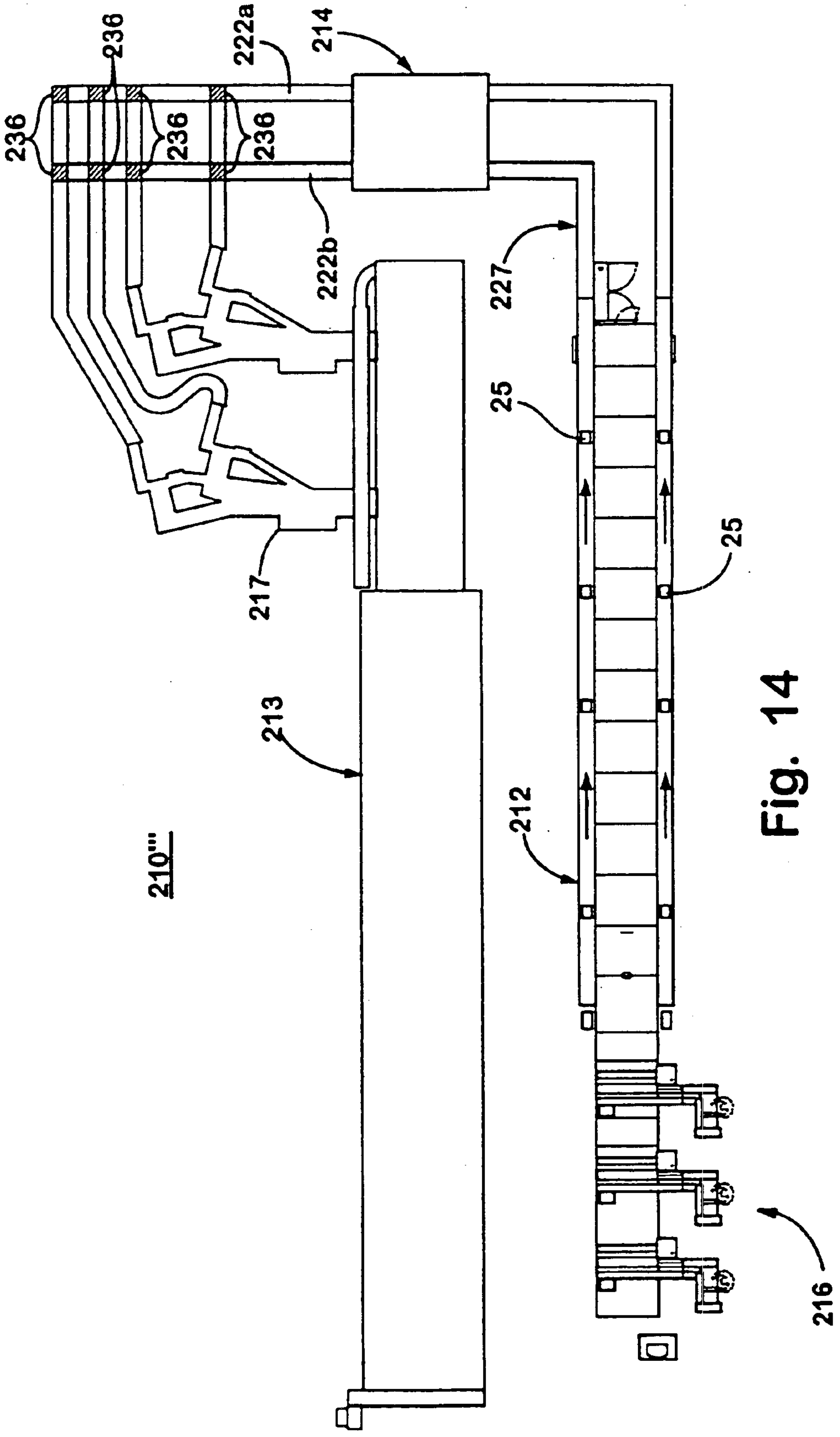
FIG. 14 is the same view as FIG. 9 of yet another alternate embodiment thereof.

Another alternate article sortation apparatus or system 210'" (FIG. 14) is shown having a single initial sort assembly 212 for conducting an initial sort plan on the flat articles and a buffer 214 for sorting and supplying the containers of initially sorted flat articles from sort assembly 212 to dps sort assembly 213. In the illustrated embodiment, primary sort assembly 212 has a capacity that is similar to that of subsequent sort assembly 213. Because the capacities of sort assemblies 212 and 213 are relatively closely matched, only one primary sort assembly 212 is provided in article sortation system 210'".

Optionally, sortation system 210'" may include a return or loop conveyor (not shown in FIG. 14) which connects between one or more transfer switches along conveyors 222*a*, 222*b* and the induct 216 of sort assembly 212 to facilitate multiple sort passes through the initial sort assembly 212 if desired. The return conveyor may also be connected between the discharge of the second sort assembly 213 and one or more transfer switches along conveyor 227 to facilitate multiple sort passes of either of the sort assemblies 212 and/or 213.

Figure 15:
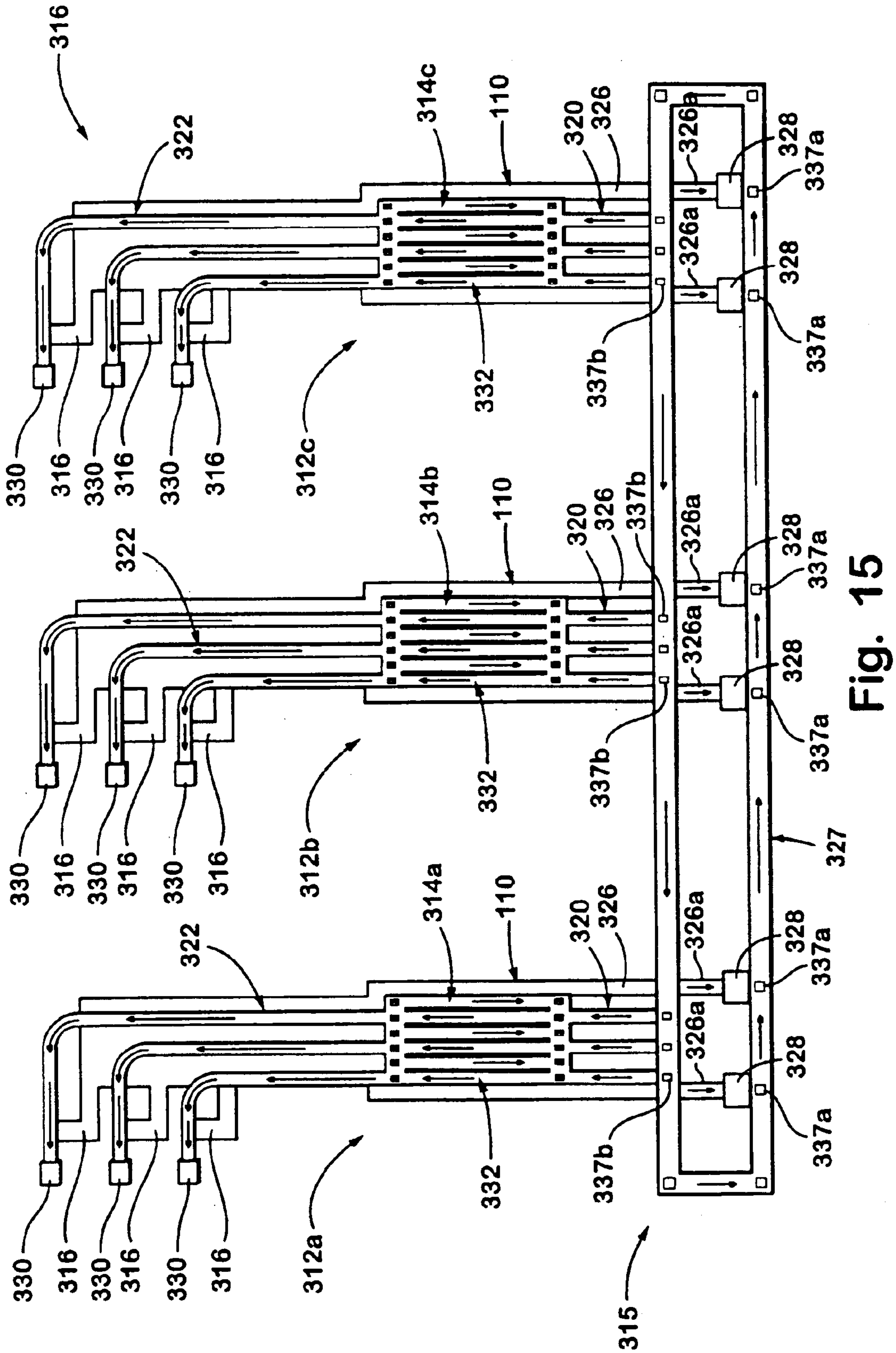
FIG. 15 is a top plan view of another alternate embodiment of the present invention, which utilizes multiple flat sorting machines.

Referring now to FIG. 15, a sortation system 310 includes multiple sortation assemblies or machines, such as three sortation assemblies 312*a*, 312*b* and 312*c*. Each sortation assembly 312*a*, 312*b*, 312*c* is connected to a conveying assembly or system 315, which is operable to sort, arrange, sequence and convey trays from a discharge conveyor 326 of each sortation assembly 312*a*, 312*b*, 312*c* to an induct 316 of an appropriate one of the sortation assemblies 312*a*, 312*b*, 312*c*. The conveyor system 315 includes a buffer or sorter 314*a*, 314*b*, 314*c* positioned at a level generally above or adjacent to a respective sortation assembly 312*a*, 312*b*, 312*c*. Sortation assemblies 312*a*, 312*b*, 312*c* and buffers 314*a*, 314*b*, 314*c* are substantially similar to sortation assembly 12 and buffer 14, discussed above, such that a detailed discussion of these assemblies and buffers will not be repeated herein. In the illustrated embodiment, sortation assemblies 312*a*, 312*b*, 312*c* are flat-sorting machines, such as the type marketed by Alcatel Postal Automation System and/or Mannesmann Dematic Postal Automation and/or Mannesmann Dematic Rapistan Corp. and/or Siemens Dematic Corp. under Model AFSM100. Alternately, however, the sortation assemblies may be any other type of sortation assembly, such as a dual carousel system, such as the sortation assembly marketed by Mannesmann Dematic Postal Automation under Model TOP2000, the sortation assembly marketed by Lockheed Martin Postal Automation under Model FSM 1000 or any other flat mail sortation system, without affecting the scope of the present invention.

Similar to sortation assembly 12, discussed above, each sortation assembly 312*a*, 312*b*, 312*c* includes three inducts 316 adjacent to three tray lowering devices 330 of the respective buffer 314*a*, 314*b*, 314*c*. Inducts 316 receive the articles from trays or bins lowered by lowering devices 330 and are operable to induct the articles into the respective sortation assembly 312*a*, 312*b*, 312*c*, where the articles are sorted and discharged into the bins or trays at the appropriate sortation station, as discussed above with respect to sortation assembly 12. The trays are preferably conveyed along the sortation assemblies via a tray handling system, such as tray handling system 110, which is operable to automatically remove partially filled trays from the sortation stations and convey the trays to a labeling station (not shown in FIG. 15) and onto discharge conveyor 326 of the respective sortation assembly. Similar to buffer 14, buffers 314*a*, 314*b*, 314*c* include at least one, and preferably three, conveyor loops 332 between an induct end 320 and a discharge end 322. Trays of sorted articles are received at induct end 320, and buffers 314*a*, 314*b*, 314*c* are operable to sort, stage and accumulate the trays as the trays are conveyed around the continuous loops 332 to arrange and sequence the trays in an arranged manner prior to discharging the arranged trays at discharge end 322. The trays are then lowered via lowering devices 330 to inducts 316 of the respective sortation assembly 312*a*, 312*b*, 312*c*.

Conveyor system 315 further includes a conveyor loop 327, which is preferably elevated and positioned at and interconnected between the discharge conveyor or conveyors 326 of each sortation assembly 312*a*, 312*b*, 312*c* and the induct end 320 of each buffer 314*a*, 314*b*, 314*c*. A tray elevating device 328 is positioned at a discharge end 326*a* of each discharge conveyor 326 and is operable to elevate or raise trays upward and onto the elevated conveyor loop 327.

Conveyor loop 327 provides a generally continuous conveying loop for trays to be conveyed around, such as in the counterclockwise direction as shown in FIG. 15. Conveyor loop 327 includes a plurality of transfer units 337*a*, 337*b* positioned therearound for changing the direction of travel of the trays, similar to transfer units 237, discussed above. For example, a transfer unit 337*a* is positioned adjacent to each tray elevating device 328 and is operable to receive the trays from the elevating device 328 and redirect or transfer the trays onto the conveying loop 327. Similarly, a transfer unit 337*b* is positioned at each induct 320 of buffers 314*a*, 314*b*, 314*c*, and is operable to transfer the appropriate trays onto the appropriate induct 320 of the appropriate buffer 314*a*, 314*b* or 314*c* for sorting and arranging the trays prior to the second sort pass through the sortation assemblies. Buffers 314*a*, 314*b*, 314*c* then automatically sort, accumulate and arrange the trays, and discharge the arranged trays at tray lowering devices 330 for induction of the articles for the second sort pass, in a similar manner as discussed above.

During operation, trays are filled or at least partially filled at their respective stations and then conveyed along the tray handling system 110 toward discharge end 326*a* of discharge conveyor 326. As trays containing articles sorted during the first pass are conveyed along the tray handling system 110 of each sortation assembly, the trays are identified and labeled at the labeling station, as discussed above with respect to sortation system 10. The trays are then moved to conveyor loop 327, such as via discharge conveyors 326 and elevating devices 328. Conveyor loop 327 is operable to identify, such as via a laser scanner or the like (also not shown), the trays and direct the trays to the appropriate sortation assembly in preparation for the second sort pass. Sortation system 310 thus further includes a control (not shown) which is operable to identify the trays and determine and select the appropriate sortation assembly for the second sort pass. The conveyor loop 327 may then be operable in response to the control to selectively convey trays from any one of the sortation assemblies 312*a*, 312*b*, 312*c* back to the induct of the same sortation assembly or to the induct of any of the other sortation assemblies to which conveyor loop 327 is connected. For example, the conveyor loop may convey a group of trays from sortation assembly 312*a* to the induct 320 of buffering assembly 314*b* at sortation assembly 312*b*. The buffering assembly is then operable to sort and arrange the trays and to discharge the arranged trays to the induct end of the respective sortation assembly for the second sort pass.

Figure 23:
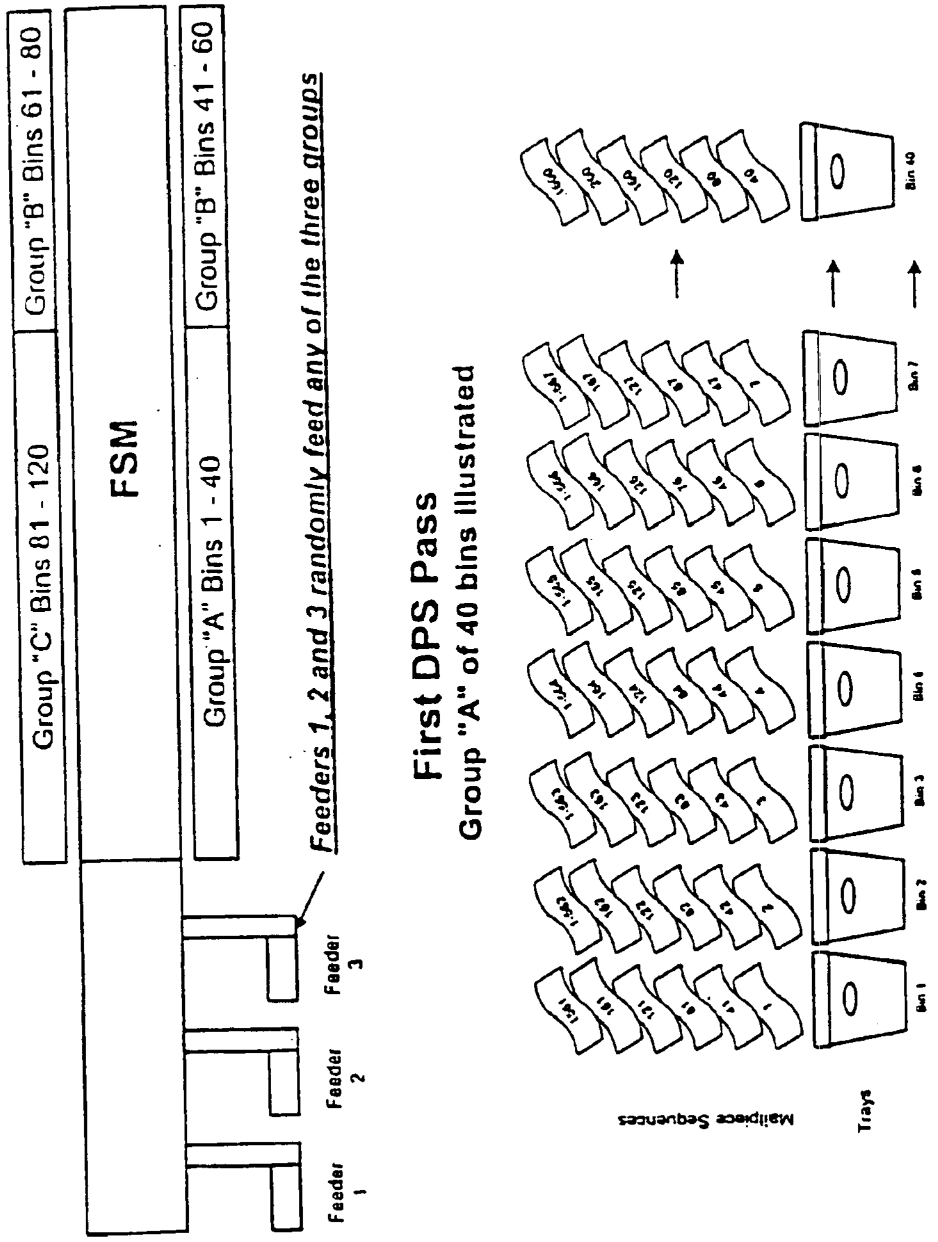
FIG. 23 is a schematic of a first sort pass of a sorting matrix useful with the present invention.
Figure 24:
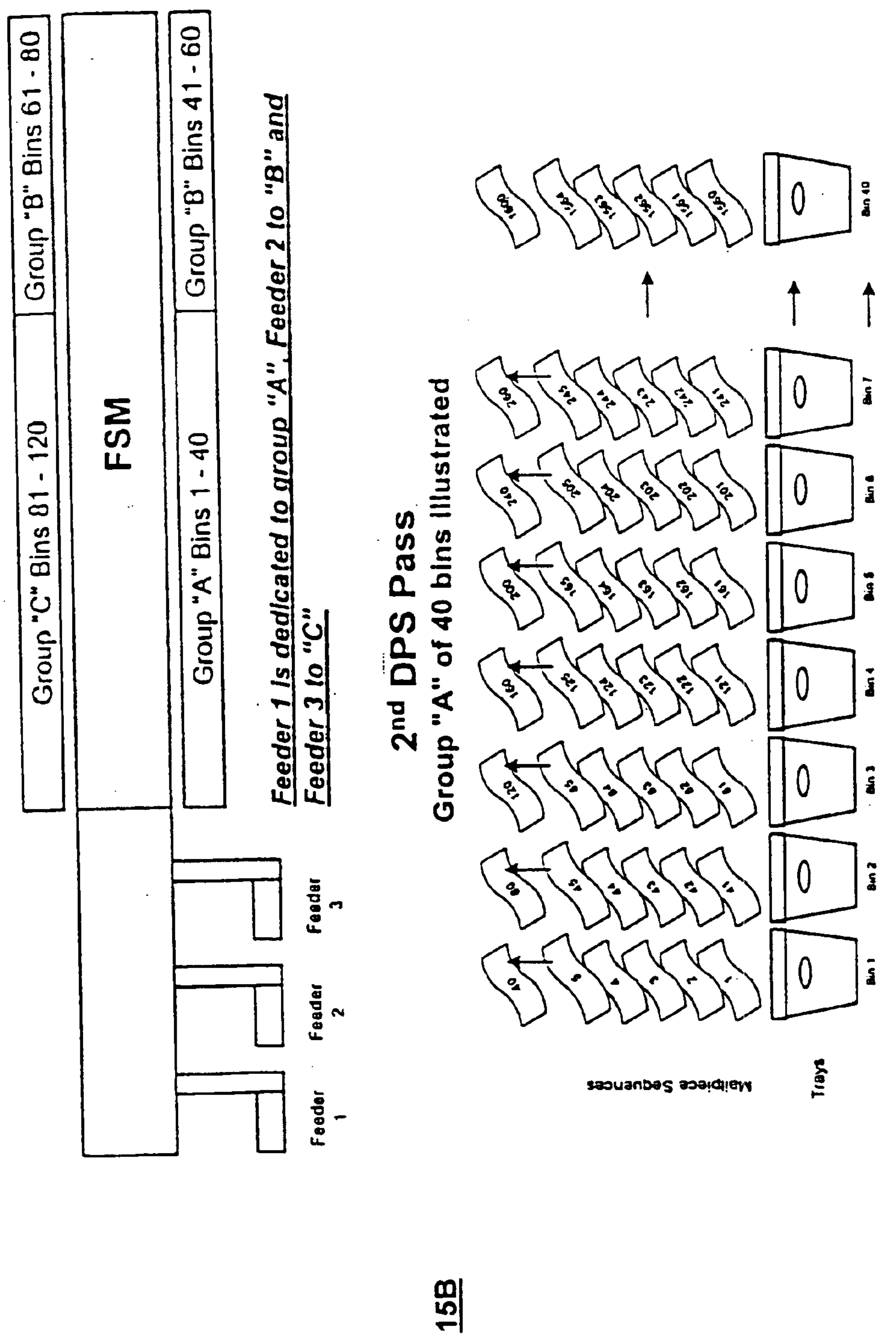
FIG. 24 is a schematic of a second sort pass of the sorting matrix of FIG. 23.

Because the sortation assemblies 312*a*, 312*b*, 312*c* are connected together via conveyor loop 327, the sortation system 310 may accommodate a greater sequencing matrix than a single or double assembly system. For example, if each sortation assembly 312, 312*b*, 312*c* provides 120 output bins (such as three 40 output bins at each assembly), and the sequencing matrix of FIGS. 23 and 24 is implemented, the second pass through the assemblies allows all 120 bins of each assembly or machine to be dedicated to a 120×120 sequencing matrix, so that each of the three sortation assemblies is able to sequence 4800 addresses for a total of 14,400 addresses. For example, during the first pass, each sortation assembly may sort articles to three groups of 40 bins (e.g., sortation assembly 312*a* may sort sequences 1, 41, 81, up to 1600 to one bin of a group of 40 bins, and sort sequences 2, 42, 82, up to 1582 to a second bin and so on, while sortation assembly 312*b* may sort sequences 1601, 1641, 1681 up to 3200 to one bin of a group of 40 bins, and sort sequences 1602, 1642 etc. to a second bin of that group and so on, with sortation assembly 312*c* sorting sequences 3201 to 4800 in a similar manner). The second set or group of 40 bins for each machine is similarly processed for sequences 4801 to 9600, while the third group of 40 bins for each sortation assembly is likewise processed for sequences 9601 to 14400.

After the first pass, the overhead conveyor loop 327 and buffer systems 314*a*, 314*b*, 314*c* sequence and arrange the trays for the second sort pass, such as by queuing all trays discharged from one group of 40 bins on the three assemblies at a selected one of the assemblies, while the trays for each of the other groups of 40 bins are similarly assigned and queued at a selected one of the other assemblies. The first sortation assembly may, for example, then process sequences 1 to 4800 in its 120 bins, while the second and third assemblies then process sequences 4801 to 9600 and 9601 to 14,400, respectively. Alternately, however, other sequencing matrices may be implemented, such as the sequencing matrix shown in FIGS. 25A, 25B and 26A, 26B and discussed below, or other sequencing matrices, without affecting the scope of the present invention.

The conveyor loop 327 is operable to connect the multiple sortation assemblies in such a way as to route trays from and to the same sortation assembly or to any of the other sortation assemblies, depending on the sequencing matrix and sequences associated with the trays or bins. Although shown as having three sortation assemblies, sortation system 310 may include more or less sortation assemblies, whereby the conveyor loop 327 may be adapted to convey trays to one or multiple sortation assembly arrangements, without affecting the scope of the present invention. Also, although shown as being an overhead conveyor connected to overhead buffers, the conveyor system, including the conveyor loop and/or buffers, may be at a lower level, with the buffers positioned to one side or end or otherwise near their respective sortation assembly, without affecting the scope of the present invention.

Referring now to FIGS. 16–21, a sortation system 410 includes a buffer or sequencing conveying assembly or system 414, which is operable to sort, arrange and convey trays from a discharge conveyor 426 (FIGS. 19–21) of a sort assembly 412 to induct stations 416*a*, 416*b*, 416*c* of the sort assembly 412. The buffer conveyor system 414 is preferably positioned at a level generally above or adjacent to sort assembly 412. Sort assembly 412 is substantially similar to sort assembly 12, discussed above, such that a detailed discussion of the assembly will not be repeated herein. Similar to sort assembly 12, sort assembly 412 may have 120 bin positions (as shown), or may be extended up to 240 bins or more, or any other number of bins, depending on the application. Providing additional bin positions facilitates implementation of a substantially larger sequencing or sortation matrix with the sortation system. In the illustrated embodiment, sort assembly 412 is a flats sorting machine, such as the type marketed by Alcatel Postal Automation System and/or Mannesmann Dematic Postal Automation, Mannesmann Dematic Rapistan Corp., Solystic and/or Siemens Dematic Corp. under Model AFSM 100. Alternately, however, the sort assembly may be any other type of sortation assembly, such as a dual carousel system, such as the sortation assembly marketed by Mannesmann Dematic Postal Automation, Solystic and/or Siemens Dematic Corp. under Model TOP2000, the sortation assembly marketed by Lockheed Martin Postal Automation under Model FSM 1000, or any other flat mail sortation system, without affecting the scope of the present invention.

Figure 16:
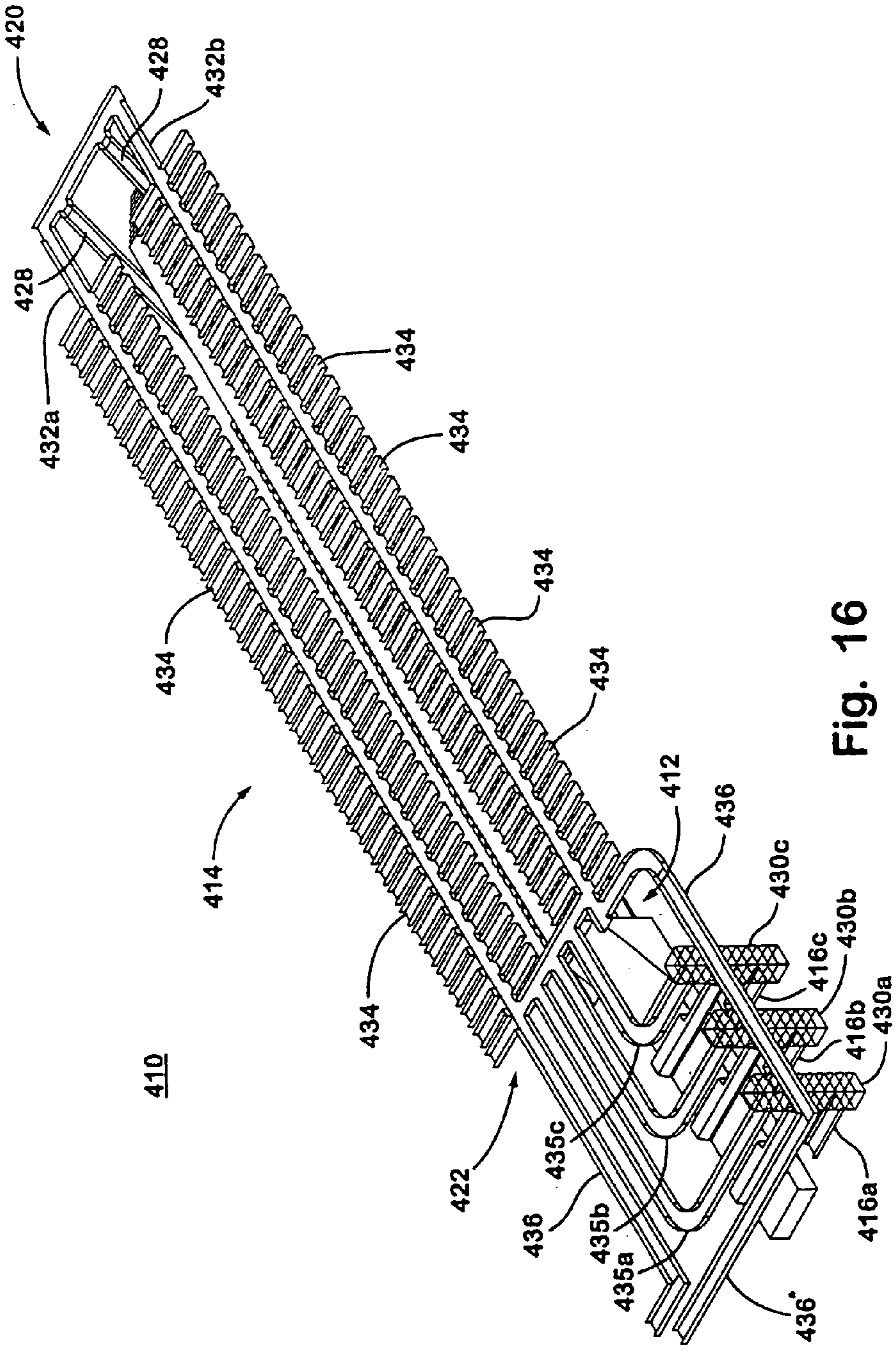
FIG. 16 is an upper perspective view of another sequencing conveyor and article sortation assembly in accordance with the present invention.
Figure 17:
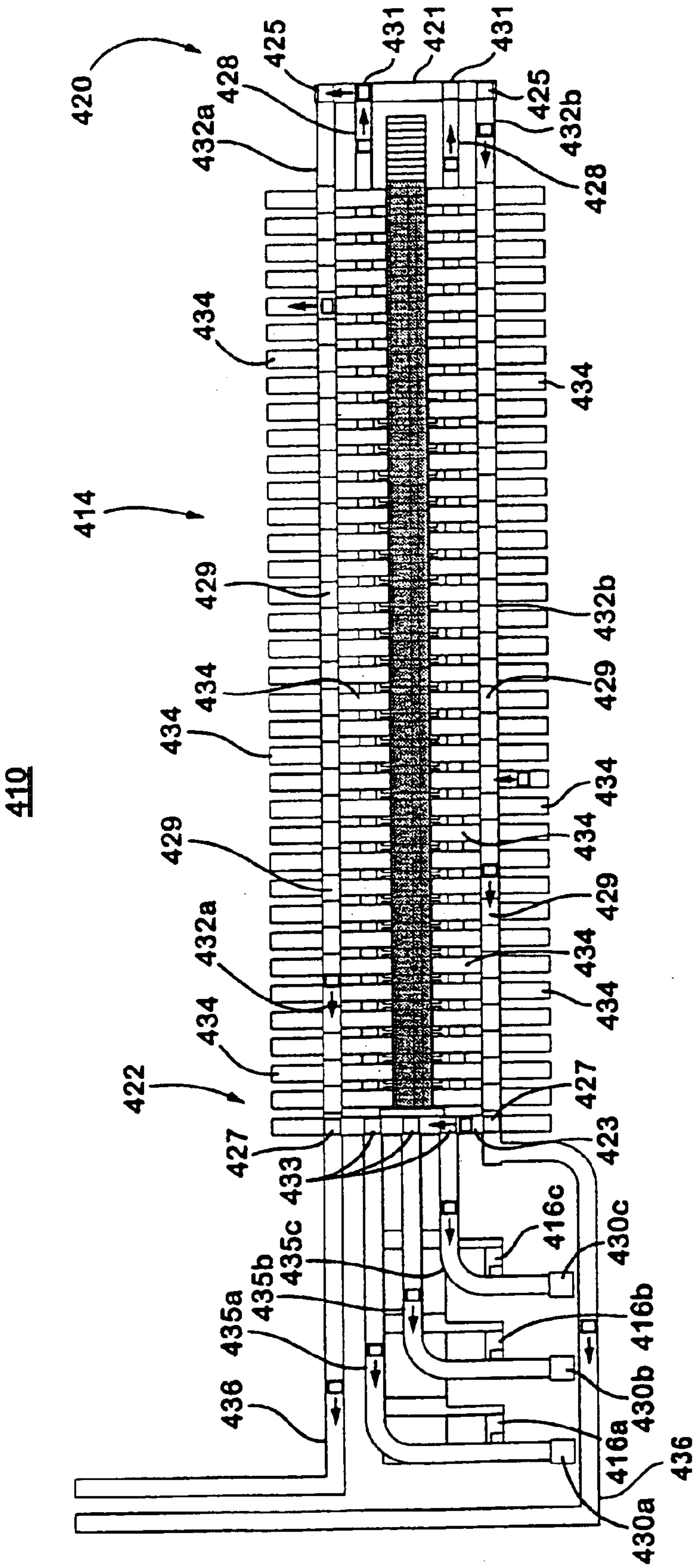
FIG. 17 is a top plan view of the sequencing conveyor and article sortation assembly of FIG. 16.
Figure 18:
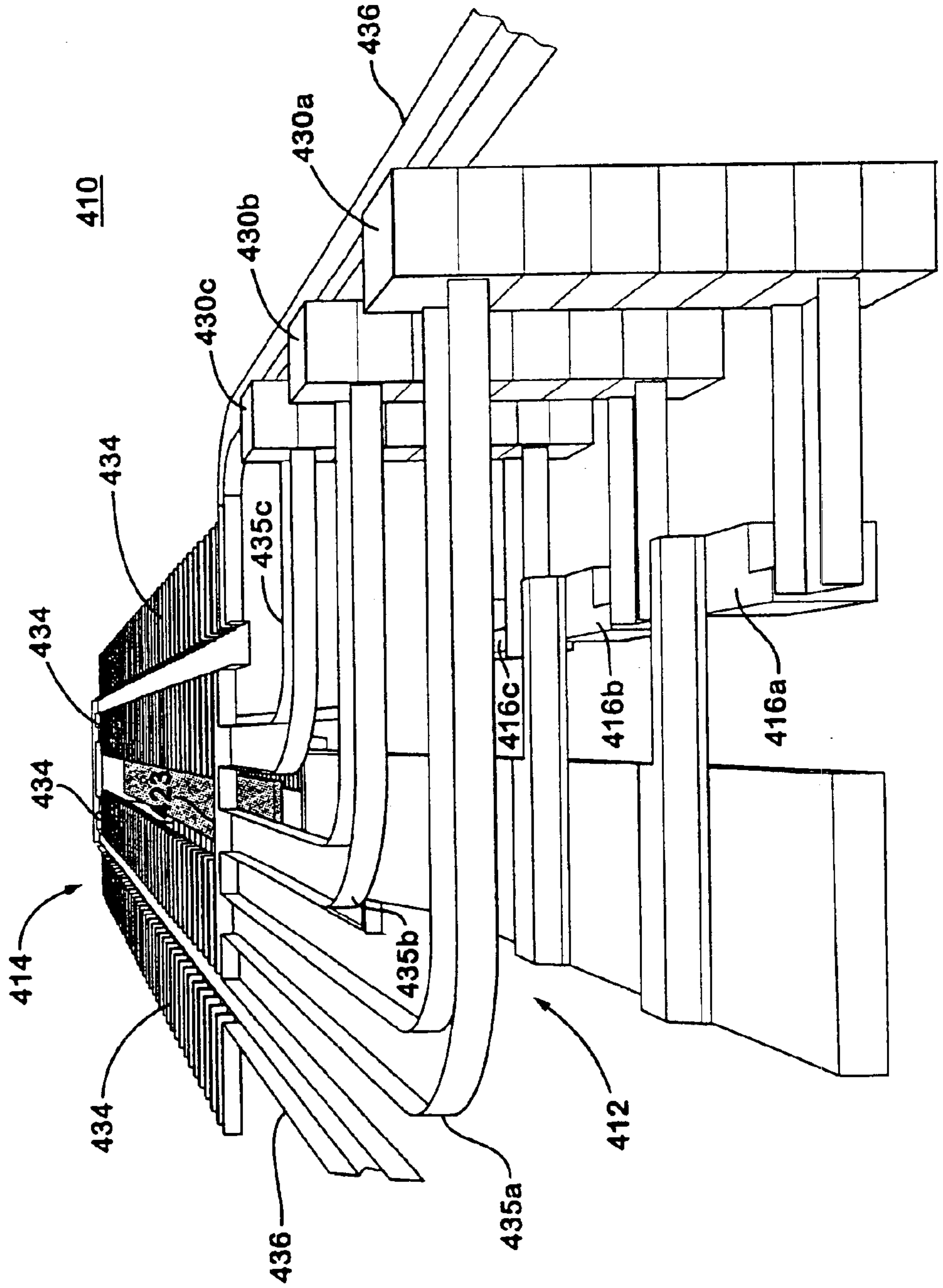
FIG. 18 is an upper end view of the sequencing conveyor and article sortation assembly of FIGS. 16 and 17.
Figure 19:
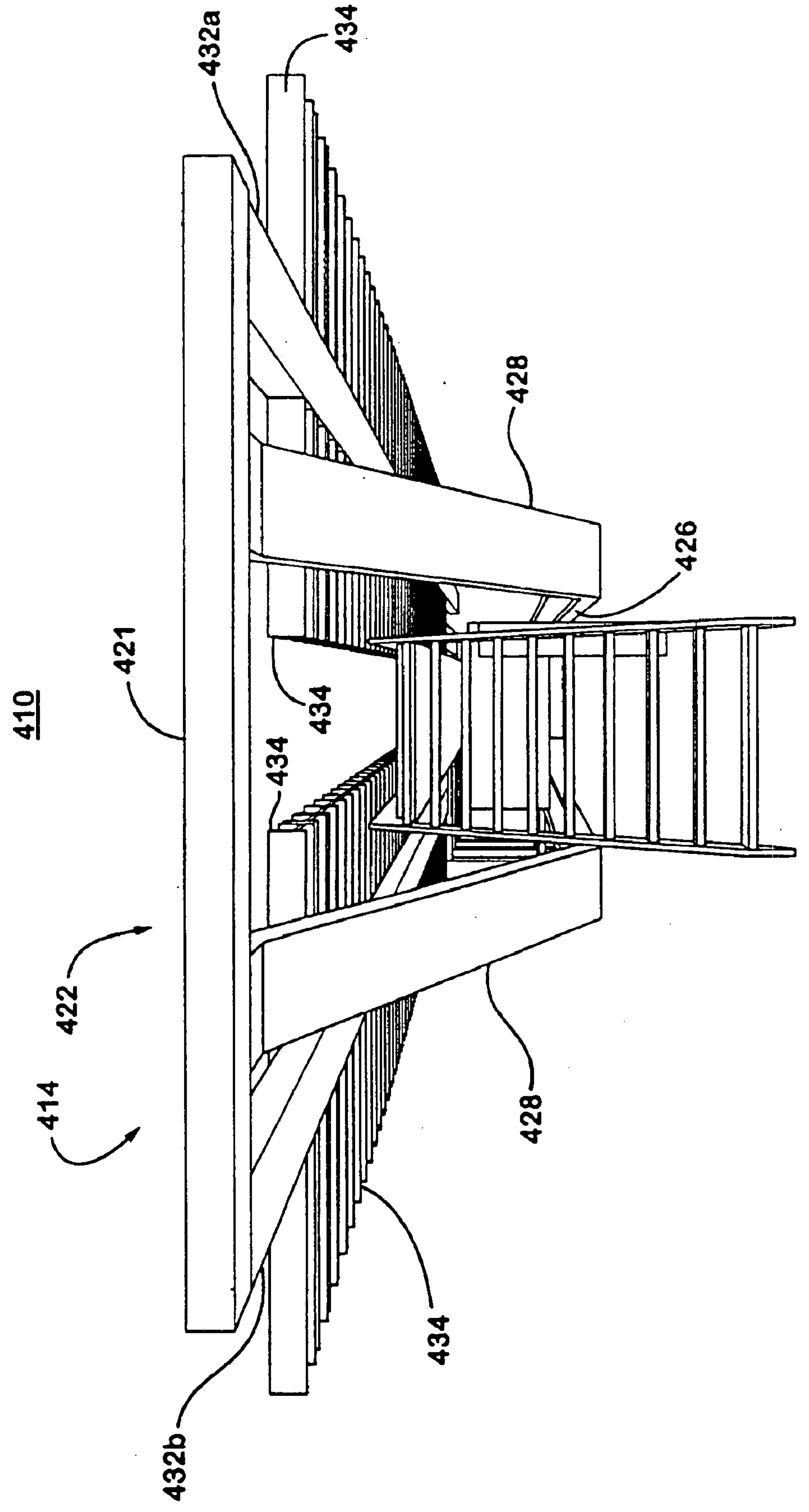
FIG. 19 is a lower, opposite end view of the sequencing conveyor and article sortation assembly of FIGS. 16–18.
Figure 20:
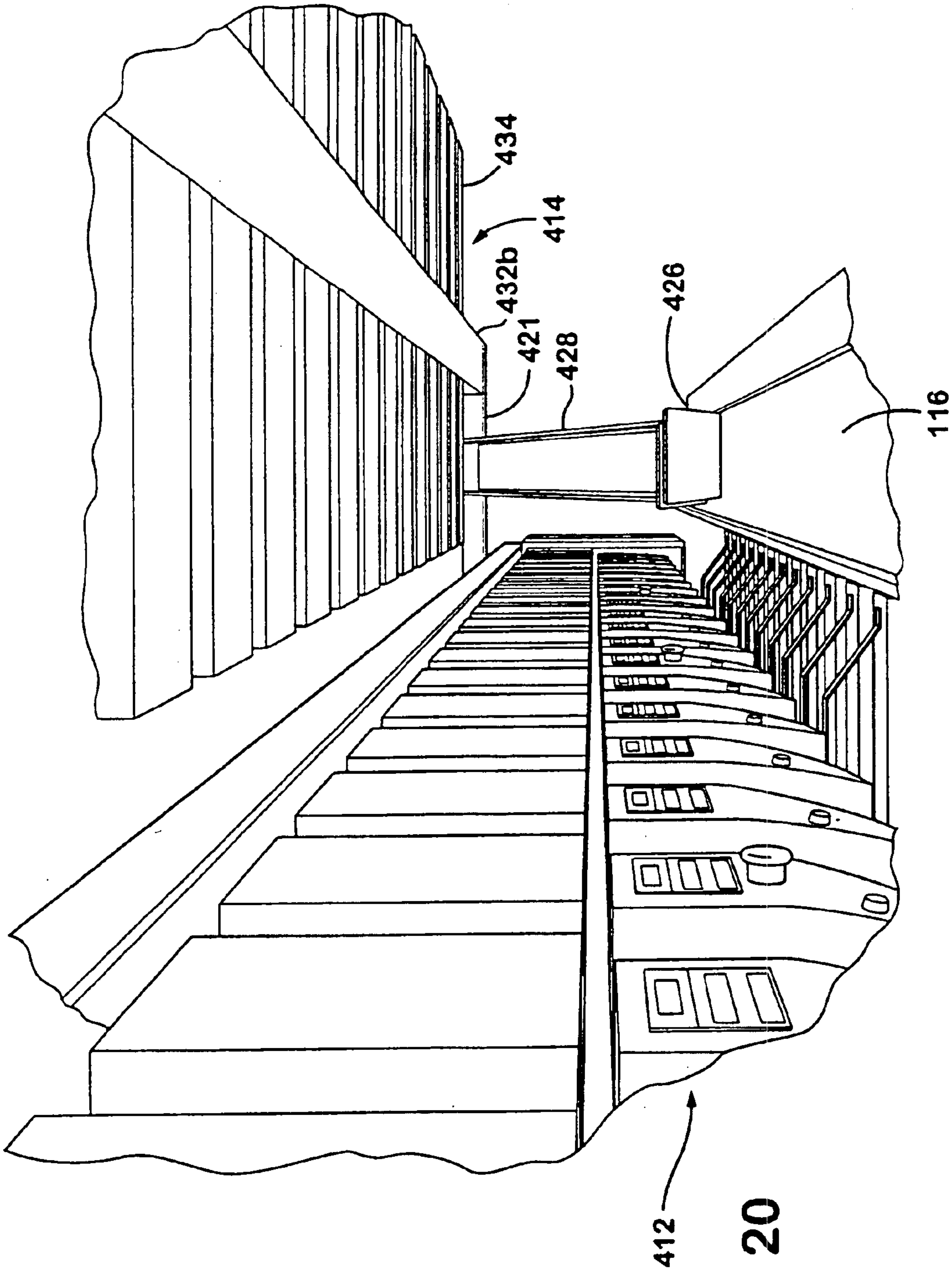
FIG. 20 is a view along one side of the sortation assembly and beneath the sequencing conveyor of FIGS. 16–19.
Figure 21:
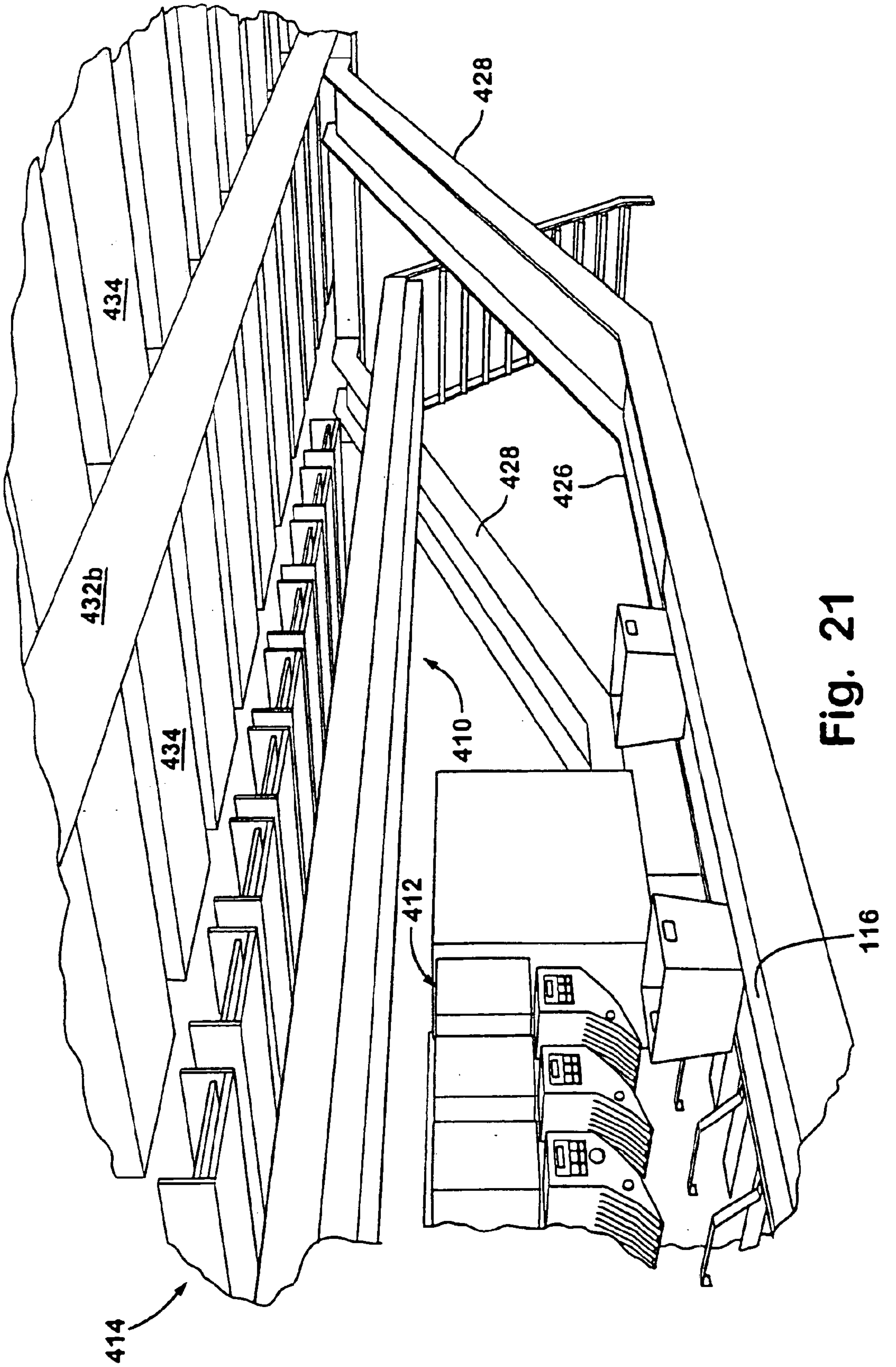
FIG. 21 is a perspective view of the discharge end of the sortation assembly and the induct end of the sequencing conveyor of FIGS. 16–20.

Similar to sort assembly 12, discussed above, sort assembly 412 includes three inducts 416*a*, 416*b*, 416*c* adjacent to three tray lowering devices 430*a*, 430*b*, 430*c* (such as the three generally vertical lowering devices shown in FIGS. 16 and 18 or the three spiral incline conveyors shown in FIG. 17 or any other lowering means) of buffer 414. Inducts 416*a*, 416*b*, 416*c* receive the articles from trays or bins lowered by lowering devices 430*a*, 430*b*, 430*c* and induct the articles into the sort assembly 412, where the articles are sorted and discharged into the bins or trays at the sortation stations, as discussed above with respect to sort assembly 12. The trays are conveyed along the sort assembly via a tray handling system, such as tray handling system 110, which is operable to automatically remove partially filled trays from the sortation stations and convey the trays to a labeling station (not shown in FIGS. 16–21) and onto discharge conveyor 426. The labeled trays are then conveyed to buffer or sequencing conveyor 414, such as via an inclined ramp conveyor 428 or other tray moving device which is operable to transfer trays from the sort assembly to the sequencing conveyor.

Although described as having a labeling station at the end of the tray handling system, it is envisioned that the labeling station may be positioned elsewhere along the sort assembly and tray handling system, such as at the beginning or upstream end of the tray handling system, without affecting the scope of the present invention.

Buffer 414 includes an induct transportation conveyor 421 at an induct end 420 and a discharge transportation conveyor 423 at a discharge end 422, with a pair of generally parallel transportation conveyors 432*a*, 432*b* extending therebetween. A pair of 90 degree transfer units 431 are located at a junction of incline ramp conveyors 428 and induct transportation conveyor 421. Also, a pair of 90 degree transfer units 425 are located at the junctions of the induct conveyor 421 and transportation conveyors 432*a*, 432*b*, while a corresponding pair of 90 degree transfer units 427 are located at the junctions of transportation conveyors 432*a*, 432*b* and discharge transportation conveyor 423. Transfer units 427 are operable to move the trays or containers onto discharge transportation conveyor 423 for conveying the trays to the inducts of the sortation assembly for the second sort pass, as discussed below, or to move the trays onto a pair of takeaway conveyors 436 for discharging the trays after the delivery point sequencing process is completed, as also discussed below.

The transportation conveyors 432*a*, 432*b* include a plurality of temporary storage or sort location fingers, slots or zones 434 extending laterally therefrom at either side of each of the parallel conveyors 432*a*, 432*b*. A plurality of 90 degree transfer units 429 (FIG. 17) are positioned along conveyors 432*a*, 432*b* and are operable to convey trays either along conveyors 432*a*, 432*b* or laterally to either side of conveyors 432*a*, 432*b* to direct the trays into and out from a targeted one of the sort location zones 434. Each of the zones 434 includes a motorized roller conveyor or the like and is operable to receive and discharge one or more trays from and to a respective one of transportation conveyors 432*a*, 432*b*. In the illustrated embodiment, each slot 434 is capable of temporarily storing or staging up to four trays. However, the zones may be configured to receive more or less trays, in order to adapt the system to the applicable mainstreams, without affecting the scope of the present invention.

Trays of sorted articles are received at induct end 420, and buffer 414 is operable to sort, stage and accumulate the trays as the trays are conveyed along a respective one of the conveyors 432*a*, 432*b* and onto an appropriate one of the zones 434. After the trays are arranged in their appropriate zones and the first sort pass is completed, buffer 414 is operable to discharge the trays from their zones 434 and to convey the discharged trays along conveyors 432*a*, 432*b* to arrange the trays in an arranged manner prior to conveying or transferring the arranged trays onto discharge transportation conveyor 423 at discharge end 422. A plurality of 90 degree transfer units 433 (FIG. 17) are positioned along discharge transportation conveyor 423 and are operable to move the trays onto one of three discharge conveyors 435*a*, 435*b*, 435*c*, which then conveys the trays to the tray lowering devices 43*a*, 430*b*, 430*c*, respectively. The trays are then lowered via lowering devices 430*a*, 430*b*, 430*c* to inducts 416*a*, 416*b*, 416*c* of the sort assembly 412. As best shown in FIGS. 16 and 17, buffer 414 includes enough storage zones 434 so that each zone may be designated to a particular output bin of the sort assembly 412. Extra zones are preferably provided for situations where a particular sort station may provide more than four containers of sorted mail to buffer 414, and thus exceeds the space allotted for that station at its four station storage zone. In the illustrated embodiment, buffer 414 includes 142 sort location zones, such that 120 of these are designated for a particular one of the 120 output bins of sort assembly 412, and the remaining zones are designated for excess or overflow trays.

Although shown and described as a pair of transportation conveyors having a plurality of zones connected thereto, it is further envisioned that the sequencing buffer of the present invention may otherwise include multiple transportation conveyors with zones extending from each conveyor, such as three pairs of transportation conveyors with zones extending from one or both sides of each conveyor, without affecting the scope of the present invention. Varying the number of transportation conveyors allows for variation in the overall dimensions of the sequencing buffer to adapt the sequencing buffer of the present invention to various applications.

The delivery point sequencing process initially begins with the use of the sortation machine or sort assembly in conjunction with a tray handling system, which preferably automates the flow of trays and mail through the flat sorter. A system of flats tub or container storage and tracking is implemented to again sort the mail and sequence it into its numerical order by the address on the mail item. The particular sort process depends on the sequencing matrix that is implemented with sortation system 410.

The containers may be stored in a designated zone or accumulation conveyor 434 (such as a four zone accumulation conveyor, as shown in FIG. 17) while mail sorting is being conducted. Each sort location of the sortation machine may have its own designated sort location zone.

The process of delivery point sequencing is a two step process. The articles begin the sequencing process by being delivered to the feeders of the sortation machine where operators feed the articles into the machine. Once the articles are fed into the machine, they are sorted by the sortation machine according to their zip code or other identification and placed into corresponding tubs, trays or containers, which are located in pre-designated sort locations or stations on the sorter.

When a container becomes full, a bin full sensor temporarily halts sorting of mail to that sort location and triggers the tray handling system to remove the full container and release it to the motorized roller take away conveyor 116 (FIGS. 19–21) of the tray handling system. An empty container is then delivered to the open sort location and automatically placed there in order to allow sorting to continue at that location.

The full or at least partially filled containers removed by the tray handling system proceed along the motorized roller conveyor 116 until they reach the end, where they may be rotated 90 degrees by a tray rotator (not shown in FIGS. 16–21). The containers then feed onto incline conveyor 428, which transports them to an overhead height, such as a height of approximately 12 feet, and to transfer unit 431 (FIG. 17). The transfer unit 431 then moves the containers onto the induct transportation conveyor 421. Containers that came from the reject bins (normally one or more of the later bins of the sortation machine, such as bins 119 and 120) and containers with unreadable labels remain at floor level and are diverted to a reject conveyor (not shown in FIGS. 16–21).

The containers are then transported to one of the two transfer units 425 located at each end of the induct transportation conveyor 421. Each of the transfer units 425 moves the containers onto a corresponding one of the pair of generally parallel motorized roller accumulation conveyors 432*a*, 432*b*. The containers may then be scanned as they are conveyed along transportation conveyor 432*a*, 432*b* to a series of bi-directional transfer units 429. The information on each container bar code label is used to determine which one of the transfer units 429 will actuate for that tray as it is conveyed along the appropriate transportation conveyor 432*a* or 432*b*. As the containers continue down the transportation conveyor, their transfer information is retained. When the container reaches its designated location, the assigned transfer 429 is actuated to move the tray onto the appropriate storage slot or sort location zone 434.

The slots or sort location zones 434 preferably correspond to the numerical order in which the sort bins are arranged on the sortation machine 412. For example, sort location zones 1 thru 60 may be located directly above the sort bins 1 thru 60 of the sortation machine, while sort location zones 61 thru 120 may be located on the opposite side. Sort location zones 1 and 2 may be located closest to the charge or induct end of the accumulation or sequencing or buffer conveyor where the containers are scanned. The numerical order preferably continues right to left with odd numbers on one side and even on the other. The same order system preferably is maintained for the sort location zones 61 thru 120 on the opposite side. The containers are kept in their respective slots or sort location zone until the second sort pass is initiated.

This same operation is repeated for every sort location or station of the sort assembly 412. Delivery point sequencing system 410 includes enough locations to accommodate the full or at least partially filled containers and store them separately by their designated sequence group and sort location. If additional storage locations are required for a particular grouping of delivery sequences or sort location, the containers may be directed to one of several overflow accumulation zone conveyors, such as to one of the twenty-two extra zones shown in the illustrated embodiment. These overflow zones are assigned to the respective sequencing group or sort location. The overflow zones can be assigned dynamically based on the actual outputs from each sort plan.

Once all of the allotted articles for the first sort pass has been initially sorted through the sortation machine, a sweep of the sort assembly 412 is conducted and all partially full containers are removed and transported in a similar manner as the full containers or trays were during the first sort pass. The trays then proceed to the inclined ramp 428 and follow the same path as the full containers before them.

Once the sort assembly 412 is cleared and an empty container is placed in each sort location, delivery point sequencing system 410 begins to transport the stored, full or partially filled containers from their designated storage locations in the reverse order they were received for storage. Using the accumulation zones 434, which initially stored the containers, and the transfer units 429 and transportation conveyors 432*a*, 432*b*, the containers are moved to the transfer units 427 at the opposite, discharge end of the system. Transfer units 427 then move the containers onto the motorized roller discharge transportation conveyor 423, where more transfer units 433 are used to evenly distribute the trays or containers onto one of the motorized roller discharge conveyors 435*a*, 435*b*, 435*c*. All of the trays that came from a specific bin are preferably distributed evenly to all three of the discharge conveyors. If there are more or less than three containers per sort location, the trays preferably are alternated through the feeders throughout the sort operation to equalize the feeder routine. The accumulation or buffer conveyor system 414 delivers the containers, in order, to the tray lowering devices 430*a*, 430*b*, 430*c*, which may be any tray lowering means, such as a generally vertical lowering device, such as shown in FIG. 16, or a spiral chute such as shown in FIG. 17. The tray lowering devices then return the trays to the floor level at the feeder area of the sortation machine. Preferably, each of the three feeder stations 416*a*, 416*b*, 416*c* only receives the full containers from a specific sort location zone at any given time. All three operators at the feeder stations then only sort mail that came from a single location at any time. If an operator runs out of mail before the others, that operator and station may remain idle until the others are completed. Generally, an operator that runs out of mail first will not have to wait more than the time it takes for one or both of the other operators to complete one tray of articles. The full containers for the next sort bin location are then staged to be immediately ready for processing once all three feeders are cleared of the articles from the previous bin.

When the articles are fed back into the sort assembly 412 it is stored in the moving buckets and dropped in sequence into the appropriate route designated sort locations. When the containers become full, they are again removed by the tray handling system and conveyed to the inclined ramps 428. The trays are then further conveyed to the appropriate slot or zone 434 for storage in their proper order, where they are retained in the zone until they are ready for delivery. Again, overflow zones are preferably available for storing containers from bins receiving a large supply of articles or items.

Once all of the articles have been re-sorted and sequenced by the second sort pass, the containers are transported, grouped by sort location, to a remote location, via takeaway conveyors 436, where they may be brought down to floor level for loading into the corresponding delivery vehicles.

Although shown as having a single sortation assembly, sequencing, accumulating or buffering conveyor system 414 may be implemented with two or more sortation assemblies, whereby a conveyor loop may be adapted to convey trays to another or multiple sortation assembly arrangements, similar to sortation assembly 310, discussed above, without affecting the scope of the present invention. Also, although shown as being an overhead conveyor connected to overhead conveyors and zones, the buffer conveyor system 414 may be located at a lower level, such as to one side or end or otherwise near the respective sortation assembly, without affecting the scope of the present invention.

Figure 22:
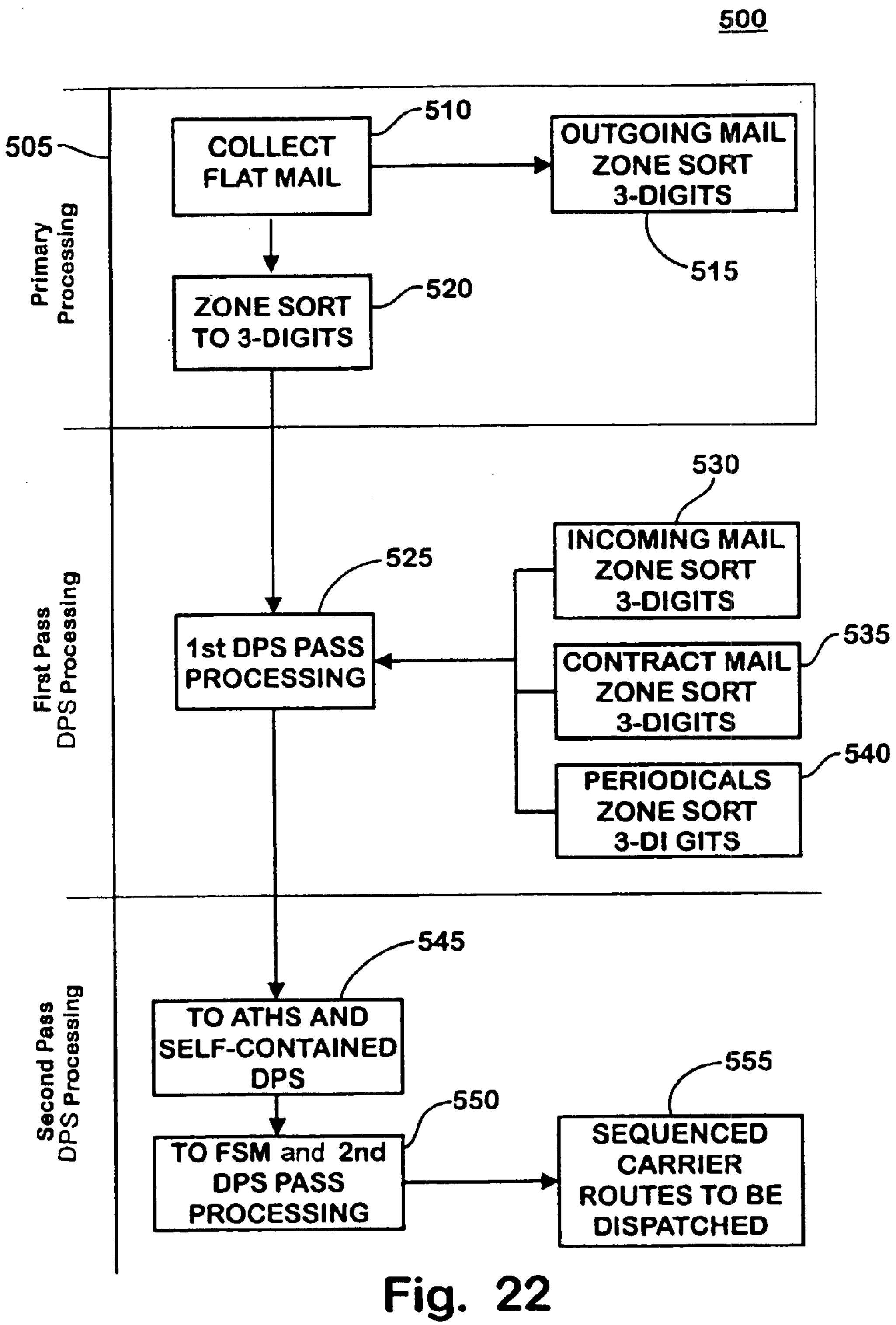
FIG. 22 is a flow chart of a flat mail sequencing process according to the present invention.

Referring now to FIG. 22, a flat mail processing flow process 500 is shown for a typical processing and distribution center. Process 500 illustrates that a two pass delivery point sequencing process can be accomplished on flat sorting machines with 120 bins for multiple carrier routes in a given timeframe. Process starts at 505 at a primary processing stage, where mail is collected at 510 and outgoing mail is zone sorted to 3 digits at 515 and the targeted mail is also zone sorted to 3-digits at 520. A first pass delivery point sequencing process 525 sorts the mail to the desired bins, depending on the sort plan or sort matrix. Incoming mail, contract mail and periodicals are input into the sortation assembly or machine at 530, 535 and 540, respectively. The containers containing the mail sorted in the first pass are conveyed by a tray handling system to the delivery point sequencing conveyor at 545. After the trays are sequenced by the delivery point sequencing conveyor, the trays are input into the sortation machine at 550 for the second pass through the sortation machine. The sequenced carrier route mail is then dispatched at 555. The process 500 may then be repeated for new mail being received and collected. Process 500 is not shown with what typically is called the first processing of collected outgoing mail or the processing of incoming and contracted presorted mail. Process 500 also is not shown with the process involving zoning mail by carrier nor does it consider specific arrival times of various mail streams. However, these processes clearly may be included in process 500, without affecting the scope of the present invention.

The number of bins required for each carrier depends on the number of sequences (addresses) in a particular letter carrier walk (LCW). Typically, a flat sorting machine with 120 output bins is divided into three groups of bins, each having 40 bins. In such an example, it is possible to create a sequencing matrix of 1600 slots (40 rows×40 columns). Such a sequencing matrix is depicted in FIG. 23 (first pass) and FIG. 24 (second pass). If each LCW consists of 650 sequences, then 2.46 LCWs×3 or 7.38 LCWs could be sequenced at a time on each 120 bin flat sorting machine.

Figure 25A:
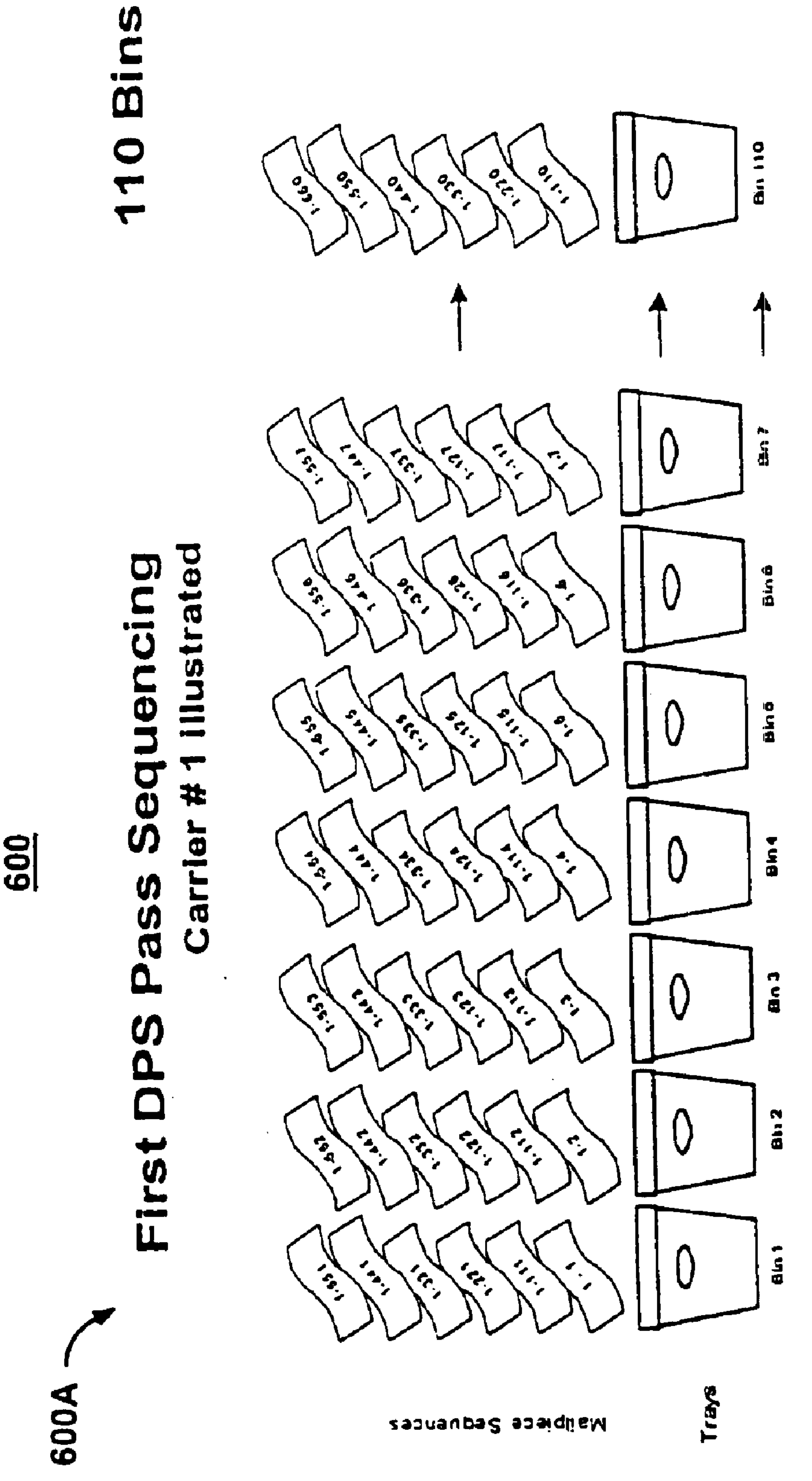

Referring now to FIGS. 25A, 25B, 26A and 26B, a sortation or sequencing matrix 600 of the present invention provides a matrix for processing and sequencing significantly more LCWs during a given time period. This sequencing matrix may be implemented in connection with any of the sortation systems discussed above, or with other sortation and sequencing systems, without affecting the scope of the present invention. As shown in FIGS. 25A, 25B, a first sort pass 600A is performed with a total of 660 sequences per carrier, using 110 outputs of the sortation machine and six sequences per bin or output. The remaining 10 bins (120 bins-110 bins or outputs) are preferably reserved for hold out mail and rejects and the like.

As shown in FIGS. 25A and 25B, six rows of the sequencing matrix 600 are assigned to each carrier. For example, in the illustrated embodiment, rows 1 through 6 are assigned to LCW #1, rows 7 through 12 are assigned to LCW #2, rows 13 through 18 are assigned to LCW #3, and so on, up to row 120 rows for a total of 20 carriers.

The number of LCWs able to be processed on any given machine depends on the number of output bins utilized for the second pass. The example of bin assignments shown in FIG. 26B indicates that using 120 output bins permits 20 LCWs to be processed concurrently for the first and second passes on a single 120 bin machine (with 6 rows per carrier). More or less rows can be assigned depending on the number of sequences required for each LCW. If fewer rows are used in the first pass, then fewer rows are required for the second pass, such that more LCWs can be processed at a time.

Assuming that each LCW has 1,000 flat mail pieces distributed to 650 sequences, then, on average, each address receives 1.54 pieces of mail. With 120 sequences assigned to each bin, each bin could receive 120×1.54 or 185 pieces of mail. Using an average of 70 mail pieces per mail tray, an average of 2.6 trays may be discharged from each bin.

The sequencing system used with sortation matrix 600 may be a sequencing conveyor of one of the types discussed above and may be a system of conveyors installed over the sortation machine or machines, and is thus able to sort and queue trays for the second pass. The tray handling system selected for use with sortation matrix 600 is preferably capable of handling variances in the number of trays discharged, so that the specific number of discharged trays will not hamper performance. The tray handling system preferably provides significant flexibility and is adaptable to a variety of site configurations and sortation machine layouts.

For the second sort pass through the sortation machine, trays of mail are sent to the three feeders in the appropriate order or sequence, as performed by the sequencing conveyor or the like. For example, the process may sort mail into the carriers' trays in a last in, first out (LIFO) order. Therefore, first pass trays from bin 120, or the last sequences in the LCW, are delivered first to the feeders by the sequencing conveyor or system. However, the order of tray delivery does not matter and may be altered depending on the layout of the sort scheme for the first sort pass. Recall that six sequences of mail for 20 LCWs are mixed in the delivered trays during the first sort pass. The order doesn't matter and the sequencing conveyor or system preferably distributes trays in a round robin fashion to all three feeders. Preferably, in order to ensure that articles are not inadvertently mixed, the feeder control, upon recognition of a following address sequence, will not allow mail past the buffer until all mail from the previous sequence group is inducted into the carrousel from the other one or two feeders.

Figure 26A:
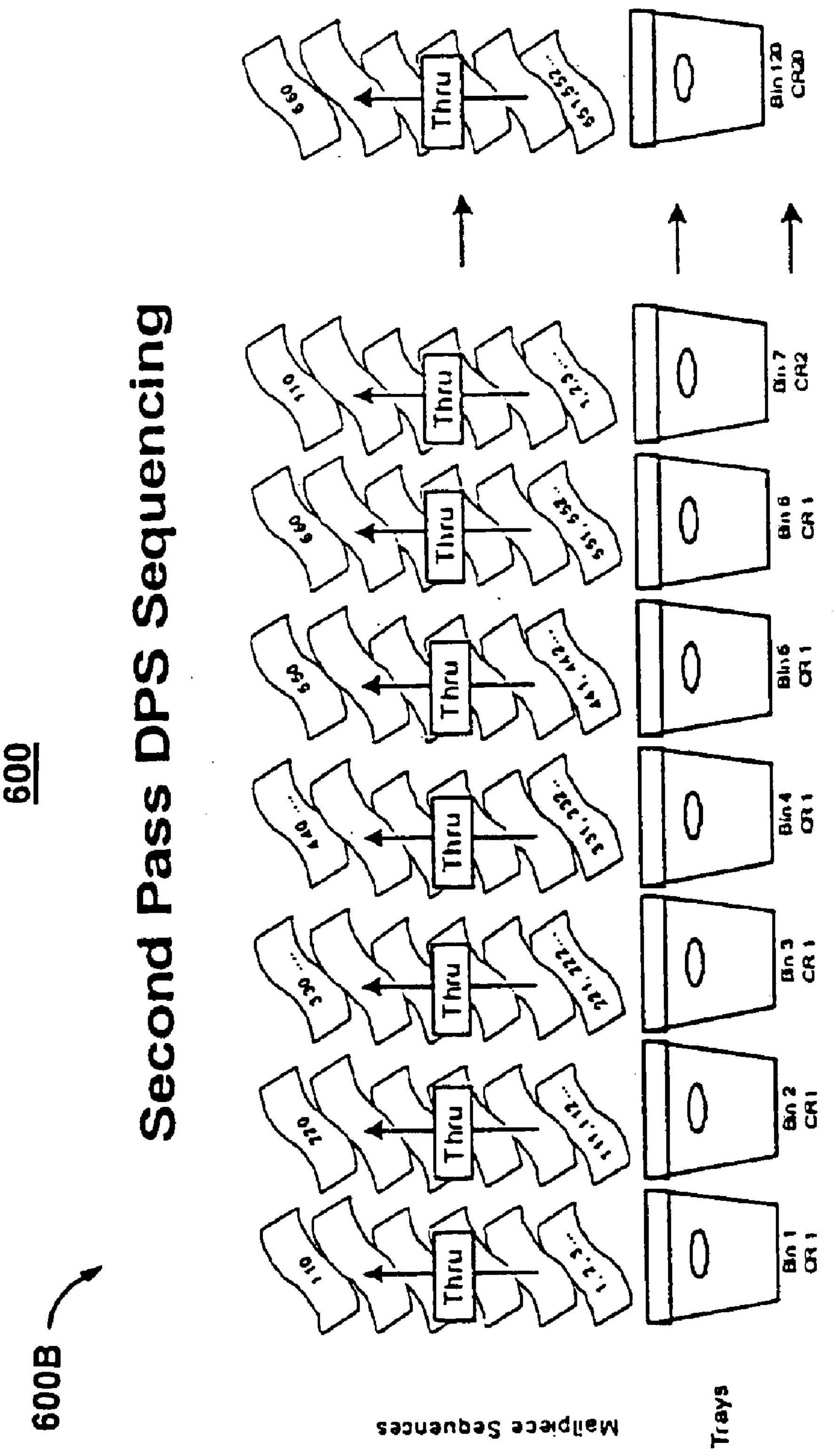

As shown in FIGS. 26A and 26B, the second sort pass 600B through the sortation machine sorts the mail sorted during the first pass into an appropriate one of the output bins of the sortation machine, where each carrier is assigned a particular block or group of bins, such as six bins in the illustrated embodiment. As the mail from bin 1 of the first pass (which includes mail for all six carriers) is sorted during the second pass, the mail is sorted into an appropriate bin corresponding to a particular sequence or sequences of a particular carrier. For example, bin 1 from the first sort pass includes mail pieces 1, 111, 221, 331, 441 and 551 for each carrier, as shown generally in FIGS. 25A and 25B. During the second sort pass, the mail is sorted such that mail piece 1 for carrier 1 is sorted to bin 1, while mail piece 111 for carrier 1 is sorted to bin 2, and so on, up to mail piece 551 for carrier 20 being sorted to bin 120, as shown generally in FIGS. 26A and 26B.

Once all of the mail has been fed and inducted, the trays are automatically swept (discharged) and labeled by the tray handling system prior to being dispatched. If a tray becomes full before the sweep can occur, the tray handling system preferably removes the full tray, automatically applies the destination label and replaces it with an empty tray.

Once the second sort pass is complete and the sortation machine is swept, a new scheme or sort plan can be loaded while the sortation machine is being replenished with empty trays. Typically, loading a new scheme may take approximately 20 minutes, while replenishing with empty trays can be done concurrently and well within this timeframe.

The present invention thus provides a sortation and sequencing matrix which allows for significantly more LCWs to be processed at a time. For example, for routes having 650 sequences, as discussed above, the sequencing matrix of the present invention allows for sortation and sequencing of 20 different carrier routes. Also, net throughput of the sortation system is enhanced. The sortation matrix of the present invention is flexible and adapts to varying requirements. The sortation matrix of the present invention also allows for all three inducts or feeders of the sortation machine to be used for all of the output bins during both sort passes.

Therefore, the present invention provides an article sortation apparatus which is operable to provide two sort processes or passes of articles through one or two sortation units in order to achieve the delivery point sequence or carrier walk sequence sort of the articles. The buffer of the present invention is operable to automatically sort the containers or trays containing articles from a first sort process, such that the articles are inducted into a sortation unit in a proper sequence or order for a second sort process or pass. The buffer of the present invention may convey the trays containing the first sorted articles in a generally continuous loop, whereby additional trays are input into the loop at appropriate spaces between trays being cycled around the loop, until all the trays have been accounted for and are being cycled or accumulated around the generally continuous loop in the proper order or sequence. Alternately, the buffer may provide a plurality of temporary storage zones or conveyors, where the trays are temporarily stored until the first sort pass is completed, and then automatically discharged in an appropriate order for the second sort pass. The ordered trays are then discharged from the loop conveying portion to the induct of the sortation unit, whereby the articles are re-inducted into the sorter unit for the second sort process. The present invention thus provides an automatic and efficient system for automatically sorting flat mail to the delivery point sequence. The articles are sorted to the delivery point sequence without temporary storage of the trays in bins or racks or the like, and without transporting the trays via manual processes or via carts or robotic devices or the like. The trays are conveyed along interconnected conveying portions in order to provide continuous sorting and conveying of the trays, which further expedites the sortation process.

Additionally, mail may be transferred between sortation assemblies or the input and output of a single sortation assembly in a highly automated manner. This avoids the necessity for loading mail into standard trays and loading the trays on manual carts, also known as Eastern Regional Mail Containers (ERMC). Advantageously, the present invention may utilize containers that are of rigid construction such as rigid molded plastic or the like, and bearing a permanent identification number which may be encoded by a plate attached to the container, which may be a bar code, radio frequency tag, or the like. This eliminates the necessity for applying temporary labels to each container dispatched from the sortation assembly as would be done if the containers were being dispatched to the transportation system. Rigid containers are feasible because the containers may be retained totally within the sortation assembly and not utilized to ship mail to other distribution centers. Mail may be prepared at a common mail preparation location or station and loaded into the rigid containers and then conveyed to the inducts of the sorter units. The utilization of rigid containers advantageously facilitates automatic transfer of flat articles from the containers at the inducts to thereby further reduce manual processing of the flat articles to be sorted.

The present invention thus provides automated means for sorting, queuing, sequencing and presenting trays of sorted articles to the inducts of the sortation assemblies for the second sort pass. The trays may be automatically removed from their respective output bins, and automatically identified and labeled so that the trays may be provided in the proper order. The present invention also provides for automatic delivery point sequencing for a larger sequencing matrix via utilization of two or more sortation assemblies or machines. A conveyor loop may be implemented to connect each sortation assembly with each buffer or tray sorter to facilitate sortation of a greater number of addresses or sequences with a single system.

The present invention also provides for an improved sequencing matrix for sequencing the articles in appropriate output bins for multiple carriers. The sequencing matrix of the present invention provides significantly more carrier routes to be processed at a given time, while increasing the net throughput of the system. The sequencing matrix of the present invention also is flexible and adapts to varying requirements of the sortation machine or machines and the desired sequences of the articles or mail.

Changes and modifications in the specifically described embodiments can be carried out without departing from the principles of the present invention, which is intended to be limited only by the scope of the appended claims, as according to the principles of patent law.

The embodiments of the invention in which an exclusive property or privilege is claimed are defined as follows:

1. An article sortation system for sorting articles to a delivery point sequence depth of sort, said article sortation system comprising:

at least one article sorter having an induct and a discharge, said induct receiving articles for sorting by said at least one article sorter, said at least one article sorter being operable to sort articles into a plurality of trays and discharge the trays of sorted articles at said discharge; and a buffering assembly for automatically sorting and conveying the trays containing sorted articles sorted during a first sort of said at least one article sorter from said discharge of said at least one article sorter to said induct of said at least one article sorter, said buffering assembly being operable to automatically arrange the trays in an arranged manner and convey the arranged trays to said induct of said at least one article sorter, the articles sorted during the first sort being removed from the trays for a second sort of the articles by said at least one article sorter.

2. The article sortation system of claim 1, wherein said buffering assembly comprises a plurality of conveyors which are cooperatively operable to arrange and accumulate trays in the sequenced manner on said buffering assembly as the trays are received from said discharge of said at least one article sorter.

3. The article sortation system of claim 2, wherein said plurality of conveyors comprise at least one transport conveyor and a plurality of zone conveyors connected to said transport conveyor, said zone conveyors and said transport conveyor being cooperatively operable to receive trays from said at least one transport conveyor and discharge trays to said at least one transport conveyor in an appropriate order for said second sort.

4. The article sortation system of claim 3, wherein said plurality of zone conveyors are positioned along at least one side of said at least one transport conveyor.

5. The article sortation system of claim 4, wherein said at least one transport conveyor includes a plurality of transfer units, each of said plurality of transfer units being positioned at at least one of said plurality of zone conveyors and being operable to move trays between said at least one transport conveyor and a respective at least one of said plurality of zone conveyors.

6. The article sortation system of claim 2, wherein said plurality of conveyors define at least one generally continuous loop between said discharge of said at least one article sorter and said induct of said at least one article sorter.

7. The article sortation system of claim 6, wherein said buffering assembly is operable to circulate trays in said at least one generally continuous loop and input new trays into appropriate spaces between the circulating trays in said at least one generally continuous loop as the now trays are received from said discharge of said at least one article sorter.

8. The article sortation system of claim 7, wherein said at least one generally continuous loop comprises at least two generally continuous loops.

9. The article sortation system of claim 8, wherein said at least one article sorter includes a plurality of individual article sorting stations, each of said at least two continuous loops being operable to convey trays received from different groups of individual soiling stations of said at least one article sorter.

10. The article sortation system of claim 1, wherein said at least one article sorter comprises a first article sorter and a second article sorter.

11. The article sortation system of claim 10, wherein said buffering, assembly is positioned along a return conveyor which is connected between at least one of a discharge of said first article sorter and a discharge of said second article sorter and at least one of an induct of said first article sorter and an induct of said second article sorter.

12. The article sortation system of claim 10, wherein said buffering assembly is connected between a discharge of said first article sorter and an induct of said first article sorter.

13. The article sortation system of claim 12 including a second buffering assembly connected between a discharge of said second article sorter and an induct of said second article sorter.

14. The article sortation system of claim 13 including a connecting conveyor positioned between said buffering assembly and said second buffering assembly and between said discharges of said first and second sorters.

15. The article sortation system of claim 14, wherein said connecting conveyor is operable to convey trays from said discharge of at least one of said first article sorter and said second article sorter to an appropriate one of said buffering assembly and said second buffering assembly.

16. The article sortation system of claim 15, wherein said connecting conveyor defines a generally continuous loop.

17. The article sortation system of claim 1, wherein said at least one article sorter comprises a single article sorter.

18. The article sortation system of claim 17, wherein said buffering assembly is operable to sort and convey the trays containing sorted articles sorted during the first sort of said article sorter from said discharge of said article sorter to said induct of said article sorter for a second sort of said article sorter.

19. The article sortation system of claim 1, wherein said buffering assembly is positioned at a level above said at least one article sorter.

20. The article sortation system or claim 19 further including elevating devices which are operable to convey trays upward from said discharge of said at least one article sorter to said buffering assembly and downward from said buffering assembly to said induct of said at least one article sorter.

21. The article sortation system of claim 1, wherein said buffering assembly includes an input for receiving out-of-area articles received from other article sortation facilities and supplying the out-of-area articles to said induct of said at least one article sorter.

22. The article sortation system of claim 1, wherein said buffering assembly includes an output for dispatching articles sorted by said at least one article sorter as out-of-area articles to be supplied to other article sortation facilities.

23. A method for sorting articles to a delivery point sequence depth of sort, said method comprising:

providing at least one article sorter having an induct and a discharge;

sorting articles in a first sort of said at least one article sorter into a plurality of trays;

providing a buffering assembly for automatically sorting and conveying trays containing sorted articles sorted during a first sort of said at least one article sorter;

conveying and arranging trays of sorted articles in an arranged manner on said buffering assembly;

conveying the arranged trays of sorted articles to said induct of said at least one article sorter for a second sort of the articles;

unloading sorted articles from said arranged trays;

inducting the unloaded sorter articles to said induct of said at least one article sorter; and sorting articles in a second sort of said at least one article sorter.

24. The method of claim 23, wherein conveying and arranging trays includes conveying each of the trays to an appropriate one of a plurality of zone conveyors.

25. The method of claim 24, wherein conveying and arranging the trays includes cooperatively discharging the trays from said zone conveyors in an arranged manner.

26. The method of claim 23, wherein conveying and arranging trays includes conveying the trays in a continuous loop.

27. The method of claim 26, wherein conveying and arranging trays includes generally continuously conveying the trays in said continuous loop.

28. The method of claim 26, wherein conveying and arranging trays includes inducting trays into said generally continuous loop in an arranged manner.

29. The method of claim 23, wherein providing at least one article sorter comprises providing at least two article sorters.

30. The method of claim 29, wherein providing a buffering assembly comprises providing at least two buffering assemblies.

31. The method of claim 30 including conveying trays from said discharge of one of said at least two article sorters to one of said at least two buffering assemblies.

32. The method of claim 23, wherein providing at least one article sorter comprises providing a single article sorter.

33. The method of claim 23 including elevating trays from said discharge of said at least one sorter to an elevated buffering assembly.

34. The method of claim 33 including lowering the arranged trays from said elevated buffering assembly to said induct of said at least one article sorter.

* * * * *